United States Patent
Elmaleh et al.

(10) Patent No.: US 12,458,622 B2
(45) Date of Patent: Nov. 4, 2025

(54) METHODS OF TREATMENT OF CORONAVIRUS-INDUCED INFLAMMATION CONDITIONS

(71) Applicant: The General Hospital Corporation, Boston, MA (US)

(72) Inventors: David R. Elmaleh, Newton, MA (US); Ana Griciuc, Arlington, MA (US); Ghazaleh Sadri-Vakili, Watertown, MA (US); Sabrina Paganoni, Boston, MA (US); Rudolph E. Tanzi, Milton, MA (US)

(73) Assignee: The General Hospital Corporation, Boston, MA (US)

( * ) Notice: Subject to any disclaimer, the term of this patent is extended or adjusted under 35 U.S.C. 154(b) by 468 days.

(21) Appl. No.: 17/917,022

(22) PCT Filed: Apr. 5, 2021

(86) PCT No.: PCT/US2021/025746
§ 371 (c)(1),
(2) Date: Oct. 5, 2022

(87) PCT Pub. No.: WO2021/207060
PCT Pub. Date: Oct. 14, 2021

(65) Prior Publication Data
US 2023/0149345 A1    May 18, 2023

Related U.S. Application Data

(60) Provisional application No. 63/005,720, filed on Apr. 6, 2020.

(51) Int. Cl.
*A61K 31/353* (2006.01)
*A61K 31/352* (2006.01)
(Continued)

(52) U.S. Cl.
CPC .......... *A61K 31/353* (2013.01); *A61K 31/352* (2013.01); *A61K 45/06* (2013.01);
(Continued)

(58) Field of Classification Search
CPC ....... A61K 31/353; A61K 45/06; A61P 11/00; A61P 29/00
See application file for complete search history.

(56) References Cited

U.S. PATENT DOCUMENTS 3,419,578 A    12/1968   Fitzmaurice et al.
3,634,582 A    1/1972    Hartley et al.
(Continued)

FOREIGN PATENT DOCUMENTS

CA    2408793 A1    12/2001
CN    101754746 A   6/2010
(Continued)

OTHER PUBLICATIONS

Anonymous: "Facts about variant Creutzfeldt-Jakob disease", European Centre for Disease Prevention and Control, Jun. 26, 2017 (Jun. 26, 2017), pp. 1-10, XP093093988, European Centre for Disease Prevention and Control website.
(Continued)

*Primary Examiner* — Trevor Love
(74) *Attorney, Agent, or Firm* — Foley Hoag LLP; Janine S. Ladislaw; Tatiana P. Headrick

(57) ABSTRACT

The present disclosure relates to a method of treating one or more inflammation conditions induced by a coronavirus infection in a subject in need thereof, comprising administering a pharmaceutical composition comprising a compound of Formula I or Formula II:
(Continued)

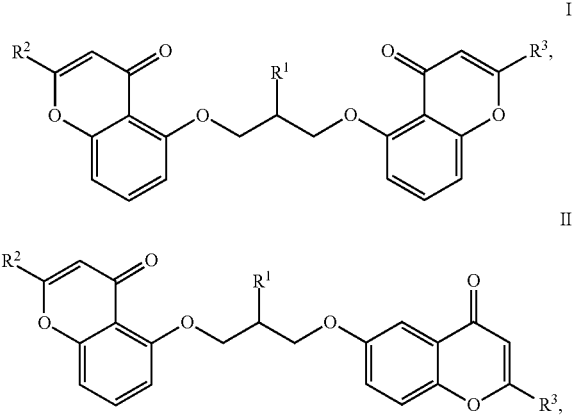

wherein
$R^1$ is halogen, OH, or —OC(O)$C_{1-5}$alkyl
$R^2$ and $R^3$ are each independently selected from $CO_2R^4$ and $CH_2OR^5$;
$R^4$ is Li, Na, K, H, $C_{1-5}$alkyl, or —$CH_2CO(C_{1-5}$alkyl); and
$R^5$ is H or —C(O)($C_{1-5}$alkyl),
or a pharmaceutically acceptable salt thereof.

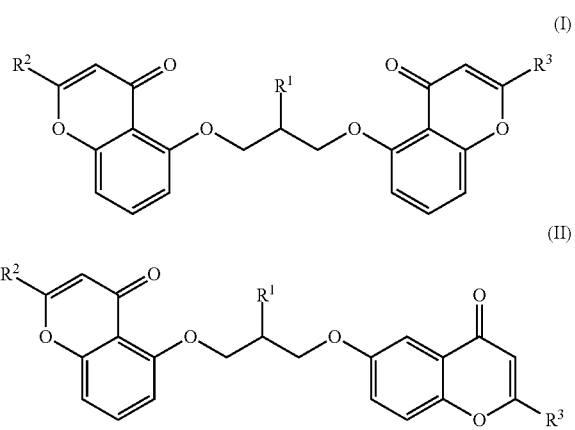

25 Claims, 17 Drawing Sheets

(51) Int. Cl.
  A61K 45/06     (2006.01)
  A61P 11/00     (2006.01)
  A61P 29/00     (2006.01)
  A61P 31/14     (2006.01)
(52) U.S. Cl.
  CPC ........... A61P 11/00 (2018.01); A61P 29/00 (2018.01); A61P 31/14 (2018.01)

(56) References Cited

U.S. PATENT DOCUMENTS

| | | |
|---|---|---|
| 3,686,412 A | 8/1972 | Fitzmaurice et al. |
| 3,957,965 A | 5/1976 | Hartley et al. |
| 4,120,285 A | 10/1978 | Nugent |
| 4,405,598 A | 9/1983 | Brown |
| 4,405,735 A | 9/1983 | Wiezer et al. |
| 4,429,545 A | 2/1984 | Steinberg |
| 4,481,206 A | 11/1984 | Spiegel et al. |
| 4,996,296 A | 2/1991 | Pecht et al. |
| 5,376,386 A | 12/1994 | Ganderton et al. |
| 5,567,720 A | 10/1996 | Averback |
| 5,594,142 A | 1/1997 | Gaa et al. |
| 5,655,523 A | 8/1997 | Hodson et al. |
| 5,830,920 A | 11/1998 | Chucholowski et al. |
| 5,904,937 A | 5/1999 | Augello et al. |
| 6,168,776 B1 | 1/2001 | Klunk et al. |
| 6,197,963 B1 | 3/2001 | Hirschmann et al. |
| 6,309,623 B1 | 10/2001 | Weers et al. |
| 6,696,039 B2 | 2/2004 | Kung et al. |
| 6,911,466 B2 | 6/2005 | Koo et al. |
| 6,946,116 B2 | 9/2005 | Kung et al. |
| 6,972,127 B2 | 12/2005 | Schenk |
| 7,160,559 B1 | 1/2007 | McGee et al. |
| 7,186,401 B2 | 3/2007 | Keller et al. |
| 7,858,803 B2 | 12/2010 | Elmaleh et al. |
| 8,381,454 B1 | 2/2013 | Robinson |
| 8,613,920 B2 | 12/2013 | Lieberburg et al. |
| 8,617,517 B2 | 12/2013 | Elmaleh et al. |
| 8,765,742 B2 | 7/2014 | Hilifiker et al. |
| 9,283,230 B2 | 3/2016 | Clunas et al. |
| 9,855,276 B2 | 1/2018 | Elmaleh |
| 9,861,608 B2 | 1/2018 | Elmaleh et al. |
| 9,913,847 B2 | 3/2018 | Elmaleh |
| 9,918,992 B2 | 3/2018 | Elmaleh |
| 9,925,282 B2 | 3/2018 | Elmaleh et al. |
| 9,968,618 B1 | 5/2018 | Elmaleh |
| 10,058,530 B2 | 8/2018 | Elmaleh |
| 10,092,564 B2 | 10/2018 | Moussy et al. |
| 10,188,757 B2 | 1/2019 | Elmaleh |
| 10,238,628 B2 | 3/2019 | Gerhart et al. |
| 10,245,331 B2 | 4/2019 | Elmaleh |
| 10,251,961 B2 | 4/2019 | Elmaleh |
| 10,398,704 B2 | 9/2019 | Elmaleh |
| 10,406,164 B2 | 9/2019 | Elmaleh |
| 10,413,551 B2 | 9/2019 | Elmaleh |
| 10,525,005 B2 | 1/2020 | Elmaleh |
| 10,561,612 B2 | 2/2020 | Elmaleh et al. |
| 10,576,171 B2 | 3/2020 | Elmaleh |
| 11,013,686 B2 | 5/2021 | Elmaleh |
| 11,110,097 B2 | 9/2021 | Elmaleh |
| 11,291,648 B2 | 4/2022 | Elmaleh et al. |
| 11,666,669 B2 | 6/2023 | Elmaleh |
| 11,679,095 B2 | 6/2023 | Elmaleh et al. |
| 11,801,316 B2 | 10/2023 | Elamaleh |
| 2002/0009491 A1 | 1/2002 | Rothbard et al. |
| 2002/0016359 A1 | 2/2002 | Hellberg et al. |
| 2002/0091100 A1 | 7/2002 | Lezdey et al. |
| 2002/0107173 A1 | 8/2002 | Friedhoff et al. |
| 2004/0176469 A1 | 9/2004 | Thomas |
| 2004/0223918 A1 | 11/2004 | Pham et al. |
| 2004/0259952 A1 | 12/2004 | Abbas et al. |
| 2006/0051319 A1 | 3/2006 | Yoo |
| 2006/0142241 A1 | 6/2006 | Yoo |
| 2006/0159629 A1 | 7/2006 | Tarara et al. |
| 2006/0240007 A1 | 10/2006 | Sanders |
| 2006/0276455 A1 | 12/2006 | Lindsberg et al. |
| 2007/0015813 A1 | 1/2007 | Carter et al. |
| 2007/0053843 A1 | 3/2007 | Dawson et al. |
| 2007/0071690 A1 | 3/2007 | Mueller-Walz et al. |
| 2007/0086981 A1 | 4/2007 | Meijer et al. |
| 2007/0093457 A1 | 4/2007 | Arber et al. |
| 2007/0107173 A1 | 5/2007 | Yamada |
| 2007/0178166 A1 | 8/2007 | Bernstein et al. |
| 2007/0193577 A1 | 8/2007 | Keller |
| 2007/0249644 A1 | 10/2007 | Pearson et al. |
| 2007/0293538 A1 | 12/2007 | Hobden |
| 2008/0021085 A1 | 1/2008 | Koo et al. |
| 2009/0110679 A1 | 4/2009 | Li et al. |
| 2009/0155256 A1 | 6/2009 | Black et al. |
| 2010/0113613 A1 | 5/2010 | McLaurin et al. |
| 2010/0143251 A1 | 6/2010 | Tamagnan et al. |
| 2010/0173960 A1 | 7/2010 | Cruz et al. |
| 2010/0234295 A1 | 9/2010 | Chen |

(56) References Cited

U.S. PATENT DOCUMENTS

| | | |
|---|---|---|
| 2010/0236550 A1 | 9/2010 | Zeng et al. |
| 2010/0266531 A1 | 10/2010 | Hsieh et al. |
| 2010/0298389 A1 | 11/2010 | Elmaleh et al. |
| 2011/0060138 A1 | 3/2011 | Elmaleh et al. |
| 2011/0129530 A1 | 6/2011 | Venkatesh et al. |
| 2011/0132434 A1 | 6/2011 | Correia et al. |
| 2011/0262442 A1 | 10/2011 | Hamilton et al. |
| 2012/0058049 A1 | 3/2012 | Elmaleh et al. |
| 2012/0082727 A1 | 4/2012 | Cocconi et al. |
| 2012/0118991 A1 | 5/2012 | Keller et al. |
| 2012/0121656 A1 | 5/2012 | Watson et al. |
| 2012/0134929 A1 | 5/2012 | McGrath et al. |
| 2012/0165366 A1 | 6/2012 | Ibrahim et al. |
| 2012/0175082 A1 | 7/2012 | Kmetovicz et al. |
| 2012/0308613 A1 | 12/2012 | Staniforth et al. |
| 2013/0197105 A1 | 8/2013 | Pipkin et al. |
| 2014/0140927 A1 | 5/2014 | Elmaleh et al. |
| 2014/0228304 A1 | 8/2014 | Jones et al. |
| 2015/0224077 A1 | 8/2015 | Gerhart et al. |
| 2015/0224078 A1 | 8/2015 | Gerhart et al. |
| 2015/0274680 A1 | 10/2015 | Ueda et al. |
| 2015/0283113 A1 | 10/2015 | Elmaleh |
| 2016/0106704 A1 | 4/2016 | Elmaleh et al. |
| 2016/0158150 A1 | 6/2016 | Morton et al. |
| 2016/0166534 A1 | 6/2016 | Elmaleh |
| 2016/0310503 A1 | 10/2016 | Elmaleh |
| 2017/0290797 A1 | 10/2017 | Elmaleh |
| 2018/0066039 A1 | 3/2018 | Hyde-DeRuyscher et al. |
| 2018/0153803 A1 | 6/2018 | Elmaleh |
| 2018/0169277 A1 | 6/2018 | Elmaleh |
| 2018/0177789 A1 | 6/2018 | Elmaleh |
| 2018/0177790 A1 | 6/2018 | Elmaleh |
| 2018/0177791 A1 | 6/2018 | Elmaleh |
| 2018/0193491 A1 | 7/2018 | Elmaleh |
| 2018/0193492 A1 | 7/2018 | Elmaleh |
| 2018/0344682 A1 | 12/2018 | Elmaleh |
| 2019/0022006 A1 | 1/2019 | Elmaleh et al. |
| 2019/0388568 A1 | 12/2019 | Elmaleh |
| 2020/0022947 A1 | 1/2020 | Elmaleh et al. |
| 2020/0078366 A1 | 3/2020 | Elmaleh |
| 2020/0338040 A1 | 10/2020 | Elmaleh |
| 2020/0383908 A1 | 12/2020 | Elmaleh |
| 2021/0023010 A1 | 1/2021 | Elmaleh et al. |
| 2021/0059977 A1 | 3/2021 | Elmaleh |
| 2021/0085601 A1 | 3/2021 | Elmaleh |
| 2022/0062222 A1 | 3/2022 | Elmaleh et al. |
| 2022/0079914 A1 | 3/2022 | Elmaleh et al. |
| 2022/0125753 A1 | 4/2022 | Elmaleh |
| 2022/0193087 A1 | 6/2022 | Elmaleh |
| 2022/0218652 A1 | 7/2022 | Elmaleh et al. |
| 2023/0226017 A1 | 7/2023 | Elmaleh |
| 2023/0248646 A1 | 8/2023 | Elmaleh |
| 2023/0248650 A1 | 8/2023 | Elmaleh et al. |
| 2024/0058480 A1 | 2/2024 | Elmaleh |
| 2024/0067635 A1 | 2/2024 | Elmaleh et al. |
| 2024/0082207 A1 | 3/2024 | Elmaleh |

FOREIGN PATENT DOCUMENTS

| | | |
|---|---|---|
| CN | 101848733 A | 9/2010 |
| CN | 103347500 A | 10/2013 |
| CN | 105377037 A | 3/2016 |
| CN | 108164409 A | 6/2018 |
| CN | 108403708 A | 8/2018 |
| DE | 1543579 | 6/2005 |
| EP | 1632242 A2 | 3/2006 |
| EP | 2322163 A1 | 5/2011 |
| EP | 2377860 A1 | 10/2011 |
| EP | 2391618 A2 | 12/2011 |
| EP | 2890788 A1 | 7/2015 |
| EP | 2911664 B1 | 5/2019 |
| GB | 1144906 A | 3/1969 |
| GB | 1257162 A | 12/1971 |
| JP | S56-043448 B1 | 10/1981 |
| JP | H04505006 A | 9/1992 |
| JP | 2000-503866 A | 4/2000 |
| JP | 2001-151673 A | 6/2001 |
| JP | 2001-517691 A | 10/2001 |
| JP | 2002-524107 A | 8/2002 |
| JP | 2003-525842 A | 9/2003 |
| JP | 2005-510535 A | 4/2005 |
| JP | 2005/232171 A | 9/2005 |
| JP | 2005-532091 A | 10/2005 |
| JP | 2007/534693 A | 11/2007 |
| JP | 2009-536918 A | 10/2009 |
| JP | 2010-510254 A | 4/2010 |
| JP | 2012-515712 A | 7/2012 |
| JP | 2012/516356 A | 7/2012 |
| WO | WO-1987/001115 A1 | 2/1987 |
| WO | WO-90/09789 A2 | 9/1990 |
| WO | WO-1997026934 A2 | 7/1997 |
| WO | WO-98/34596 A2 | 8/1998 |
| WO | WO-1999016422 A1 | 4/1999 |
| WO | WO-1999064095 A2 | 12/1999 |
| WO | WO-02/28820 A1 | 4/2002 |
| WO | WO-03/045331 A2 | 6/2003 |
| WO | WO-2004/071532 A1 | 8/2004 |
| WO | WO-2005/063732 A1 | 7/2005 |
| WO | WO-2005/104712 A2 | 11/2005 |
| WO | WO-2006/056492 A1 | 6/2006 |
| WO | WO-2007/094718 A1 | 8/2007 |
| WO | WO-2007/102059 A1 | 9/2007 |
| WO | WO-2008/013799 A2 | 1/2008 |
| WO | WO-2008/061373 A1 | 5/2008 |
| WO | WO-2008/128981 A1 | 10/2008 |
| WO | WO-2008/131298 A2 | 10/2008 |
| WO | WO-2009/010770 A2 | 1/2009 |
| WO | WO-2009/133128 A1 | 11/2009 |
| WO | WO-2010/084767 A1 | 7/2010 |
| WO | WO-2010/088455 A2 | 8/2010 |
| WO | WO-2011/136754 A1 | 11/2011 |
| WO | WO-2013/148366 A1 | 10/2013 |
| WO | WO-2014/066318 A1 | 5/2014 |
| WO | WO-2015/002703 A1 | 1/2015 |
| WO | WO-2015/061397 A1 | 4/2015 |
| WO | WO-2016/081466 A1 | 5/2016 |
| WO | WO-2016/196401 A1 | 12/2016 |
| WO | WO-2017/027387 A1 | 2/2017 |
| WO | WO-2017027402 A1 | 2/2017 |
| WO | WO-2017/072335 A1 | 5/2017 |
| WO | WO-2017/087962 A1 | 5/2017 |
| WO | WO-2017/091644 A1 | 6/2017 |
| WO | WO-2017/162884 A1 | 9/2017 |
| WO | WO-2018/045217 A1 | 3/2018 |
| WO | WO-2018/048989 A1 | 3/2018 |
| WO | WO-2019/199776 A1 | 10/2019 |
| WO | WO-2020/010049 A1 | 1/2020 |
| WO | WO-2020/051322 A1 | 3/2020 |
| WO | WO-2020/123449 A1 | 6/2020 |
| WO | WO-2021/207060 A1 | 10/2021 |
| WO | WO-2021/248022 A1 | 12/2021 |
| WO | WO-2022/146914 A1 | 7/2022 |

OTHER PUBLICATIONS

Brazier et al., "Pharmacokinetics of cromolyn and ibuprofen in healthy elderly volunteers", Clinical drug investigation 37: 1025-1034 (2017).
Hofman et al., "Atherosclerosis, apolipoprotein E, and prevalence of dementia and Alzheimer's disease in the Rotterdam Study," Lancet 349: pp. 151-154 (1997).
Manuelidis et al., "Transmissible encephalopathy agents," Virulence 1.2 (2010): 101-104.
Prins et al., "Treating Alzheimer's disease with monoclonal antibodies: current status and outlook for the future", Alzheimer's research & therapy 5.6: 1-6 (2013).
Tsivgoulis et al., "Recent Advances in Primary and Secondary Prevention of Atherosclerotic Stroke," Journal of Stroke, 20.2 (2018): 145-166.
Yoshimi et al., "Importance of Hydrolysis of Amino Acid Moiety in Water-Soluble Prodrugs of Disodium Cromoglycate for Increased Oral Bioavailability," Journal of Pharmacobio-Dynamics 15.7 (1992): 339-345.

(56) References Cited

OTHER PUBLICATIONS

Abraham et al., "Mast cell-orchestrated immunity to pathogens," Nat Rev Immunol, 10: 440-452 (2010).
Aisen et al., "Effects of rofecoxib or naproxen vs placebo on Alzheimer disease progression: a randomized controlled trial," JAMA, 289(21):2819-2826 (2003).
Akiyama et al., "Inflammation and Alzheimer's Disease," Neurobiol Aging, 21(3):383-421 (2000).
Alafuzoff et al., "Lower counts of astroglia and activated microglia in patients with Alzheimer's disease with regular use of non-steroidal anti-inflammatory drugs," J Alzheimers Dis, 2(1):37-46 (2000).
Albert et al., "Effects of age on the clinical pharmacokinetics of ibuprofen," Am J Med, 77(1, Part 1):47-50 (1984).
Albert et al., "Pharmacokinetics of ibuprofen," Am J Med, 77(1A):40-46 (1984).
Aloisi F. "Immune function of microglia". Glia (2001) 36,165-179.
Andreasen et al. "Sensitivity, specificity, and stability of CSF-tau in AD in a community-based patient sample," Neurology. (1999) 53: 1488-94 (19 pages).
Arnáiz et al., "Neuropsychological features of mild cognitive impairment and preclinical Alzheimer's disease," Acta Neurol Scand Suppl. (2003) 179: 34-41.
Aswania et al., "Relative bioavailability of sodium cromoglycate to the lung following inhalation, using urinary excretion," J Clin Pharmacol, 47:613-618 (1999).
Baig et al., "Use of Peptides for the Management of Alzheimer's Disease: Diagnosis and Inhibition," Frontiers in Aging Neuroscience, 10: 1-6 (2018).
Banati, R. B. et al., "Cytotoxicity of microglia". Glia (1993) 7, 111-118.
Bannwarth et al., "Stereoselective disposition of ibuprofen enantiomers in human cerebrospinal fluid.," Br J Clin Pharmacol, 40(3):266-269 (1995).
Barone, F.C. et al., "Tumor necrosis factor-$\alpha$: a mediator of focal ischemic brain injury". Stroke (1997) 28, 1233-1244.
Basek et al., "Efficacy of an Isotonic Small Droplet Size Nebulized DSCG on Asthma Control in Children," Acta Paediatrica, 99(Suppl 462):115 (2010).
Beach et al., "Cromolyn sodium toxicity studies in primates," Toxicol Appl Pharmacol, 57(3):367-400 (1981).
Beigel JH, et al. "Remdesivir for the treatment of Covid-19—preliminary report," The New England Journal of Medicine: 1-12 (2020).
Berge et al., "Pharmaceutical salts," J Pharm Sci, 66(1):1-19 (1977).
Blennow K., "Biomarkers in Alzheimer's disease drug development," Nat Med. (2010) 16: 1218-22.
Bodor et al., "Improved delivery through biological membranes VII. Dermal delivery of cromoglycic acid (cromolyn) via its prodrugs," International Journal of Pharmaceutics, 7(1):63- .75 (1980).
Bona, E. et al., "Chemokine and inflammatory cell response to hypoxia-ischemia in immature rats". Pediatr. Res. (1999) 45, 500-509.
Bot et al., "Perivascular mast cells promote atherogenesis and induce plaque destabilization in apolipoprotein E-deficient mice," Circulation, 115(19):2516-2525 (2007).
Breitner et al., "Extended results of the Alzheimer's disease anti-inflammatory prevention trial," Alzheimers Dement, 7(4):402-411 (2011).
Breitner, "Alzheimer disease: The changing view," Annals Neurol, 49(3):418-419 (2001).
Broe et al., "Anti-inflammatory drugs protect against Alzheimer disease at low doses," Arch Neurol, 57:1586-1591 (2000).
Buchhave et al., "Cerebrospinal fluid levels of β-amyloid 1-42, but not of tau, are fully changed already 5 to 10 years before the onset of Alzheimer dementia," Arch Gen Psychiatry. (2012) 69: 98-106.
Bulic et al., "Tau protein and tau aggregation inhibitors," Neuropharmacology, 59: 276-289 (2010).

Butovsky et al., "Identification of a unique TGF-β-dependent molecular and functional signature in microglia," Nat Neurosci, 17(3): 131-143 (2014).
Byron et al., "Selection and Validation of Cascade Impactor Test Methods," Respiratory Drug Delivery IX, 1: 169-178 (2004).
Bäckman et al., "Multiple Cognitive Deficits During the Transition to Alzheimer's Disease," Journal of Internal Medicine, (2004) 256(3): 195-204.
Cacabelos, "Donepezil in Alzheimer's disease: From conventional trials to pharmacogenetics," Neuropsychiatric Disease and Treatment 3(3):303-333 (2007).
Cairns et al., "Synthesis and Structure-Activity Relationships of Disodium Cromoglycate and Some Related Compounds," Journal of Medicinal Chemistry, 15(6):583-589 (1972).
Carlesimo et al., "Memory Deficits in Alzheimer's Patients: A Comprehensive Review," Neuropsychol Rev. (1992) 3(2): 119-169.
Certificate of Analysis for Lactohale LH 201, Alpha-Lactose Monohydrate EP and USP, Full Release (DFE Pharma); Jan. 18, 2016.
Chen et al., "Current experimental therapy for Alzheimer's Disease," Curr Neuropharmacol, 5(2): 127-134 (2007).
Cherry et al., "Neuroinflammation and M2 microglia: the good, the bad, and the inflamed," J Neuroinflammation, 11(98): 1-15 (2014).
Choi et al., "A three-dimensional human neural cell culture model of Alzheimer's disease," Nature, 515: 274-278 (2014).
Chow et al., "Investigation of Electrostatic Behavior of a Lactose Carrier for Dry Powder Inhalers," Pharmaceutical Research, 25(12): 2822-2834 (2008).
ClinicalTrials.gov. Phase 1 Study of ALZT-OP1 Combination Therapy in Normal Healthy Volunteers. Sponsor: AZTherapies, Inc. Identifier: NCT02482324. Retrieved Apr. 9, 2020 from: http://clinicaltrials.gov/ct/show/NCT02482324?order=1.
ClinicalTrials.gov. Safety and Efficacy of ALZT-OP1a as Adjuvant Treatment in Subjects With Post-Ischemic Stroke Cognitive Impairment (PSCI). Sponsor: AZTherapies, Inc. Identifier: NCT03202147. Retrieved Feb. 6, 2020, 2020 from: https://clinicaltrials.gov/ct2/show/NCT03202147?term=cromolyn&draw=3&rank=11.
ClinicalTrials.gov. Safety and Efficacy Study of ALZT-OP1 in Subjects With Evidence of Early Alzheimer's Disease (COGNITE). Sponsor: AZTherapies, Inc. Identifier: NCT02547818. Retrieved Apr. 9, 2020 from: https://clinicaltrials.gov/ct2/show/study/NCT02547818?term=AZTherapies&draw=2&rank=1.
ClinicalTrials.gov. Treatment of Acute Stroke With Cromolyn(Single Dose). Sponsor: Wolfson Medical Center. Identifier: NCT01175525. Retrieved Feb. 6, 2020 from: https://clinicaltrials.gov/ct2/show/NCT01175525.
Cole et al., "Mechanisms of action of non-steroidal anti-inflammatory drugs for the prevention of Alzheimer's disease," CNS Neurol Disord Drug Targets, 9(2):140-148 (2010).
Conti et al., "Induction of pro-inflammatory cytokines (IL-1 and IL-6) and lung inflammation by Coronavirus-19 (COVI-19 or SARS-CoV-2): anti-inflammatory strategies," J Biol Regul Homeost Agents, 34(2): 327-331 (2020).
Cowell, R.M et al., "Hypoxic-ischemic injury induces macrophage inflammatory protein-1 alpha expression in immature rat brain," Stroke (2002) 33,795-801.
Cox et al., "Disodium Cromoglycate (FPL 670) ('Intal'*): A Specific Inhibitor of Reaginic Antibody-Antigen Mechanisms," Nature, 216: 1328-1329 (1967).
Cruz M.P., "Edaravone (Radicava): A novel neuroprotective agent for the treatment of amyotrophic lateral sclerosis," P&T. (2018) 43(1):25-28.
Cummings, "Alzheimer's Disease," N Engl J Med, 351(1):56-67 (2004).
Das et al., "Importance of particle size and shape on the tensile strength distribution and de-agglomeration of cohesive powders," Powder Technology, 249: 297-303 (2013).
Davies, "Clinical pharmacokinetics of ibuprofen. The first 30 years," Clin Pharmacokinet, 34(2):101-154 (1998).
Deiana et al., "Methylthioninium Chloride Versus Rivastigmine and Their Co-Administration Efficacy in Reversing Scopolamine-

(56) References Cited

OTHER PUBLICATIONS

Induced Cognitive Deficits in a Pharmacological Mouse Model of Alzheimer's Disease," Alzheimer's and Dementia, 4(4, Supplement): T499 (2009).
Dello Russo et al., "The human microglial HMC3 cell line: where do we stand? A systematic literature review," J Neuroinflammation, 15: 259 (24 pages) (2018).
Denes, A. et al., "Proliferating resident microglia after focal cerebral ischaemia in mice," J. Cereb. Blood. Flow. Metab. (2007) 27, 1941-1953.
Desmond, D.W. et al., "Frequency and clinical determinants of dementia after ischemic stroke." Neurology (2000), 54, 1124-1131.
Dickson et al., "Diffuse Lewy body disease," Acta Neuropathol (Berl), 75: 8-15 (1987).
Doody et al., "Donepezil treatment of patients with MCI: a 48-week randomized, placebo-controlled trial," Neurology, 72(18):1555-1581 (2009).
Du et al., "Role of Microglia in Neurological Disorders and Their Potentials as a Therapeutic Target," Mol Neurobiol, 54: 7567-7584 (2017).
Dubbelaar et al., "The Kaleidoscope of Microglial Phenotypes," Front Immunol, 9: 1753 (2018).
Dunbar et al., "Dispersion and Characterization of Pharmaceutical Dry Powder Aerosols," Kona, 16:7-45 (1998).
Elmaleh, D. et al., "Evaluation of F-18 Radiolabeled Cromolyn as a Potential Aβ Polymerization Inhibitor and PET Tracer". Poster at *Human Amyloid Image (HAI) Conference*, Miami, Florida, Jan. 2014.
EPAR (European Public Assessment Report) Seebri Breezhaler: Retrieved online at <http://www.ema.europa.eu/ema/index.jsp?curl=pages/medicines/human/medicines/002430/human_med_001580.jsp&mid=WC0b01ac058001d124>: 6 pages (2012).
Etminan et al., "Effect of non-steroidal anti-inflammatory drugs on risk of Alzheimer's disease: systematic review and meta-analysis of observational studies," Brit Med J, 327:128-131 (2003).
European Search Report for EP Application No. 13848340 dated Feb. 11, 2016.
European Search Report for European Application No. 14819448.3 dated Feb. 2, 2017.
Extended European Search Report for EP Application No. 10736439.0 issued Jun. 12, 2012.
Extended European Search Report for EP Application No. 16867341.6 mailed Jun. 13, 2019.
Extended European Search Report for EP Application No. 17934303 mailed Aug. 13, 2021.
Extended European Search Report for EP Application No. 19786110.7 dated Mar. 7, 2022.
Extended European Search Report for EP Application No. 19830061.8 dated Mar. 11, 2022.
Extended European Search Report for EP Application No. 19857627.4 dated Aug. 8, 2022.
Extended European Search Report for EP Application No. 19895399.4 dated Oct. 27, 2022.
Extended European Search Report for EP Application No. EP 16869210 dated Sep. 19, 2019.
Extended European Search Report for EP Application No. EP 17847576 dated Jun. 30, 2020.
Extended European Search Report for EP Application No. EP 17918310 mailed Mar. 12, 2021.
Extended European Search Report for EP Application No. EP 19166810 dated Sep. 23, 2019.
Extended European Search Report for EP Application No. EP 19172666 dated Jan. 10, 2020.
Extended European Search Report, EP 14855211.0, dated May 29, 2017.
Fiala, M. et al., "IL-17A is increased in the serum and in spinal cord CD8 and mast cells of ALS patients," *J Neuroinflammation*. (2010) 7:76.
Findeis et al., "Design and testing of inhibitors of fibril formation," Methods Enzymol, 309:476-488 (1999).
Findeis et al., "Modified-peptide inhibitors of amyloid B-peptide polymerization," Biochemistry, 38(21):6791-6800 (1999).
Francesch et al., "Chronic inflammation (inflammaging) and its potential contribution to age-associated diseases," J Gerontol A Biol Sci Med Sci, 69(S1): S4-9 (2014).
Franzius, D., et al., "Non-specific effects of calcium entry antagonists in mast cells," *Pflugers Arch*. (1994) 428(5-6):433-438.
Gadani et al., "IL-4 in the brain: a cytokine to remember," J Immunol, 189(9): 4213-4219 (2012).
Galimberti et al., "Disease-modifying treatments for Alzheimer's disease," Ther Adv Neurol Disord, 4(4): 203-216 (2011).
Garmise, "Novel Dry Powder Preparations of Whole Inactivated Influenza Virus for Nasal Vaccination," Dissertation, University of North Carolina at Chapel Hill (2007).
Garringer et al., "Modeling familial British and Danish dementia", Brain Struct Funct 214(2-3): 235-244 (2010).
Gasparini et al., "Non-steroidal anti-inflammatory drugs (NSAIDs) in Alzheimer's disease: old and new mechanisms of action," J Neurochem, 91(3):521-536 (2004).
Ghasemi. M. and Brown. R.H. Jr. "Genetics of amyotrophic lateral sclerosis," *Cold Spring Harb. Perspect. Med.* (2018) 8(5).
Gilani et al., "Influence of Formulation Variables and Inhalation Device On the Deposition Profiles of Cromolyn Sodium Dry Powder Aerosols," Daru 12(3):123-130 (2004).
Gilead Announces Approval of Veklury (remdesivir) in Japan for Patients With Severe COVID-19. The press release of Gilead Sciences. May 7, 2020. URL: < https://www.gilead.com/news-and-press/press-room/press-releases/2020/5/gilead-announces-approval-of-veklury-remdesivir-in-japan-for-patients-with-severe-covid19>. Retrieved on Jul. 14, 2021.
Gomperts et al., "Imaging amyloid deposition in Lewy body disease," Neurology, 71(12): 903-910 (2008).
Gorelick, P. et al., "Vascular Contributions to Cognitive Impairment and Dementia, A Statement for Healthcare Professionals from the American Heart Association/American Stroke Association," *Stroke* (2011) 42, 2672-2713.
Gosselin et al., "An environment-dependent transcriptional network specifies human microglia identity," Science, 356: eaal3222 (2017).
Granucci et al., "Cromolyn sodium delays disease onset and is neuroprotective in the SOD1G93A Mouse Model of amyotrophic lateral sclerosis," Sci Rep, 9: 17728 (17 pages) (2019).
Granucci et al., "Inducible IL-2 production by dendritic cells revealed by global gene expression analysis," Nat Immunol, 2(9): 882-888 (2001).
Greenhalgh et al., "Immune cell regulation of glia during CNS injury and disease," Nat Rev Neurosci, 21: 139-152 (2020).
Grenier et al., "Three-dimensional modeling of human neurodegeneration: brain organoids coming of age," Mol Psychiatry, 25: 254-274 (2020).
Griffin, "What causes Alzheimer's?" The Scientist, 25:36-40 (2011).
Grundman et al., "Mild cognitive impairment can be distinguished from Alzheimer disease and normal aging for clinical trials," Arch. Neurol. (2004) 61(1): 59-66.
Guchardi et al., "Influence of fine lactose and magnesium stearate on low dose dry powder inhaler formulations," International Journal of Pharmaceutics 348:10-17 (2008).
Gudesblatt et al., "Hexosaminidase A activity and amyotrophic lateral sclerosis," Muscle and Nerve, II: 227-230 (1988).
Guo et al., "Comparison of Delivery Characteristics from a Combination Metered-Dose Inhaler Using the Andersen Cascade Impactor and the Next Generation Pharmaceutical Impactor," J Pharm Sci, 97(8): 3321-3334 (2008).
Guo, J. et al., "Evaluating the levels of CSF and serum factors in ALS," *Brain Behav*. (2017) 7:e00637.
Gwin et al., "Cromolyn sodium in the treatment of asthma associated with aspirin hypersensitivity and nasal polyps," Chest, 72(2):148-153 (1977).
Haass et al., "Soluble protein oligomers in neurodegeneration: lessons from the Alzheimer's amyloid [beta]-peptide," Nat Rev Mol Cell Biol, 8(2):101-112 (2007).
Hallenbeck, J.M. "The many faces of tumor necrosis factor in stroke". Nat Med (2002) 8, 1363-1368.

(56) References Cited

OTHER PUBLICATIONS

Han et al., "The therapeutic effects of sodium cromoglycate against influenza A virus H5N1 in mice," Influenza and Other Respiratory Viruses, 10(1): 57-66 (2015).
Hashimoto et al., "Apolipoprotein E, especially apolipoprotein E4, increases the oligomerization of amyloid β peptide," J Neurosci, 32(43):15181-15192 (2012).
He et al., "Progress of Inhaled Devices for Asthma," Journal of Applied Clinical Pediatrics, 22(4):309-311 (2007).
Hemonnot et al., "Microglia in Alzheimer Disease: Well-Known Targets and New Opportunities," Front Aging Neurosci, 11:233(20 pages) (2019).
Heneka et al., "Acute treatment with the PPARγ agonist pioglitazone and ibuprofen reduces glial inflammation and Aβ1-42 levels in APPV7171 transgenic mice," Brain, 128:1442-1453 (2005).
Hensley, "Neuroinflammation in Alzheimer's Disease: Mechanisms, Pathologic Consequences, and Potential for Therapeutic Manipulation," J Alzheimers Dis, 21(1):1-14 (2010).
Hirouchi, "Current status and perspectives on the development of therapeutic agents for Alzheimer's disease," Nihon Yakurigaku Zasshi, 123(6):421-427 (2004).
Holian et al., "Mechanistic aspects of cromolyn sodium action on the alveolar macrophage: inhibition of stimulation by soluble agonists," Agents Actions, 33: 318-325 (1991).
Hoozemans et al., "Soothing the inflamed brain: effect of non-steroidal anti-inflammatory drugs on Alzheimer's disease pathology," CNS Neurol Disord Drug Targets, 10(1):57-67 (2011).
Hopperton et al., "Markers of microglia in post-mortem brain samples from patients with Alzheimer's disease: a systematic review," Mol Psychiatry, 23: 177-198 (2018).
Hori et al., "A Food and Drug Administration-approved asthma therapeutic agent impacts amyloid beta in the brain in a transgenic model of Alzheimer disease," J Biol Chem, 290(4): 1966-1978 (2015).
Hu et al., "Increased peripheral blood inflammatory cytokine levels in amyotrophic lateral sclerosis: a meta-analysis study," Scientific Reports, 7: Article No. 9094 (2017).
Huang et al., "Acute stress induces cardiac mast cell activation and histamine release, effects that are increased in Apolipoprotein E knockout mice.," Cardiovasc Res, 55(1):150-160 (2002).
Huang et al., "Stress-induced interleukin-6 release in mice is mast cell-dependent and more pronounced in Apolipoprotein E knockout mice," Cardiovasc Res, 59(1):241-249 (2003).
Ihle-Hansen, H. et al., "Incidence and subtypes of MCI and dementia 1 year after first-ever stroke in patients without pre-existing cognitive impairment," *Dement. Geriatr. Cogn. Disord.* (2011) 32, 401-407.
Ilieva, H., et al., "Non-cell autonomous toxicity in neurodegenerative disorders: ALS and beyond," *J. Cell Biol.* (2009) 187(6):761-772.
Imbimbo et al., "Are NSAIDs useful to treat Alzheimer's disease or mild cognitive impairment?," Front Aging Neurosci, 2(19):1-14 (2010).
Imbimbo, "An update on the efficacy of non-steroidal anti-inflammatory drugs in Alzheimer's disease," Expert Opinion on Investigational Drugs, 2009; 18(8), pp. 1147-1168.
InnoPharmalabs, "Particle Size Distribution", Apr. 9, 2013 (Apr. 9, 2013).
Intal Approval Package, Center for Drug Evaluation and Research, application 75-175, pp. 1-5 (Dec. 12, 1997).
Intal® Nebulizer Solution (Label 2016): Retrieved online at <http://labeling.pfizer.com/ShowLabeling.aspx?id=833>: 4 pages (2016).
International Preliminary Report on Patentability for International Application No. PCT/US2019/040247 dated Jan. 14, 2021.
International Search Report and Written Opinion for International Application No. PCT/US16/63143 mailed Feb. 6, 2017.
International Search Report and Written Opinion for International Application No. PCT/US16/63462 mailed Feb. 1, 2017.
International Search Report and Written Opinion for International Application No. PCT/US17/65727 mailed Feb. 12, 2018.
International Search Report and Written Opinion for International Application No. PCT/US19/49733 dated Jan. 13, 2020.
International Search Report and Written Opinion for International Application No. PCT/US2010/022495 dated Nov. 10, 2010.
International Search Report and Written Opinion for International Application No. PCT/US2014/061694 dated Jan. 2, 2015.
International Search Report and Written Opinion for International Application No. PCT/US2017/049702 dated Dec. 26, 2017.
International Search Report and Written Opinion for International Application No. PCT/US2019/026521 dated Jun. 14, 2019.
International Search Report and Written Opinion for International Application No. PCT/US2019/040247 dated Sep. 20, 2019.
International Search Report and Written Opinion for International Application No. PCT/US2021/025746 mailed Jun. 17, 2021.
International Search Report and Written Opinion for International Application No. PCT/US2021/035936 dated Jul. 22, 2021.
International Search Report and Written Opinion for International Application No. PCT/US2021/065200 dated Mar. 24, 2022.
International Search Report and Written Opinion for International Application No. PCT/US19/65384 dated Mar. 31, 2020.
International Search Report for International Application No. PCT/US2013/066069 mailed Mar. 13, 2014.
International Search Report for International Application No. PCT/US14/39118 dated Sep. 18, 2014.
Jellinger, K.A., "Alzheimer disease and cerebrovascular pathology: an update". *J. Neural. Transm.* (2002) 109, 813-836.
Jin et al., "Mast cells are early responders after hypoxia-ischemia in immature rat brain," Stroke, 40(9):3107-3112 (2009).
Jin, R. et al., "Inflammatory mechanisms in ischemic stroke: role of inflammatory cells," *J Leukoc Biol* (2010) 87, 779-789.
Jin, Y. et al., "Mast cell stabilization limits hypoxic-ischemic brain damage in the immature rat". *Dev Neurosci.* (2007) 29, 373-384.
Jurga et al., "Overview of General and Discriminating Markers of Differential Microglia Phenotypes," Front Cell Neurosci, 14: 198 (18 pages) (2020).
Kamiya., "Characteristics and problems of cascade impactors in the evaluation of inhaled preparations," Journal of Pharmaceutical Science and Technology, Japan, 65(4): English Machine Translation (5 pages)(2005).
Karadsheh, "Rapid response to: Covid-19: what treatments are being investigated?" BMJ (4 pages) (2020).
Karran et al., "The amyloid cascade hypothesis for Alzheimer's disease: an appraisal for the development of therapeutics," Nat Rev, 10(9):698-712 (2011).
Kaur et al., "Drug Therapy in Stroke: From Preclinical to Clinical Studies," Pharmacology, 92:324-334 (2013).
Kay et al., "Disodium cromoglycate inhibits activation of human inflammatory cells in vitro," J Allergy Clin Immunol, 80(1): 1-8 (1987).
Keizman D. et al. Low-grade systemic inflammation in patients with amyotrophic lateral sclerosis. *Acta Neurol Scand.* (2009) 119:383-389.
Keller et al., "Have inadequate delivery systems hampered the clinical success of inhaled disodium cromoglycate? Time for reconsideration," Exp Opin Drug Deliv, 8(1):1-17 (2011).
Kelley et al., "The molecular role of mast cells in atherosclerotic cardiovascular disease," Mol Med Today, 6:304-308 (2000).
Kilpatrick et al., "Cromolyn inhibits assembly of the NADPH oxidase and superoxide anion generation by human neutrophils," *The Journal of Immunology*, 154(7): 3429-3436 (1995).
Knowles, "Donepezil in Alzheimer's disease: an evidence-based review of its impact on clinical and economic outcomes," Core Evid, 1(3):195-219 (2006).
Kohman et al., "Neurogenesis, inflammation and behavior," Brain Behav Immun, 27C:22-32 (2013).
Kondo et al., "iPSC-Based Compound Screening and In Vitro Trials Identify a Synergistic Anti-amyloid β Combination for Alzheimer's Disease," Cell Rep, 21: 2304-2312 (2017).
Koo et al., "Amyloid diseases: Abnormal protein aggregation in neurodegeneration, " PNAS, 96:9989-9990 (1999).
Kotilinek et al., "Cyclooxygenase-2 inhibition improves amyloid-β-mediated suppression of memory and synaptic plasticity," Brain, 131(3):651-664 (2008).

(56) References Cited

OTHER PUBLICATIONS

Koudstaal et al., "Secondary Stroke Prevention in Atrial Fibrillation: Indications, Risks, and Benefits," J Thromb Thrombolys, 7(1):61-65 (1999).
Krstic et al., "Deciphering the mechanism underlying late-onset Alzheimer disease," Nat Rev Neurol, 9:25-34(2013).
Krueger, M. et al., "Blood-brain barrier breakdown involves four distinct stages of vascular damage in various models of experimental focal cerebral ischemia," J. Cereb. Blood Flow Metab. (2015), 35, 292-303.
Kuhle, J. et al., Increased levels of inflammatory chemokines in amyotrophic lateral sclerosis, Eur J Neurol. (2009) 16:771-774.
Kumon et al., "Application and Mechanism of Inhalation Profile Improvement of DPI Formulations by Mechanofusion with Magnesium Stearate," Chemical and Pharmaceutical Bulletin, 56(5): 617-625 (2008).
Kwong et al., "Comparison of Nebulized Particle Size Distribution with Malvern Laser Diffraction Analyzer Versus Andersen Cascade Impactor and Low-Flow Marple Personal Cascade Impactor," J Aerosol Med, 13(4): 303-314 (2000).
Lalancette-Hébert, M. et al., "Selective ablation of proliferating microglial cells exacerbates ischemic injury in the brain," J Neurosci (2007) 27, 2596-2605.
Lanari, et al., "Cerebrospinal fluid biomarkers and prediction of conversion in patients with mild cognitive impairment: 4-year follow-up in a routine clinical setting," Scientific World Journal. (2009) 9: 961-6.
Lanz et al., "The γ-Secretase Inhibitor N-[N-(3,5-Difluorophenacetyl)-L-alanyl]-S-phenylglycine t-butyl Ester Reduces Aβ Levels in Vivo in Plasma and Cerebrospinal Fluid in Young (Plaque-Free) and Aged (Plaque-Bearing) Tg2576 Mice," The Journal of Pharmacology and Experimental Therapeutics, 305(3):864-871 (2003).
Lasiene, J and Yamanaka, K., "Glial cells in amyotrophic lateral sclerosis," Neurol Res Int. (2011) 2011: Article ID 718987.
Lee, P.H. et al., "Circulating beta amyloid protein is elevated in patients with acute ischemic stroke". J. Neural. Transm. (Vienna). (2005) 112, 1371-9.
Lehman, L.L. and Rivkin, M.J., "Perinatal arterial ischemic stroke: Presentation, risk factors, evaluation, and outcome". Pediatr. Neurol. (2014) 51, 760-768.
Lewis et al., "Quantification of Alzheimer pathology in aging and dementia: age-related accumulation of amyloid-β (42) peptide in vascular dementia," Neuropathology and Applied Neurobiology, 32(2): 103-118 (2006).
Li et al., "TREM2 regulates innate immunity in Alzheimer's disease," J Neuroinflammation, 15: 107 (7 pages) (2018).
Libby, "Inflammation in atherosclerosis," Nature, 420(6917):868-874 (2002).
Lim et al., "Ibuprofen Suppresses Plaque Pathology and Inflammation in a Mouse Model of Alzheimer's Disease," The Journal of Neuroscience 20(15):5709-5714 (2000).
Liu et al., "Elevated Levels of IFN-γ in CSF and Serum of Patients with Amyotrophic Lateral Sclerosis," Plos One, 10(9): 11 pages (2015).
Liu, Y.H. et al, "Aβ is predictive for short-term neurological deficits after acute ischemic stroke". Neurotox Res. (2015) 27, 292-299.
Lobo-Silva et al., "Balancing the immune response in the brain: IL-10 and its regulation," J Neuroinflammation, 13: 297 (10 pages) (2016).
Loeb et al., "A randomized, controlled trial of doxycycline and rifampin for patients with Alzheimer's disease," J Am Geriatr Soc, 52(3): 381-7 (2004).
Mackenzie et al., "Nonsteroidal anti-inflammatory drug use and Alzheimer-type pathology in aging," Neurology, 50(4):986-990 (1998).
Madureira, S. et al., "Dementia and cognitive impairment three months after stroke". Eur J Neurol (2001) 8, 621-627.

Mandel, "CERE-110, an adeno-associated virus-based gene delivery vector expressing human nerve growth factor for the treatment of Alzheimer's disease," Curr Opin Mol Ther, 12(2): 240-247 (2010).
Marinkovic et al., "Evolution of Intracerebral Hemorrhage after Intravenous Tpa: Reversal of Harmful Effects with Mast Cell Stabilization," J Cerebr Blood F Met, 34(1):176-181 (2014).
Mash et al., "Loss of M2 muscarine receptors in the cerebral cortex in Alzheimer's disease and experimental cholinergic denervation," Science, 228(4703):1115-1117 (1985).
Material Safety Data Sheet Cromolyn Sodium: Retrieved online at<https://www.biobasic.com/amfilerating/file/download/file_id/24861/http://www.alli.wnyric.org/District/Documents/msds/files/cjx/cjxjy.html>: 5 pages (2017).
Mattson, M.P. et al., "Cellular signaling roles of TGFβ, TNF α and β APP in brain injury responses and Alzheimer's disease". Brain Res. Brain Res. Rev. (1997) 23, 47-61.
McArthur et al., "Annexin A1: a central player in the anti-inflammatory and neuroprotective role of microglia," J Immunol 185: 6317-6328 (2010).
McGeer et al. "Targeting microglia for the treatment of Alzheimer's disease," Expert Opin Ther Targets 19: 497-506 (2015).
McKittrick et al., "Mast Cells Promote Blood Brain Barrier Breakdown and Neutrophil Infiltration in a Mouse Model of Focal Cerebral Ischemia," J Cerebr Blood F Met, 35(4):638-647 (2015).
McLaurin et al., "Cyclohexanehexol inhibitors of Aβ aggregation prevent and reverse Alzheimer phenotype in a mouse model," Nat Med, 12(7):801-808 (2006).
Mitchell et al., "Aerodynamic Particle Size Analysis of Aerosols from Pressurized Metered-Dose Inhalers: Comparison of Andersen 8-Stage Cascade Impactor, Next Generation Pharmaceutical Impactor, and Model 3321 Aerodynamic Particle Sizer Aerosol Spectrometer," AAPS PharmSciTech, 4(4): Article 54 (2003).
Mohammed et al., "Effect of Sampling vol. on Dry Powder Inhaler (DPI)-Emitted Aerosol Aerodynamic Particle Size Distributions (APSDs) Measured by the Next-Generation Pharmaceutical Impactor (NGI) and the Andersen Eight-Stage Cascade Impactor (ACI)," APPS PharmSciTech, 13(3): 875-882 (2012).
Monge-Argilés et al. "Biomarkers of Alzheimer's disease in the cerebrospinal fluid of Spanish patients with mild cognitive impairment," Neurochem Res. (2011) 36: 986-993.
Mor et al., "Mast cells and atherosclerosis," Israel Med Assoc J, 3:216-221 (2001).
Moreau C. et al. Elevated IL-6 and TNF-alpha levels in patients with ALS: inflammation or hypoxia. Neurology. (2005) 65:1958-1960.
Morihara et al., "Ibuprofen Suppresses Interleukin-1β Induction of Pro-Amyloidogenic α1-Antichymotrypsin to Ameliorate β-Amyloid (Aβ) Pathology in Alzheimer's Models," Neuropsychopharmacology 30:1111-1120 (2005).
Moss et al., "The absorption and clearance of disodium cromoglycate from the lung in rat, rabbit, and monkey," Toxicol Appl Pharmacol, 17(3):699-707 (1970).
Mrak et al., Common Inflammatory Mechanisms in Lewy Body Disease and Alzheimer Disease, J Neuropathol Exp Neurol, 66(8): 683-686 (2007).
Murphy, "Cromolyn sodium: basic mechanisms and clinical usage," Pediatric Asthma, Allergy, and Immunology, 2(4):237-254 (1988).
Müller et al., "Fluorine in Pharmaceuticals: Looking Beyond Intuition," Science, 317: 1881 (2007).
Nagamoto-Combs et al., "Microglial phenotype is regulated by activity of the transcription factor, NFAT (nuclear factor of activated T cells)," J Neurosci, 30(28): 9641-9646 (2010).
Nagoshi, N. et al., "Riluzole as a neuroprotective drug for spinal cord injury: from bench to bedside," Molecules. (2015) 20(5):7775-7789.
Nakajima, K. and Kohsaka, S., "Microglia: activation and their significance in the central nervous system," J Biochem (2001) 130, 169-175.
Neale et al., "The pharmacokinetics of sodium cromoglycate in man after intravenous and inhalation administration," Br J Clin Pharmacol, 22:373-382 (1986).

(56) References Cited

OTHER PUBLICATIONS

Netzer et al., "The actual role of sodium cromoglycate in the treatment of asthma-a critical review," Sleep Breath, 16:1027-1032 (2012).

Newman et al., "Evolution of dry powder inhaler design, formulation, and performance," Respiratory Medicine, 96(5): 293-304 (2002).

Newman et al., "Therapeutic Aerosols 1—Physical and Practical Considerations," Thorax, 38(12): 881-886 (1983).

Nihashi, T. et al., "Expression and distribution of beta amyloid precursor protein and beta amyloid peptide in reactive astrocytes after transient middle cerebral artery occlusion," *Acta Neurochir (Wien)*. (2001) 143, 287-295.

Noristani et al., "RNA-Seq Analysis of Microglia Reveals Time-Dependent Activation of Specific Genetic Programs following Spinal Cord Injury," Front Mol Neurosci, 10: 90 (16 pages) (2017).

Nys, G.M. et al., "Restrictions of the Mini-Mental State Examination in acute stroke." *Arch Clin Neuropsychol* (2005) 20, 623-629.

Obici et al., "AA amyloidosis: basic knowledge, unmet needs and future treatments," Swiss Medical Weekly, 142:w13580 (2012).

Omer et al., "Comparison between the next generation impactor and the twin glass impinge as model pulmonary drug delivery devices," Zanco J. Med. Sci., 23(1): 74-80 (2019).

Onderdijk et al., "IL-4 Downregulates IL-1β and IL-6 and Induces GATA3 in Psoriatic Epidermal Cells: Route of Action of a Th2 Cytokine," J Immunol, 195: 1744-1752 (2015).

Ono et al., "Push-pull benzothiazole derivatives as probes for detecting β-amyloid plaques in Alzheimer's brains," Bioorg Med Chem, 17(18):7002-7007 (2009).

Onodera et al., "Appropriate Administration Setting and Efficacy Evaluation in Clinical Trials (Phase I to III Clinical Trials) for the Development of New Drugs," Science & Technology Co., Ltd., 1st Edition, p. 100-101.

Orr et al., "A Brief Overview of Tauopathy: Causes, Consequences, and Therapeutic Strategies," Trends in Pharmacological Sciences, 38(7): 637-648 (2017).

Package Insert Intal® (Label 2003): Retrieved online at http://www.accessdata.fda.gov/drugsatfda_docs/label/2004/18887slr020_intal_lbl.pdf.

Palacios et al., "The pharmacological assessment of RS 86 (2-ethyl-8-methyl-2,8-diazaspiro-[4,5]-decan-1,3-dion hydrobromide). A potent, specific muscarinic acetylcholine receptor agonist," Eur J Pharmacol, 125(1):45-62 (1986).

Panza et al., "Emerging drugs to reduce abnormal [beta]-amyloid protein in Alzheimer's disease patients," Expert Opin Emerging Drugs, 21(4):377-391 (2016).

Panza et al., "Immunotherapy for Alzheimer's Disease: From anti-β-amyloid to tau-based Immunization strategies," Immunotherapy, 4(2):213-238 (2012).

Parajuli et al., "CCL11 enhances excitotoxic neuronal death by producing reactive oxygen species in microglia," Glia, 63: 2274-2284 (2015).

Parameswaran et al., "Tumor necrosis factor-α signaling in macrophages," Crit Rev Eukaryot Gene Expr, 20(2): 87-103 (2010).

Parepally et al., "Brain uptake of nonsteroidal anti-inflammatory drugs: ibuprofen, flurbiprofen, and indomethacin," Pharm Res, 23(5):873-881 (2006).

Park, J.H. et al., "Pathogenesis of cerebral microbleeds: In vivo imaging of amyloid and subcortical ischemic small vessel disease in 226 individuals with cognitive impairment". *Ann. Neurol.* (2013) 73, 584-593.

Parrella, E. et al., "The Role of Mast Cells in Stroke," *Cells* 8.5 (2019), 437 (22 pages).

Partial European Search Report for EP Application No. 19786110.7 dated Dec. 2, 2021.

Partial European Search Report for EP Application No. 19857627.4 dated May 2, 2022.

Partial European Search Report for EP Application No. 19895399.4 dated Jul. 26, 2022.

Pasqualetti et al., "The Role of Neuroinflammation in Dementias" Current Neurology and Neuroscience, 15(4): 1-11 (2015).

Patkai, J. et al., "Deleterious effects of IL-9-activated mast cells and neuroprotection by antihistamine drugs in the developing mouse brain," Pediatr. Res. (2001) 50, 222-230.

Petersen et al., "Neuropathologic features of amnestic mild cognitive impairment," Arch. Neurol. (2006) 63 (5): 665-672.

Petersen et al., "Vitamin E and donepezil for the treatment of mild cognitive impairment," N Engl J Med, 352(23):2379-2388 (2005).

Petersen R.C., "The Current Status of Mild Cognitive Impairment—What Do We Tell Our Patients?" Nat. Clin. Pract. Neurol., (2007) 3(2): 60-61.

Petersen, et al., "Mild cognitive impairment: clinical characterization and outcome," Arch. Neurol., (1999) 56 (3): 303-308.

Philips T. and Robberecht W. "Neuroinflammation in amyotrophic lateral sclerosis: role of glial activation in motor neuron disease". *Lancet Neurol.* (2011) 10(3):253-263.

Pluta, R. et al., "Brain ischemia activates β- and γ-secretase cleavage of amyloid precursor protein: significance in sporadic Alzheimer's disease," *Mol Neurobiol.* (2013) 47, 425-434.

Pratico, "Alzheimer's disease and non-steroidal anti-inflammatory drugs: Old therapeutic tools with novel mechanisms of action?" Current Medicinal Chemistry—Central Nervous System Agents 5(2):111-117 (2005).

PubChem CID: 27503, "Cromolyn sodium", Created Jun. 24, 2005. Retreived from the Internet < URL: https://pubchem.ncbi.nlm.nih.gov/compound/Cromolyn-sodium>.

PubChem CID:204318, "Diethyl Cromoglycate," Created Aug. 9, 2005. Retreived from the Internet <URL: https://pubchem.ncbi.nlm.nih.gov/compound/204318>.

Péhourcq et al., "Diffusion of arylpropionate non-steroidal anti-inflammatory drugs into the cerebrospinal fluid: a quantitative structure-activity relationship approach," Fundamental and Clinical Pharmacology, 18(1):65-70 (2004).

Radicava (edaravone) US Prescribing Information. Jersey City, New Jersey: MT Pharma America, Inc; May 2017.

Raivich, G. et al., "Neuroglial activation repertoire in the injured brain: graded response, molecular mechanisms and cues to physiological function". *Brain Res. Brain Res. Rev.* (1999) 30, 77-105.

Ramos et al., "Mast Cell Stabilization Improves Survival by Preventing Apoptosis in Sepsis," The Journal of Immunology, 185: 709-716 (2010).

Reagan-Shaw et al., "Dose Translation from Animal to Human Studies Revisited," The FASEB, 22: 659-661 (2007).

Renton. A.E. et al., "State of play in amyotrophic lateral sclerosis genetics," *Nat. Neurosci.* (2014) 17:17-23.

Reverchon et al., "Production of Cromolyn Sodium Microparticles for Aerosol Delivery by Supercritical Assisted Atomization," AAPS PharmSciTech 8(4), Article 114 (2007).

Richards et al., "Absorption and disposition kinetics of cromolyn sodium and the influence of inhalation technique," J Pharmacol Exp Ther, 241(3):1028-1032 (1987).

Richards et al., "Neurodegenerative diseases have genetic hallmarks of autoinflammatory disease," Hum Mol Genet, 27(R2): R108-R118 (2018).

Rilutek (riluzole) Tablets: US prescribing information. Cary, NC, USA: Covis Pharmaceuticals, Inc; 1995. (Revised Apr. 2016).

Roberts et al., "Next Generation Pharmaceutical Impactor (A New Impactor for Pharmaceutical Inhaler Testing). Part I: Design," Journal of Aerosol Medicine, 16(3): 283-299 (2003).

Romanin. C., et al., "Immunologically activated chloride channels involved in degranulation of rat mucosal mast cells," *EMBO J.* (1991) 10(12):3603-3608.

Rosen et al., "Mutations in Cu/Zn superoxide dismutase gene are associated with familial amyotrophic lateral sclerosis," *Nature*, 362: 59-62 (1993).

Rothwell, N. et al., "The role of interleukin 1 in acute neurodegeneration and stroke: pathophysiological and therapeutic implications," *J Clin Invest* (1997) 100, 2648-2652.

Rousselet et al., "Mouse Model of Intraluminal MCAO: Cerebral Infarct Evaluation by Cresyl Violet Staining," J Vis Exp, 69:e4038 (2012).

(56) References Cited

OTHER PUBLICATIONS

Sabbagh et al., "Latrepirdine, a potential novel treatment for Alzheimer's disease and Huntington's chorea," Curr Opin Investig Drugs, 11(1): 80-91 (2010).
Saleh I.A. et al. Evaluation of humoral immune response in adaptive immunity in ALS patients during disease progression. *J Neuroimmunol.* (2009) 215:96-101.
Sandoval, K.E., and Witt, K.A., "Blood-brain barrier tight junction permeability and ischemic stroke". *Neurobiology of Disease* (2008) 32, 200-219.
Sawada et al., "Induction of functional interleukin-2 receptor in mouse microglia," J Neurochem, 64: 1973-1979 (1995).
Schilling, M. et al., "Microglial activation precedes and predominates over macrophage infiltration in transient focal cerebral ischemia: a study in green fluorescent protein transgenic bone marrow chimeric mice". *Exp Neurol* (2003) 183, 25-33.
Schnabel, J. "Early Results of Alzheimer's Passive Vaccine Trial Mixed," http://www.dana.org/News/Details.aspx?id=42815 printed Jan. 19, 2017, pp. 1-3 (2008).
Schneider et al., "Current Alzheimer's disease clinical trials: methods and placebo outcomes," Alzheimers Dement, 5(5):388-397 (2009).
Selkoe, D.J., "Alzheimer's disease: genes, proteins, and therapy," *Physiol Rev.* (2001) 81, 741-766.
Shah et al., "The role of fluorine in medicinal chemistry," J Enzyme Inhib Med Chem, 22(5): 527-540 (2007).
Shalash et al., "The Relationship Between the Permeability and the Performance of Carrier-Based Dry Powder Inhalation Mixtures: New Insights and Practical Guidance," AAPS PharmSciTech, 19(2): 912-922 (2017).
Sheng et al., "Tumor necrosis factor alpha upregulates human microglial cell production of interleukin-10 in vitro," Clin Diagn Lab Immunol, 2(5): 604-608 (1995).
Shin et al., "Interpretation of Animal Dose and Human Equivalent Dose for Drug Development," Journal of Korean Oriental Medicine, 31(3):1-7 (2010).
Shoup et al., "Evaluation of fluorinated cromolyn derivatives as potential therapeutics for Alzheimer's DISEASE," Journal of Alzheimer's Disease, 80(2): 775-786 (2021).
Shoup et al., "Fluorinated Cromolyn Derivatives for Potential Alzheimer's Disease Treatment," J Nucl Med 60, 114 (2019).
Shur et al., "From single excipients to dual excipient platforms in dry powder inhaler products," International Journal of Pharmaceutics, 514: 374-383 (2016).
Silverstein, F.S. et al., "Cytokines and perinatal brain injury". Neurochem Int (1997) 30, 375-383.
Sinniah et al., "The Anti-allergic Cromones: Past, Present, and Future," Front Pharmacol, 8:827 (10 pages) (2017).
Sousa et al., "Cellular and Molecular Characterization of Microglia: A Unique Immune Cell Population," Front Immunol, 8(198): 1-18 (2017).
Stages of ALS, ALS Association Texas Chapter, Retrieved online <https://www.alstexas.org/understanding-als/stages/>: 4 pages (2019).
Steckel et al., "In-situ-micronization of disodium cromoglycate for pulmonary delivery," European Journal of Pharmaceutics and Biopharmaceutics, 55: 173-180 (2003).
STN database CAS RN: 16110-51-3 (Nov. 16, 1984).
Strbian et al., "Cerebral mast cells regulate early ischemic brain swelling and neutrophil accumulation," *J. Cereb. Blood Flow Metab.* 26:605-612 (2006).
Strbian et al., "Mast Cell Stabilization Reduces Hemorrhage Formation and Mortality After Administration of Thrombolytics in Experimental Ischemic Stroke," Circulation, 116(4):411-418 (2007).
Strbian, D. et al., "An emerging role of mast cells in cerebral ischemia and hemorrhage," *Ann Med* (2009) 41, 438-450.
Strbian, D. et al., "Mast cell blocking reduces brain edema and hematoma volume and improves outcome after experimental intracerebral hemorrhage," *J. Cereb. Blood Flow Metab.* (2007) 27, 795-802.
Strejan et al., "Suppression of chronic-relapsing experimental allergic encephalomyelitis in strain-13 guinea pigs by administration of liposome-associated myelin basic protein," J Neuroimmunol, 7(1):27-41 (1984).
Subramaniam et al., "Targeting Microglial Activation States as a Therapeutic Avenue in Parkinson's Disease," Front Aging Neurosci, 9(176): 1-18 (2017).
Sun et al., "Fluorinated molecules as drugs and imaging agents in the CNS," Curr Top Med Chem, 6(14): 1457-1464 (2006).
Sun et al., "Mast cells promote atherosclerosis by releasing proinflammatory cytokines," Nat Med, 13(6):719-724 (2007).
Sun et al., "Synthesis of scyllo-inositol derivatives and their effects on amyloid beta peptide aggregation," Bioorganic & Medicinal Chemistry 16:7177-7184 (2008).
Sun, J.H. et al., "Post-stroke cognitive impairment: epidemiology, mechanisms and management," *Ann Transl Med* (2014) 2(8): 80 (16 pages).
Sunderland et al., "Decreased beta-amyloid1-42 and increased tau levels in cerebrospinal fluid of patients with Alzheimer disease," JAMA. (2003) 289: 2094-103.
Szabo, K. et al., "Hippocampal lesion patterns in acute posterior cerebral artery stroke: clinical and MRI findings," *Stroke* (2009) 40, 2042-2045.
Tabert, et al., "Neuropsychological prediction of conversion to Alzheimer disease in patients with mild cognitive impairment," Arch Gen Psychiatry. (2006) 63(8): 916-924.
Takano et al., "OSF4-J-2 Disodium cromoglicate inhibits gene expression of inflammation-related cytokines in lungs of septic mice," Journal of Pharmacological Sciences; Joint Symposium of the Japanese Society of Clinical Pharmacology and Therapeutics and The Japanese Pharmacological Society, 115(Supp.1): 102P (2011).
Tanaka, R. et al., "Migration of enhanced green fluorescent protein expressing bone marrow- derived microglia/macrophage into the mouse brain following permanent focal ischemia," *Neuroscience* (2003) 117, 531-539.
Taverni et al., "Donepezil medicated memory improvement in traumatic brain injury during post acute rehabilitation," Brain Inj, 12(1):77-80 (1998).
Thal et al., "A Randomized, Double-Blind, Study of Rofecoxib in Patients with Mild Cognitive Impairment," Neuropsychopharmacology (2005) 30: 1204-1215.
Thal et al., "Frontotemporal lobar degeneration FTLD-tau: Preclinical lesions, vascular and Alzheimer-related co-pathologies", J Neural Transm (Vienna), 122(7): 1007-1018 (2015).
Thériault et al., "The dynamics of monocytes and microglia in Alzheimer's disease," Alzheimer's Res Ther, 7:41 (10 pages) (2015).
Tiglutik (riluzole) oral suspension: US prescribing information. Berwyn, Pa, USA: ITF Pharma, Inc; 1995 (Revised Sep. 2018).
Trias et al., "Phenotypic transition of microglia into astrocyte-like cells associated with disease onset in a model of inherited ALS," Front Cell Neurosci, 7:274 (8 pages) (2013).
Trias, E., et al., "Significance of aberrant glial cell phenotypes in pathophysiology of amyotrophic lateral sclerosis," *Neurosci. Lett.* (2017) 636: 27-31.
Tronde et al., "Pulmonary absorption rate and bioavailability of drugs in vivo in rats: structure-absorption relationships and physicochemical profiling of inhaled drugs," J Pharm Sci, 92(6):1216-1233 (2003).
Upadhyaya, P. et al., "Therapy of Alzheimer's disease: An update," African Journal of Pharmacy and Pharmacology 4(6):408-421 (2010).
US FDA Guidance for Industry Suicidal Ideation and Behavior: Prospective Assessment of Occurrence in Clinical Trials (2012).
Veld et al., "Nonsteroidal antiinflammatory drugs and the risk of Alzheimer's disease," N Engl J Med, 345(21):1515-1521 (2001).
Vidgren et al., "Effect of powder inhaler design on drug deposition in the respiratory tract," International Journal of Pharmaceutics, 42: 211-216 (1988).
Vu et al., "Fluid-Based Biomarkers for Amyotrophic Lateral Sclerosis," *Neurotherapeutics*, 14: 119-134 (2017).
Wake et al., "Resting Microglia Directly Monitor the Functional State of Synapses In Vivo and Determine the Fate of Ischemic Terminals," J Neurosci, 29(13): 3974-3980 (2009).

(56) References Cited

OTHER PUBLICATIONS

Waldemar G., "Recommendations for the Diagnosis and Management of Alzheimer's Disease and Other Disorders Associated with Dementia: EFNS Guideline," Eur J Neurol. (2007) 14(1): e1-26.

Walker et al., "Immune phenotypes of microglia in human neurodegenerative disease: challenges to detecting microglial polarization in human brains," Alzheimer's Res Ther, 7:56 (9 pages) (2015).

Wang et al. "Allopregnanolone reverses neurogenic and cognitive deficits in mouse model of Alzheimer's disease," PNAS, 107(14): 6498-6503 (2010).

Wang et al., "Pharmaceutical stabilization of mast cells attenuates experimental atherogenesis in low-density lipoprotein receptor-deficient mice," Atherosclerosis, 229: 304-309 (2013).

Wang et al., "Preventative effect of OMZ-SPT on lipopolysaccharide-induced acute lung injury and inflammation via nuclear factor-kappa B signaling in mice," Biochemical and Biophysical Research Communications, 485(2): 284-289 (2017).

Weggen et al., "A subset of NSAIDs lower amyloidogenic Aβ42 independently of cyclooxygenase activity," Nature, 414(6860):212-216 (2001).

Wen, Y. et al., "Increased beta-secretase activity and expression in rats following transient cerebral ischemia," Brain Res. (2004) 1009, 1-8.

Wettstein et al., "Clinical trials with the cholinergic drug RS 86 in Alzheimer's disease (AD) and senile dementia of the Alzheimer type (SDAT)," Psychopharmacology, 84(4):572-573 (1984).

Wikipedia, "Cromoglicic acid", Aug. 22, 2017 (Aug. 22, 2017), retrieved on Sep. 3, 2019 from https://en.wikipedia.org/w/index.php?title=Cromoglicic_acid&oldid=796733877.

Wikipedia, "Familial Amyloidosis, Finnish Type", Oct. 30, 2022, Retrieved online from "https://en.wikipedia.org/w/index.php?title=Familial_Amyloidosis,_Finnish_Type&oldid=111914 2865".

Wikipedia, "Majority", Sep. 1, 2022, Retrieved online from "https://en.wikipedia.org/w/index.php?title=Majority&oldid=1107851583".

Wilcock et al., "Changing Perspective on the Role of Neuroinflammation in Alzheimer's Disease," Int J Alzheimers Dis, 2012: 495243 (7 pages) (2012).

Wilhelmsson et al., "Injury Leads to the Appearance of Cells with Characteristics of Both Microglia and Astrocytes in Mouse and Human Brain," Cereb Cortex, 27(6): 3360-3377 (2017).

Wisniewski et al., "Immunotherapeutic Approaches for Alzheimer's Disease," Neuron, 85(6): 1162-1176 (2015).

Xiao et al., "Design, synthesis, and structure-activity relationships of 2-benzylidene-1-indanone derivatives as anti-inflammatory agents for treatment of acute lung injury," Drug Design, Development and Therapy, 12: 887-899 (2018).

Yan et al., "Anti-inflammatory drug therapy alters β-amyloid processing and deposition in an animal model of Alzheimer's disease," J Neurosci, 23:7504-7509 (2003).

Yan, S.D. et al., "RAGE-Aβ interactions in the pathophysiology of Alzheimer's disease," Restor Neurol Neurosci. (1998) 12, 167-173.

Yang et al., "Increased levels of MIP-1α in CSF and serum of ALS," Acta Neurologica Scandinavica, 134(2): 94-100 (2016).

Yilmaz, G. et al., "Role of T lymphocytes and interferon-γ in ischemic stroke," Circulation (2006) 113, 2105-2112.

Yokota et al., "Roles of mast cells in the pathogenesis of inflammatory myopathy," Arthritis Research Therapy, 16(R72): 13 pages (2014).

Yoshikawa et al., "Severe acute respiratory syndrome (SARS) coronavirus-induced lung epithelial cytokines exacerbate SARS pathogenesis by modulating intrinsic functions of monocyte-derived macrophages and dendritic cells. Journal of virology," J Virol, 83(7): 3039-3048 (2009).

Young et al., "Lactose Composite Carriers for Respiratory Delivery," Pharmaceutical Research, 26(4): 802-810 (2008).

Zazgornik et al., "Citric acid inhibits growth of Helicobacter pylori in vitro: a new strategy for eradication," Wein Klin Wochenschr, 123: 38-40 (2011).

Zekry, D. et al., "The vascular lesions in vascular and mixed dementia: the weight of functional neuroanatomy," Neurobiol Aging (2003) 24, 213-219.

Zhang et al., "Mast cell tryptase induces microglia activation via protease-activated receptor 2 signaling," Cellular Physiology and Biochemistry, 29: 931-940 (2012).

Zhang et al., "Cromolyn Reduces Levels of the Alzheimer's Disease-Associated Amyloid β-Protein by Promoting Microglial Phagocytosis," Sci Rep, 8:1144 (9 pages) (2018).

Zhang, R. et al., "Evidence for systemic immune system alterations in sporadic amyotrophic lateral sclerosis (sALS)," J Neuroimmunol. (2005) 159(1-2): 215-224.

Zhang, S. et al., "Cerebral mast cells contribute to postoperative cognitive dysfunction by promoting blood brain barrier disruption," Behavioural Brain Research (2016) 298, 158-166.

Zhang, X. et al., "Activated brain mast cells contribute to postoperative cognitive dysfunction by evoking microglia activation and neuronal apoptosis," Journal of Neuroinflammation (2016) 13: 127 (15 pages).

Zhang, X. et al., "Cerebral mast cells participate in postoperative cognitive dysfunction by promoting astrocyte activation," Cellular Physiology and Biochemistry (2016) 40, 104-116.

Zhao et al., "Microglia-targeting nanotherapeutics for neurodegenerative diseases," APL Bioeng, 4:030902 (17 pages) (2020).

Zheng et al., "Cerebral Atheroschlerosis is Associated with Cystic Infarcts and Microinfarcts, but not Alzheimer Pathologic Changes," Stroke, 44(10): 2835-2841 (2013).

Zhou et al., "Drug-lactose binding aspects in adhesive mixtures: controlling performance in dry powder inhaler formulations by altering lactose carrier surfaces," Adv Drug Deliv Rev, 64(3):275-284 (2012).

Zhu et al., "Pharmacy," Fourth Military Medical University Press, 309, (2007).

Zlokovic, "Neurovascular pathways to neurodegeneration in Alzheimer's disease and other disorders," Nat Rev Neurosci, 12(12):723-738 (2011).

Durdagi et al., "Screening of clinically approved and investigation drugs as potential inhibitors of COVID-19 main protease: a virtual drug repurposing study." ChemRxiv. 1-31 (2020).

Xie et al., "Combination antiviral therapy with lopinavir/ritonavir, arbidol and interferon-a1b for COVID-19." Antiviral Therapy 25.4 (2020): 233-239.

1A

1B

1C

1D

2B

2A

2E

2F

FIGs. 3A – 3F
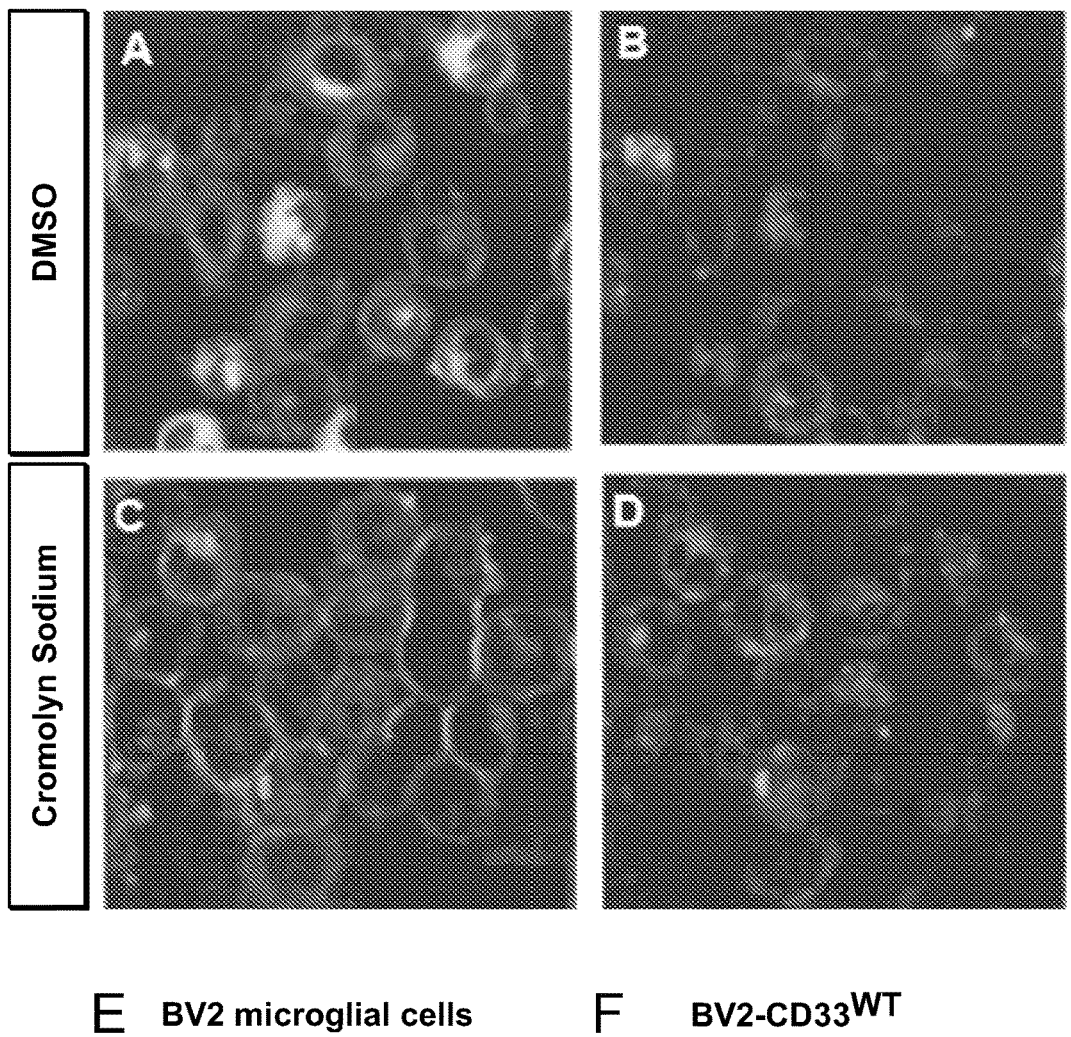
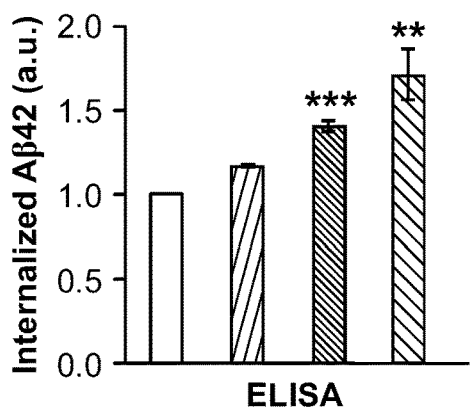
ELISA
☐ DMSO
▨ Cromolyn Sodium (10 μM)
▧ Cromolyn Sodium (100 μM)
▨ Cromolyn Sodium (1mM)
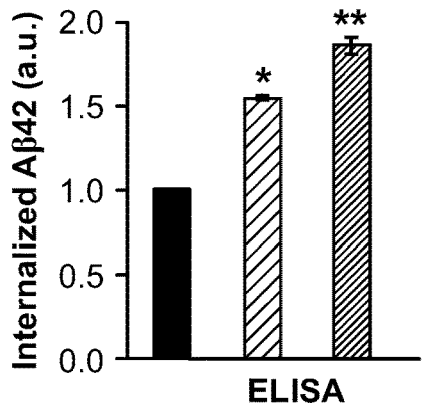
ELISA
■ DMSO
▨ Cromolyn Sodium (10 μM)
▨ Cromolyn Sodium (500 μM)

| Production (pg/mL) | IFN-γ | IL-6 | IL-1β | IL-8 |
|---|---|---|---|---|
| Control | 0 | 12.77 | 0.00626 | 38.16 |
| TNF-α (0.3 µg/mL) | 133.8 | 2268 | 17.62 | 12185 |
| Increase Fold | N/A | 177.6 | 2814.7 | 319.3 |
| TNF-α + 3 µM Cromolyn | 70.84 | 1349 | 8.934 | 9045 |
| % Inhibition | 47.1 | 40.5 | 49.3 | 25.8 |
| TNF-α + 3 µM F-Cromolyn | 64.69 | 1365 | 8.293 | 8780 |
| % Inhibition | 51.7 | 39.8 | 52.9 | 27.9 |

FIG. 13

| Production (pg/mL) | IP-10 (CXCL10) | MCP-1 (CCL2) | MIP-1α (CCL3) | MIP-1β (CCL4) |
|---|---|---|---|---|
| Control | 0.5284 | 17.8 | 3.604 | 1.203 |
| TNF-α (0.3 μg/mL) | 1078 | 926.1 | 582.5 | 294 |
| Increase Fold | 2040.1 | 52.0 | 161.6 | 244.4 |
| TNF-α + 3 μM Cromolyn | 592.1 | 542.3 | 375 | 175.8 |
| % Inhibition | 45.1 | 41.4 | 35.6 | 40.2 |
| TNF-α + 3 μM F-Cromolyn | 567.4 | 536.1 | 372.8 | 167.3 |
| % Inhibition | 47.4 | 42.1 | 36.0 | 43.1 |

METHODS OF TREATMENT OF CORONAVIRUS-INDUCED INFLAMMATION CONDITIONS

CROSS-REFERENCE RELATED APPLICATIONS

This application is a U.S. National Stage Application of International Application No. PCT/US21/25746, filed Apr. 5, 2021; which claims priority to U.S. Provisional Application No. 63/005,720, filed Apr. 6, 2020, the entire contents of each of which are incorporated herein by reference.

BACKGROUND

A novel coronavirus infectious disease (COVID19) characterized by acute respiratory impairment is caused by a coronavirus, SARS-CoV-2. Currently there is no specific antiviral therapy available for patients with COVID19. Symptomatic and supportive care, even with mechanical ventilation or supplemental oxygen, are strongly recommended for severe infected individuals. Even with this advanced level of care, those with advancing age and co-morbidities such as diabetes and heart disease are still at high risk for adverse outcomes. There exists a need for active agents that stabilize and inhibit the chronic immune response activation responsible for inducing the life threatening cytokine release storm in patients infected with COVID19.

SUMMARY OF THE INVENTION

The present disclosure relates to methods of treating one or more inflammation conditions induced by a coronavirus infection in a subject in need thereof, comprising administering a pharmaceutical composition, wherein the pharmaceutical composition comprises a compound of Formula I or Formula II:

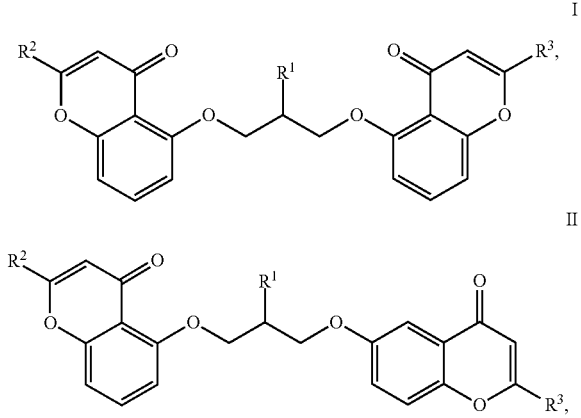

wherein
$R^1$ is halogen, OH, or —OC(O)$C_{1-5}$alkyl
$R^2$ and $R^3$ are each independently selected from $CO_2R^4$ and $CH_2OR^5$;
$R^4$ is Li, Na, K, H, $C_{1-5}$alkyl, or —$CH_2CO(C_{1-5}$alkyl); and
$R^5$ is H or —C(O)($C_{1-5}$alkyl),
or a pharmaceutically acceptable salt thereof.

BRIEF DESCRIPTION OF THE DRAWINGS

FIG. 1B: IL-5. FIG. 1C: IL-6. FIG. 1D: TNFα. * denotes differences between TgSOD1-Vehicle and Tg-SOD1-Cromolyn; ^ denotes differences between TgSOD1-Vehicle and WtSOD1-Vehicle; #denotes differences between TgSOD1-Vehicle and WtSOD1-Cromolyn; @denotes differences between TgSOD1-Cromolyn and WtSOD1-Vehicle; % denotes differences between TgSOD1-Cromolyn and WtSOD1-Cromolyn. * $p<0.05$;  $p<0.01$; * $p<0.001$; *** $p<0.0001$, the same statistical significance is associated with each symbol. Data are presented as median and interquartile ranges.

FIG. 2A: IL-1. FIG. 2B: IL-2. FIG. 2C: IL-5. FIG. 2D: IL-6. FIG. 2E: IL-10. FIG. 2F: TNFα. * denotes differences between TgSOD1-Vehicle and Tg-SOD1-Cromolyn; ^ denotes differences between TgSOD1-Vehicle and WtSOD1-Vehicle; #denotes differences between TgSOD1-Vehicle and WtSOD1-Cromolyn; @ denotes differences between TgSOD1-Cromolyn and WtSOD1-Vehicle; % denotes differences between TgSOD1-Cromolyn and WtSOD1-Cromolyn. * $p<0.05$;  $p<0.01$; * $p<0.001$; *** $p<0.0001$, the same statistical significance is associated with each symbol. Data are presented as median and interquartile ranges.

FIGS. 3A-3F are images and graphs demonstrating that cromolyn reverses pro-inflammatory CD33-mediated inhibition of M1-microglial activation stage in APP/PST mice. 3A-3D: confocal micrographs of BV2 microglial cells treated with fluorescently-labeled Aβ42 (red), plasma membrane dye (PM, green), and either DMSO (control) or cromolyn sodium in DMSO. 3A: DMSO+PM+Aβ42. 3B: DMSO+Aβ42. 3C: cromolyn sodium+PM+Aβ42. 3D: cromolyn sodium+Aβ42. 3E: ELISA analysis of Aβ42 uptake by the BV2 microglial cells treated with different concentrations of cromolyn sodium. 3F: ELISA analysis of Aβ42 uptake by the BV2-CD33$^{WT}$ microglial cells treated with different concentrations of cromolyn sodium.

FIG. 11 shows a table summarizing inhibition of secretion of IFN-γ, IL-1β, IL-6 and IL-8 in HMC3 microglia cell line induced by TNF-α in the presence of cromolyn and F-cromolyn.

FIG. 13 shows a table summarizing inhibition of secretion of IP-10 (CXCL10), MCP-1 (CCL2), MIP-1a (CCL3) and MIP-1β (CCL4) in HMC3 microglia cell line induced by TNF-α in the presence of cromolyn and F-cromolyn

DETAILED DESCRIPTION OF THE INVENTION

Overview

Figure 1A:
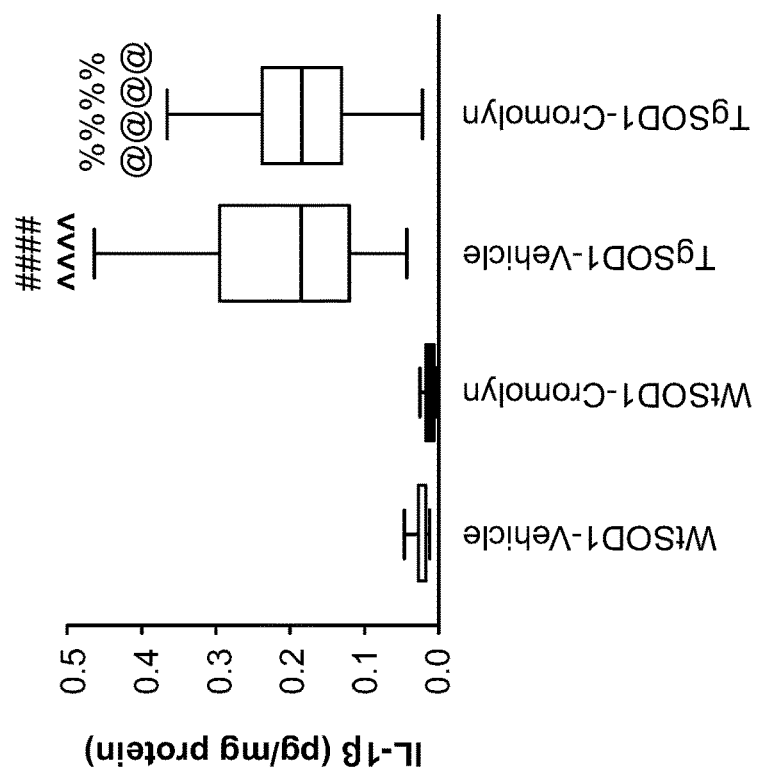
FIGS. 1A-1D are graphs showing that cromolyn treatment decreased the levels of pro-inflammatory cytokines in the spinal cord of TgSOD1 mice. FIG. TA: IL-1β.
Figure 1B:
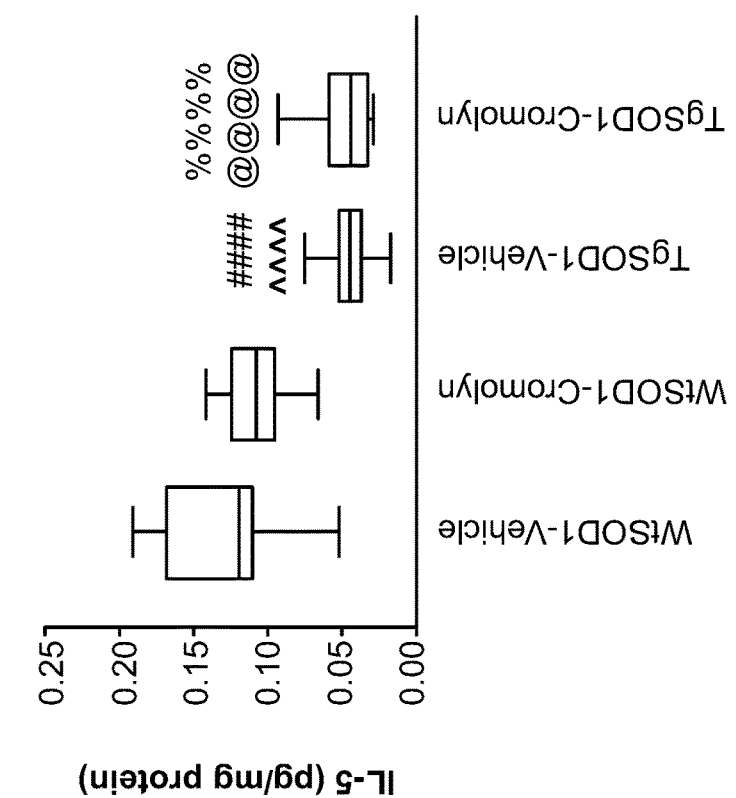
Figure 1C:
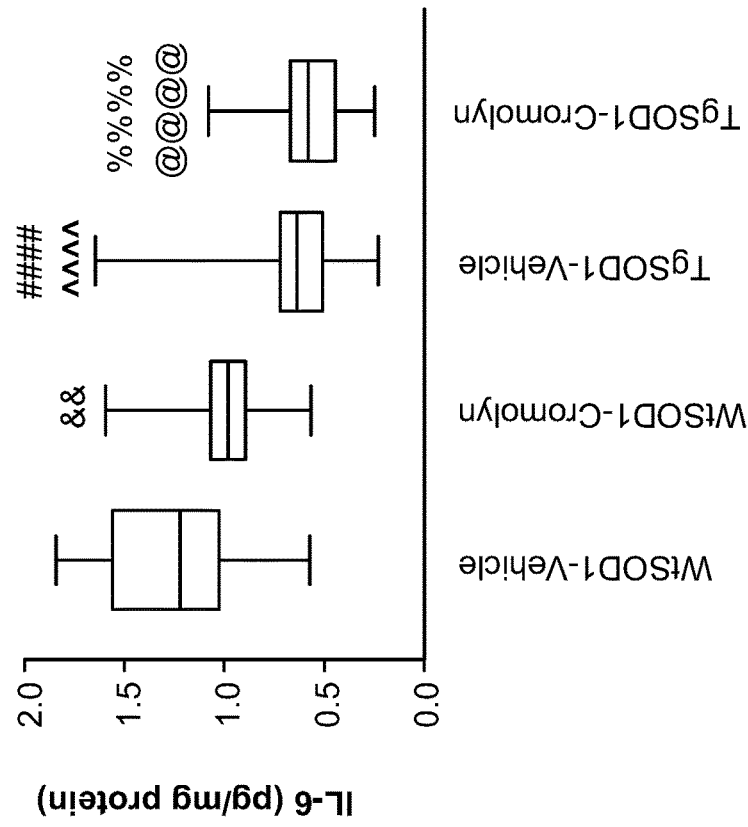
Figure 1D:
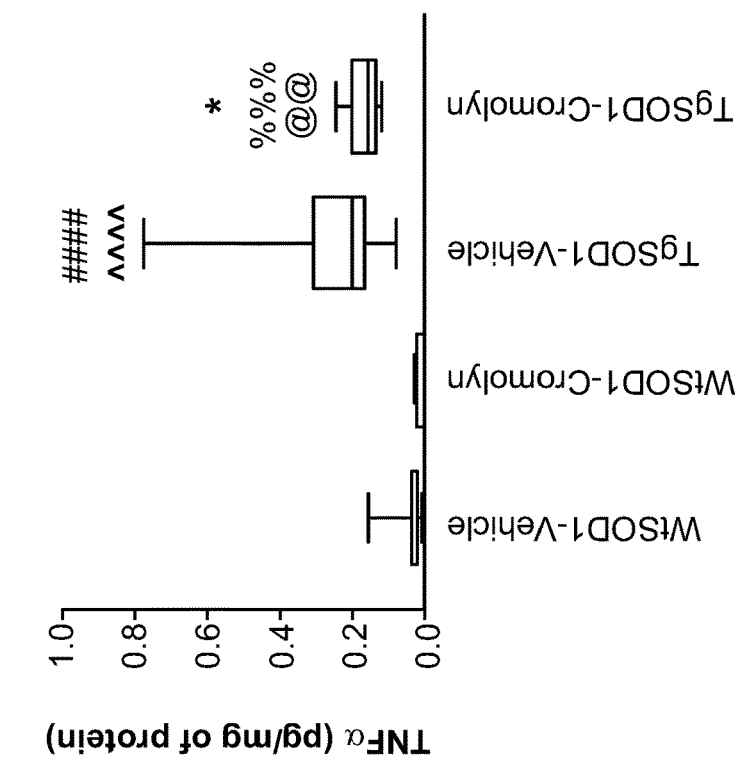

The present disclosure describes cromolyn for use in stabilizing or treating the chronic activated and life-threatening pulmonary immune response in patients with COVID19. Cromolyn may be used, for example, as an adjuvant therapy in combination with antiviral and/or antimicrobial treatment, such as remdesivir or azithromycin, and/or additional supportive therapies.

There is currently no specific antiviral treatment for COVID19. Symptomatic and supportive care are recommended for severely infected individuals. Even with this advanced level of care, many suffer from pulmonary distress symptoms, especially those with advancing age. In particular, subject with co-morbidities, such as diabetes and heart disease, are at high risk for adverse outcomes, with mortality of ~10%. Therefore, there is an urgent need to find a safe and effective therapeutic approach to patients with COVID-19 characterized by acute respiratory impairment.

Coronaviruses (CoVs) are enveloped positive-sense RNA viruses. Corona virions are spherical, approximately 125 nm in diameter. The prominent features of the virion are the club-like spike projections from the virion envelop, which give the virions the appearance of having a solar corona. The nucleocapsids are helically symmetrical, which is unusual for positive sense RNA viruses.

The Coronaviridae are the largest group of the Nidovirales order, this group is subdivided into four groups, alpha, beta, gamma and delta coronaviruses. The viruses were initially sorted into these groups based on serology but are now grouped by phylogenetic clustering.

Coronaviruses are enveloped, non-segmented positive-sense RNA viruses and have the largest identified RNA genomes, containing approximately 30 kilobase (kb). Coronavirus particles contain four main structural proteins. These are the spike (S), membrane (M), envelop (E), and nucleocapsid (N) proteins, all of which are encoded within the 3' end of the viral genome. Homotrimers of the virus encoded S protein make up the distinctive spike structures on the surface of the virus.

The coronaviruses have an unusually large RNA genome. Viral RNA synthesis occurs after translation and assembly of the viral replicase complexes. Viral RNA synthesis produces both genomic and sub-genomic RNAs. All positive-sense sub-genomic RNAs are 3' co-terminal with the full-length viral genome and thus form a set of nested RNAs, a distinctive property of these viruses.

The virus utilizes a slippery sequence (5'-UUUAAAC-3') and an RNA pseudoknot that cause ribosomal frameshifting from the rep1a reading frame into the rep1b open reading frame (ORF). In most cases, the ribosome unwinds the pseudoknot structure, and continues translation until it encounters the rep1a stop codon. Occasionally the pseudoknot blocks the ribosome from continuing elongation, causing it to pause on the slippery sequence, changing the reading frame by moving back one nucleotide, −1 frameshift, before the ribosome is able to melt the pseudoknot structure and extend translation into rep1b, resulting in the translation of pp1ab. In vitro studies predict the incidence of ribosomal frameshifting to be as high as 25%, but this has not been determined in the context of virus infection. It is unknown exactly why these viruses utilize frameshifting to control protein expression, but it is hypothesized to either control the precision of the ratio of rep1b:rep1a proteins or to delay the production of rep1b products until the products of rep1a have created a suitable environment for RNA replication.

The first coronavirus was isolated in 1937. Coronaviruses cause a variety of diseases and related coronaviruses have been found to infect cattle, pigs, horses, turkeys, cats, dogs, rats, and mice. The α-coronaviruses were isolated nearly 50 years ago, while β-coronaviruses were only identified 2003 following the SARS-CoV outbreak.

The first human coronavirus was cultured in the 1960s from nasal cavities of people with what was considered the "common cold"; however, recently coronaviruses have been determined to be a potential cause of lethal human respiratory infections.

COVID19 is believed to be caused by direct contact with infected individuals. Those infected with the virus that causes COVID19 emit high amounts of virus very early on in their infection, according to a new study that helps to explain the rapid and efficient way in which the virus has spread around the world. At the same time, studies suggest that while people with mild infections can still test positive by throat swabs for days and even weeks after their illness, those who are only mildly sick are likely to still be infectious for about 10 days after they start to experience symptoms.

Until recently these viruses were considered endemic in the human population only causing 15-30% of upper respiratory infections each year. The previous infections were noted to cause more severe disease in neonates, the elderly, and in individuals with underlying illnesses, with a greater incidence of lower respiratory tract infections in these populations. However, the current COVID19 infection data is still evolving, but there is noted that this may be a more virulent strain for all populations.

The CDC predicts that as the COVID19 outbreak continues, many people in the United States will be exposed at some point to this virus and many will become ill. As many as 20% of the infections will be severe or life threatening. Reports that looked at more than 70,000 COVID19 patients found that about 80% of the illness had been considered mild and most recovered without sequelae. Of the 70,000 cases, only about 2% were in people younger than 19. Most of the infections are in adults, and for those greater than 60 years of age there is an increasing risk with increasing age. People with serious underlying health conditions, such as diabetes, heart disease or lung disease, are also more likely to develop serious outcomes including death, Coronavirus disease can vary in severity and duration, characterized by mild symptoms including rhinitis, sore throat, persistent pain or pressure in the chest, cough and fever. More severe cases requiring hospitalization may result in pneumonia, severe acute respiratory syndrome, kidney failure and even death.

Illness can also be more severe for some people who develop pneumonia, who may also develop breathing difficulties requiring mechanical ventilation. A little over 50% of patients in a reported study were given non-invasive ventilation at ICU admission, of whom 76% required further orotracheal intubation and invasive mechanical ventilation. The ICU mortality rate among those who required non-invasive ventilation was ~79%; amongst those who required invasive mechanical ventilation, the mortality rate was ~86%.

Currently, there are no anti-viral therapeutics that specifically target human coronaviruses, so treatments are only supportive. Interferons (IFNs) have been used but are only partially effective against coronaviruses. IFNs in combination with ribavirin may increase activity in vitro when compared to IFNs alone against some coronaviruses; however, the effectiveness of this combination in vivo requires further evaluation. The SARS and MERS outbreaks have stimulated research on these viruses and many suitable anti-viral targets, such as viral proteases, polymerases, and entry proteins, have been identified. Significant work remains to develop these therapies.

Only limited options are available to prevent coronavirus infections. Developing vaccines utilizing attenuated viruses have had challenges due to the circulating strains' propensity to recombine rendering these vaccines useless. Some success has been found with DNA plasmid vaccines, but no DNA plasmid vaccine is approved. Previously, therapeutic SARS-CoV neutralizing antibodies have been produced for use for health care workers, but none of these may be useful for the current disease.

Cytokine Storm

Figure 5:
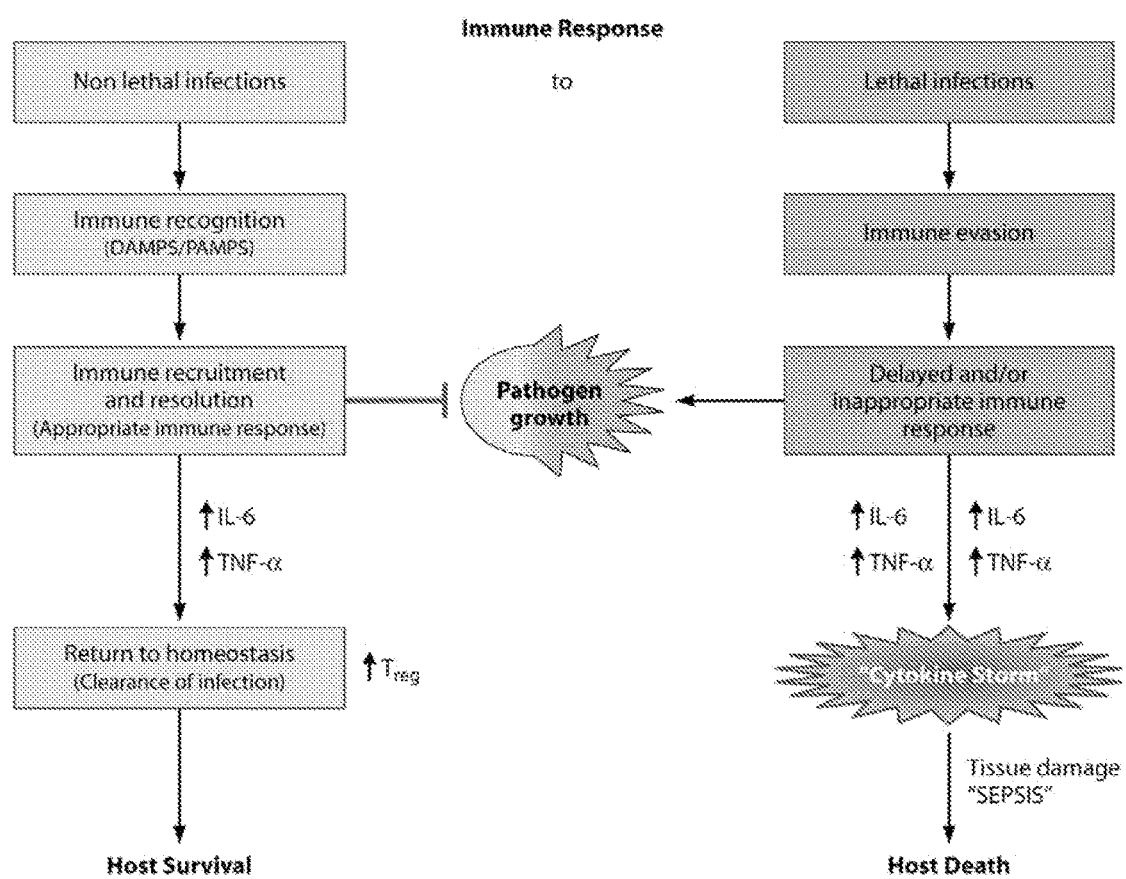
FIG. 5 shows a schematic representation of the mechanism of immune response to lethal and non-lethal infections.

Inflammation is critical for an effective immune response to a pathogen or trauma. Inflammation is the first response to an invading pathogen from the initial recognition and recruitment of immune cells to the final steps to resolve the insult to the system at which time the inflammation is downregulated to allow repair and return of the system to homeostasis (FIG. 5).

Pathogens are constantly adapting to circumvent the immune system by evading detection or by suppressing the host immune responses. Unfortunately, sometimes a pathogen can cause a hyper-stimulation of a broad immune response, which can worsen the disease. The hyper-stimulating response is called a "cytokine storm" or hypercytokinemia. The overreaction of the immune system may increase production of inappropriate cytokines, which prevents proper regulation of the immune response. There can be an imbalance of pro-inflammatory cytokines such as TNF-α IL-1β, IL-8, IL-6. Of these, an overproduction of IL-6 and TNF-α has been observed in patients with severe acute respiratory syndrome. Overproduction of proinflammatory cytokines can result in fever, hypotension, edema, tissue damage, and sepsis, and may eventually lead to organ dysfunction and death.

To address the unmet need, in some embodiments, the present disclosure relates to a combination of an antimicrobial or antiviral therapy along with an immunomodulating agent, which suppresses the symptoms of a cytokine storm.

Role of Mast Cells

Mast cells are important in mediating allergy and physiological skin reactions to trauma and infection. However, they can affect the immune system, promote inflammation or even suppress it.

Figure 6:
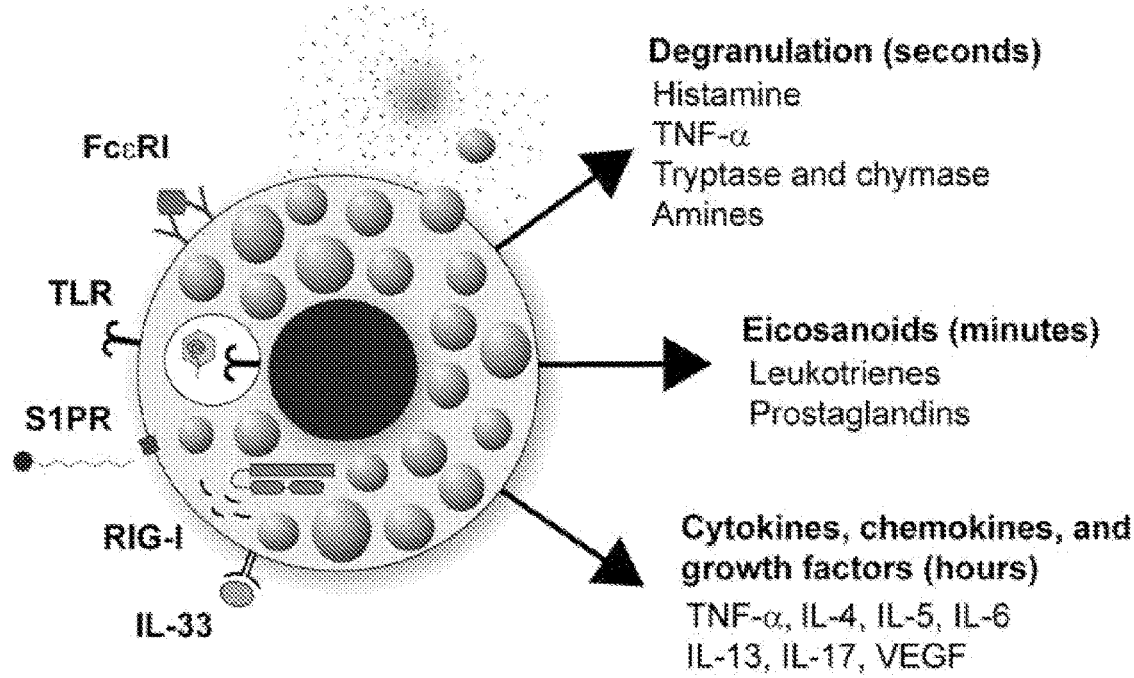
FIG. 6 shows a schematic representation of mast cell activation upon exposure to a virus pathogen.

Pre-formed mediators of mast cells stored in the secretory granules include different proteases, histamine, heparin proteoglycan, chondroitin sulphate E, acidic hydrolases, and various cytokines and growth factors. After activation, mast cells can secrete newly synthesized mediators, including prostaglandin D2, leukotriene C4, and a range of cytokines, chemokines and growth factors (FIG. 6). In addition, they can express cell membrane receptors and ligands. These molecules can modulate the immune system in epithelial tissues. Stabilizing mast cells has been studied in autoimmune diseases as well as in epidermal cancers. Mast cell activation is a response to viral infection. Mast cells can recognize and respond to viruses through several different receptors. These receptors include TLR signaling, such as TLR3 detection of dsRNA, sphingosin-1-phosphate (SIP) binding to its receptor S1PR, and RIG-I recognition of uncapped vRNA. Engagement of these receptors results in mast cell activation and leads to immediate degranulation, the de novo synthesis of eicosanoids within minutes of activation, and the de novo synthesis of numerous cytokines, chemokines, and growth factors within hours of activation.

It has been shown that mast cells can be directly activated in response to viral infections, releasing mediators such as histamine, proteases, leukotrienes, inflammatory cytokines, and antiviral chemokines, which participate in the excessive inflammatory and pathological response observed during viral infections. Mast cells also are important tissue sentinel cells for initiating inflammatory response to pathogens. Mast cells can recognize and respond to viruses through several different receptors. Engagement of these receptors results in mast cell activation leading to immediate degranulation, the de novo synthesis of eicosanoids within minutes of activation, and the de novo synthesis of numerous cytokines, chemokines, and growth factors within hours of activation. Within the tissues, mast cells can be activated by viruses, resulting in the secretion of effector molecules. Mast cell-derived effector molecules act within the local tissue environment or at distal site to mediate the accumulation of mast cell progenitors and leukocytes to the site of infection. Mast cell accumulation in the infected tissues could be due to either the recruitment and differentiation of mast cell progenitors to the infected tissue and/or proliferation of the tissue-resident mast cell population. Mast cell activation can participate in limiting viral replication in the local tissue and viral dissemination, but if left unchecked can cause significant tissue damage, vascular leakage, and tissue edema.

Many studies have shown that mast cells play a crucial role in the process of some viral infections, such as dengue virus, human immunodeficiency virus, Newcastle disease virus, and infectious bursal disease virus. A previous study revealed that mast cells play roles in the pathogenesis of lung injury after H5N1 virus infection by producing proinflammatory mediators including tryptase, histamine, and interferon-c (IFN-c). In addition, the resulting lung injury was improved by treatment with ketotifen, which inhibits mast cell activation.

Mast cell tryptase induces microglia activation, TNF-α, IL-6, and Reactive Oxygen Species (ROS). Tryptase-induced TNF-α release was shown to occur earlier than IL-6 release, suggesting that tryptase was more likely to induce the release of TNF-α than IL6. Both TNF-α and IL6 have been identified as over-produced in the cytokine storm resulting from coronavirus infections; stabilization of mast cells may decrease the amount of tryptase-induced release of these two key proinflammatory cytokines.

Stabilization of Mast Cells by Cromolyn (Cromoglycate)

Cromolyn is a synthetic chromone derivative that has been approved for use by the FDA since the 1970s for the treatment of asthma. Liquid intranasal and ophthalmic formulations have also been developed for the treatment of rhinitis and conjunctivitis. The mechanism of action for cromolyn is characterized as mast cell stabilization, namely, to suppress cytokine release from activated lymphocytes together with preventing the release of histamine from mast cells. It was administered four times daily as prophylaxis for allergic and exercise induced asthma, not as a treatment for acute attacks.

Sodium cromoglycate (cromolyn sodium), as an approved drug for the asthma indication, has a well-established safety profile. The risk-to-benefit ratio of cromolyn therapy is excellent, as established by over 40 years of utilization. Cromolyn is an important adjunct in the treatment of asthma. By topical administration, the drug has been effective in seasonal and perennial rhino-conjunctivitis and in selected cases of gastrointestinal allergy to foods. It has very little, if any, detrimental side effects. The most common adverse effects that have been noted with use of sodium cromoglycate as an aerosol formulation are mild and infrequent. The incidence of hypersensitivity reactions to cromolyn are low and risk can further be reduced by hypersensitivity testing.

Considerable safety margin has been found between therapeutic doses of cromolyn and the minimum doses to cause significant toxicity; renal damage was observed due to precipitation of cromolyn in the renal tubules during dosing of high concentration. Acute $LD_{50}$ values as well as acute, chronic, and subchronic toxicity studies demonstrate the safety of cromolyn (Tables 1 and 2).

TABLE 1

| Species | Route | $LD_{50}$ Value |
|---|---|---|
| Rat | Oral | >11 gm/kg |
| Rat | IP | >4 gm/kg |
| Rat | SC | 6 gm/kg |
| Rat | IV | >4 gm/kg |
| Dog | Oral | >4 gm/kg |
| Dog | IV | >1600 mg/kg |
| Rabbit | Oral | >8 gm/kg |

TABLE 2

| Study Type | Species, Strain Number of Animals | Doses | Route | Duration | Results |
|---|---|---|---|---|---|
| Acute Toxicity | Stump-tailed Monkeys 2M/1F | Single doses of 333 and 5082 mg/kg | IV | 4 to 10-Day observation | One monkey given 5082 mg/kg died within 4 hours. All monkeys given 333 mg/kg survived until the scheduled necropsy. Monkeys given 5082 mg/kg showed deep, stertorous breathing, retching, vomiting and copious fluid feces. Renal degeneration at both 333 mg/kg and 5082 mg/kg. |
| Acute Toxicity | Rhesus Monkeys M1/F1 | Single dose of 5, 50, 500, 1000 mg/kg | IV | 7-Day observation | There were no mortalities. Slight ataxia and weight loss at 500 and 1000 mg/kg. |
| Subchronic Toxicity | Stump-tailed Monkeys 5M/4F | 20 mg cromolyn and lactose capsules; 4, 16 and 72 capsules/day | Inhalation spinhaler | 17 Weeks 6 hr/day, 5 days/week | Some weight loss. No effects on clinical observations, clinical pathology, organ weights, gross or microscopic pathology. |
| Subchronic Toxicity | Wistar Rats | 4% cromolyn: 0, 4, 8, 16 mg/day | Intranasal | 3 Month | No general toxic effects. No external nose irritancy. Some internal nose bleeding. Minor histological findings throughout. |
| Subchronic Toxicity | Squirrel Monkeys 3M/3F | 2% cromolyn: 0, 6, 12 mg/day | Intranasal | 4 Weeks | No dose related histological changes. No remarkable gross pathology. |
| Subchronic Toxicity | Squirrel Monkeys 4M/4F | 4% cromolyn: 0, 4, 12, 36 mg/day | Intranasal | 3 Month | |
| Subchronic Toxicity | Stump-tailed Monkeys 4M/4F | 2% cromolyn: 0, 6, 19, 38 mg/day | Intranasal | 3 Month | |

TABLE 2-continued

| Study Type | Species, Strain Number of Animals | Doses | Route | Duration | Results |
|---|---|---|---|---|---|
| Subchronic Toxicity | Squirrel Monkeys 4M/4F | 2% cromolyn: 0, 2, 6, 18 mg/day | Intranasal | 3 Months | |
| Chronic Toxicity | Wistar Rats | 4% cromolyn: 0, 4, 8, 16 mg/day | Intranasal | 6 Months | All clinical laboratory results and organ weights were within normal limits and comparable among test and control groups. |
| Chronic Toxicity | Squirrel Monkeys 4M/4F | 2% cromolyn: 0, 2, 6, 12 mg/day | Intranasal | 6 Months | No signs of ill health, general toxicity, or nasal irritation. No effects on clinical pathology, organ weights, gross or microscopic pathology |
| Chronic Toxicity | Squirrel Monkeys 4M/4F | 4% cromolyn: 0, 5, 16, 32 mg/day | Intranasal | 6 Months | |
| Chronic Toxicity | Rhesus Monkeys 3M/3F | Daily dosing at 0, 2, 10, and $50^c$ mg/kg | IV | 6 Months | All body weight, observations, clinical laboratory results, organ weights, gross and microscopic pathology were within normal limits and comparable among test and control groups. |

Further evidence supporting the favorable safety profile of cromolyn is provided in a total of 20 studies, including acute to 12-month injection studies, 1 to 6-month nasal and ocular studies, and 3 to 12-month oral inhalation studies. No remarkable findings were reported for the various inhalation studies in non-human primates. Further support for cromolyn safety profile is provided by repeat dose IV studies that were conducted for up to six months at doses as high as 50 mg/kg daily.

No adverse effects via all routes of administration in repeat dose studies were attributed to cromolyn administration on clinical observations, body weight, clinical pathology parameters, or local sites of administration, organ weights, or gross and histopathological examinations Severity of Infection and Cytokine Storm In severe cases of COVID19, hospitalized patients experienced an extreme increase in cytokine levels, which may contribute to inflammation. Patients that were admitted to the ICU, particularly those with severe disease, exhibited significantly higher levels of inflammatory cytokines compared to those that did not. This "cytokine storm" can trigger a viral sepsis in coronavirus infection, where viral replication and excessive, uncontrolled systemic inflammation can lead to pneumonitis, acute respiratory distress syndrome, respiratory failure, shock, organ failure, secondary bacterial pneumonia, and potentially death.

An estimated 20% of individuals infected with COVID-19 are sick enough to necessitate hospitalization, with a subset of patients requiring intensive care. Early reports on the clinical (fever, confusion) and laboratory features of critically ill patients with COVID-19 (hyperferritinemia, lymphopenia, prolonged prothrombin time, elevated lactate dehydrogenase, elevated interleukin (IL), elevated C-reactive protein, elevated soluble CD25) suggest the presence of a cytokine storm resulting in acute respiratory distress syndrome and multi-organ failure. Indeed, many of the diagnostic criteria for cytokine storm syndrome are reported in individuals with COVID19 under intensive care This same correlation between cytokine storm and severity of illness was observed previously in both SARS and MERS patients.

One antiviral that may be effective for treating COVID-19 is remdesivir (RDV); it is being used in the country's first clinical trial of an experimental treatment for COVID-19. Remdesivir a broad-spectrum antiviral for RNA virus infections, including infections caused by SARS-CoV and MERS-CoV. RDV was originally developed to treat Ebola. RDV is a nucleotide analog that inhibits RNA-dependent polymerases.

Cromolyn as an additional therapy allowing for the immune cell stabilization and control of inflammation may provide benefit and enhance the effectiveness of antivirals and other agents.

Inflammation Conditions Induced by SARS-CoV-2: Acute Respiratory Distress Syndrome (ARDS), Pneumonia, and Sepsis Approximately 14% of people infected with SARS-CoV-2 develop severe disease that requires hospitalization and oxygen support, and 5% require admission to an intensive care unit. In severe cases, COVID-19 can be complicated by severe pneumonia, the acute respiratory distress syndrome (ARDS), sepsis and septic shock, multiorgan failure, including acute kidney injury and cardiac injury. Older age and co-morbid disease have been reported as risk factors for death, and recent multivariable analysis confirmed older age, higher Sequential Organ Failure Assessment (SOFA) score and d-dimer >1 µg/L on admission were associated with higher mortality.

Clinically, the immune responses induced by SARS-CoV-2 infection are two phased. During the incubation and non-severe stages, a specific adaptive immune response is required to eliminate the virus and to preclude disease progression to severe stages. For the development of an endogenous protective immune response at the incubation and non-severe stages, the host should be in good general health and an appropriate genetic background that elicits specific antiviral immunity. Genetic differences are well-known to contribute to individual variations in the immune response to pathogens. However, when a protective immune response is impaired, virus will propagate and massive destruction of the affected tissues will occur, especially in organs that have high ACE2 expression, such as intestine and kidney. The damaged cells also induce innate inflammation in the lungs that is largely mediated by pro-inflammatory macrophages and granulocytes. Lung inflammation is the main cause of life-threatening respiratory disorders at the severe stage. Therefore, good general health may not be advantageous for patients who have advanced to the severe stage: once severe lung damage occurs, efforts should be made to suppress inflammation and to manage the symptoms. An approach involving stabilizing the immune cells and controlling the inflammation is necessary at this stage.

Inflammation Condition Induced by SARS-CoV-2: Myocardial Injury

Patients with long-term coronary artery disease and those with risk factors for atherosclerotic cardiovascular disease have a heightened risk of developing an acute coronary syndrome during acute infections, which has been shown previously in epidemiologic and clinical studies of influenza and other acute inflammatory conditions. Such acute coronary events could result from the severe increase in myocardial demand triggered by infections that precipitate myocardial injury or infarction, akin to type 2 myocardial infarction. Alternatively, circulating cytokines released during a severe systemic inflammatory stress could lead to atherosclerotic plaque instability and rupture. Similarly, patients with heart failure are also prone to hemodynamic decompensation during the stress of severe infectious illnesses. Thus, it is anticipated that patients with underlying cardiovascular diseases, which are more prevalent in older adults, would be susceptible to higher risks of adverse outcomes and death during the severe and aggressive inflammatory responses to COVID-19 than individuals who are younger and healthier. In addition, acute/fulminant myocarditis as well as heart failure have been reported with MERS coronavirus infection and could be expected to occur with SARS-CoV-2, given the similar pathogenicity. A cohort study of 416 hospitalized patients with COVID-19 confirmed by reverse transcriptase-polymerase chain reaction demonstrated that 82 (19.7%) had evidence of myocardial injury manifested by elevation of high-sensitivity troponin I (TnI) levels. Patients with myocardial injury had a significantly higher in hospital mortality rate (42 of 82 [51.2%]) compared with those without myocardial injury (15 of 335 [4.5%]), and among those with myocardial injury, greater degrees of TnI elevation were associated with higher mortality rates.

As with other coronaviruses, SARS-CoV-2 can elicit the intense release of multiple cytokines and chemokines that can lead not only to vascular inflammation and plaque instability but also to myocardial inflammation. Direct viral infection of the myocardium is another possible causal pathway of myocardial damage and one that requires further investigation.

Inflammation Condition Induced by SARS-CoV-2: Secondary Haemophagocytic Lymphohistiocytosis Secondary haemophagocytic lymphohistiocytosis (sHLH) is an under-recognized, hyperinflammatory syndrome characterized by a fulminant and fatal hypercytokinaemia with multiorgan failure. In adults, sHLH is most commonly triggered by viral infections. Cardinal features of sHLH include unremitting fever, cytopenias, and hyperferritinaemia; pulmonary involvement (including ARDS) occurs in approximately 50% of patients.

A cytokine profile resembling sHLH is associated with COVID-19 disease severity, characterized by increased interleukin (IL)-2, IL-7, granulocyte-colony stimulating factor, interferon-γ inducible protein 10, monocyte chemoattractant protein 1, macrophage inflammatory protein 1-α, and tumor necrosis factor-α.

Predictors of fatality from a recent retrospective, multicentre study of 150 confirmed COVID-19 cases included elevated ferritin (mean 1297.6 ng/ml in non-survivors vs 614.0 ng/ml in survivors; p<0.001) and IL-6 (p<0.0001), suggesting that mortality might be due to virally driven hyperinflammation.

Studies Demonstrating Cromolyn-Induced M2 Microglial Activation

Inflammation and immune changes can exacerbate the damage or play a protective role, depending on types of cytokines and cells involved in the interactions. The protective aspects of inflammation include clearance of debris by microglia in the brain, which is important in repair and interaction with T cells. It is known that the changes in properties of microglia, the brain-resident macrophages, depend on their response to different stimuli in their microenvironment (e.g., cytokines), resulting in a range of phenotypes. Based on the changes in expression of cytokines, receptors, and other markers, monocyte and macrophage states have been defined as following: classical activation (M1), alternative activation (M2a), type II alternative activation (M2b), and acquired deactivation (M2c).

M1 activated microglia can produce reactive oxygen species and result in increased production of pro-inflammatory cytokines such as TNFα and IL-1.

Macrophage M2 activation is associated with mediators that are known to contribute to the anti-inflammatory actions and reorganization of extracellular matrix. Microglia with M2a phenotypes have increased phagocytosis and produce growth factors such as insulin-like growth factor-1 and anti-inflammatory cytokines such as IL-10. Stimulation of macrophages by IL-4 and/or IL-13 results in an M2a state, sometimes called a wound-healing macrophage and it is generally characterized by low production of pro-inflammatory cytokines (IL-1, TNF and IL-6). IL-4 is known to be an important modulator of M2a microglial activation. The M2a responses are primarily observed in allergic responses, extracellular matrix deposition, and remodeling.

M2b macrophages are unique in that they express high levels of pro-inflammatory cytokines, characteristic of M1 activation, but also express high levels of the anti-inflammatory cytokine IL-10.

Finally, the M2c macrophage state is stimulated by IL-10 and is sometimes referred to as a regulatory macrophage. M2c macrophages have anti-inflammatory activity that plays a role in the phagocytosis of cellular debris without the classical pro-inflammatory response. These cells express transforming growth factor-β (TGF-β) and high IL-10 as well as matrix proteins. IL-10 mediates anti-inflammatory responses including decreasing glial activation and production of pro-inflammatory cytokines.

Two avenues of study have been pursued over the years: research into anti-inflammatory agents to temper toxic effect of pro-inflammatory cytokines; and studies focused on converting microglia from this M1 state to an M2 state, in which the toxic effects are reduced and their phagocytic activity is enhanced. It is generally accepted that activation of monocytes and microglia has potential to decelerate neurodegenerative progression by modulating immune responses to increase the intrinsic phagocytic capacity of monocytes and microglia without triggering secretion of pro-inflammatory cytokines that could worsen neurodegeneration. Recent studies demonstrate that cromolyn exhibits significant M2 microglial activation, a phagocytic stage of damage repair by brain microglia.

Inhibition of the Secretion of Inflammatory Cytokines in Human Microglia (HMC3) by Cromolyn and F-Cromolyn.

Figure 7:
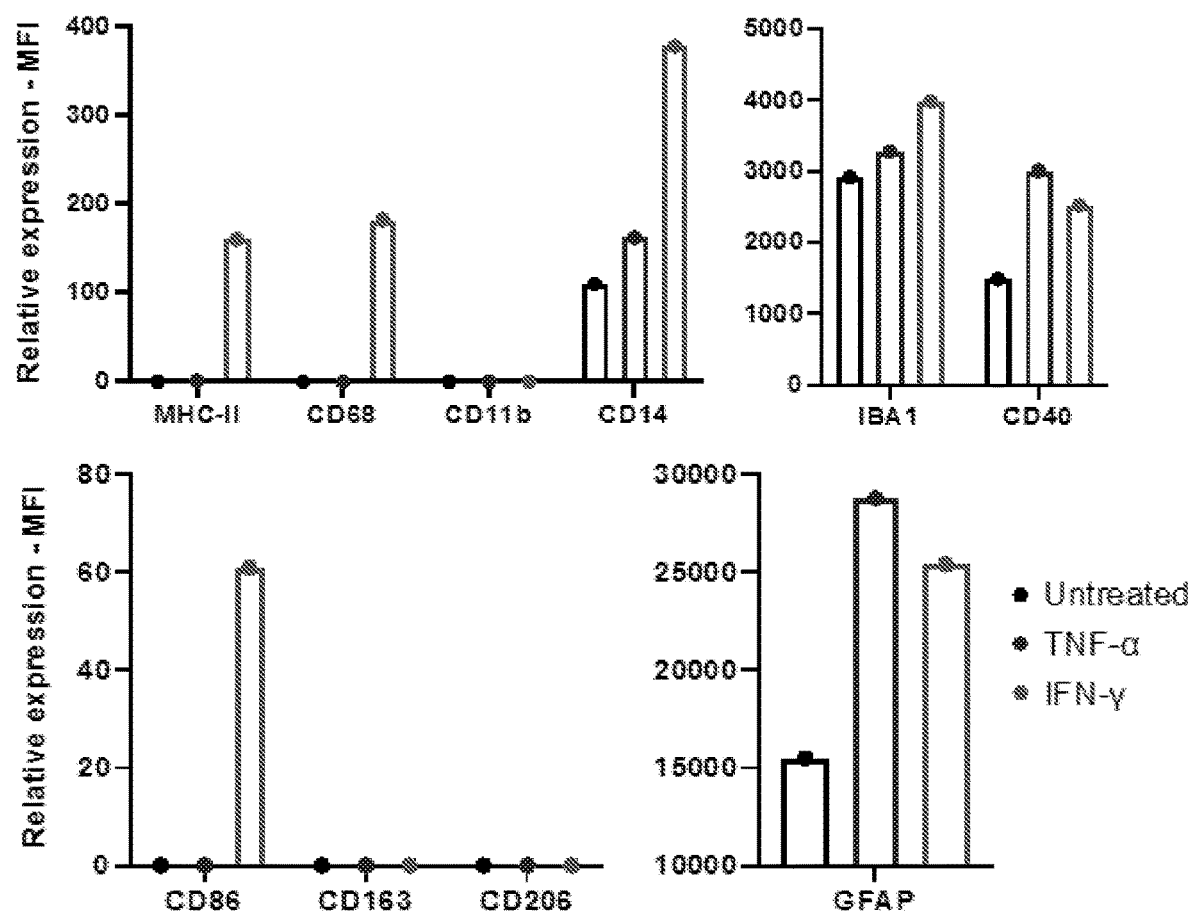
FIG. 7 shows flow cytometric analyses data upon activation of HMC3 human microglia cells by TNF-α and IFN-γ. The data demonstrate the increased protein expression of inflammatory microglia biomarkers (MHC-II, CD68, CD14, IBA-1, CD40, CD86) in the HMC3 cells treated with IFN-γ (300 ng/mL, 24 hr) (red), but no alteration in the expression of anti-inflammatory microglia biomarkers (CD163 and CD206). TNF-α (300 ng/mL, 24 hr) (blue) also increases the expression of inflammatory microglia biomarkers (CD14, IBA1, CD40).

The human microglial clone 3 (HMC3) microglia cell line was developed through SV40 immortalization of human primary microglial cells and is capable of reacting to inflammatory stimuli with regulation of typical markers of microglia activation. The density of microglia is not uniform in all regions of the brain and the presence of surface markers for activated microglia differ depending on their location in the CNS. As such, a microglial model of neuroinflammation need not exhibit all possible surface markers for inflammation, though common surface markers for activated microglia of an M1-like inflammatory phenotype include CD40, CD86, MHC-II, IBA-1, CD11b, CD14, and CD68, all of which, except for CD11b, are increased after IFN-γ administration (FIG. 7). Interestingly, expression of the astrocyte biomarker glial fibrillary acidic protein (GFAP) is observed in resting, untreated HMC3 microglia and subsequently increases after TNF-α and IFN-γ treatment, respectively (FIG. 7). GFAP has not been reported to be expressed in HMC3 cells, but have microglia has been found to be morphologically dynamic and can exhibit classical astrocyte markers from a variety of injurious stimuli. Importantly, due to the anti-inflammatory phagocytic surface markers CD163 and CD206 remaining unexpressed and unchanged prior to and after the addition of either IFN-γ or TNF-α, it is reasonable that HMC3 microglia behave as expected for a model of neuroinflammation, which can be associated with coronavirus infections.

Figure 8A:
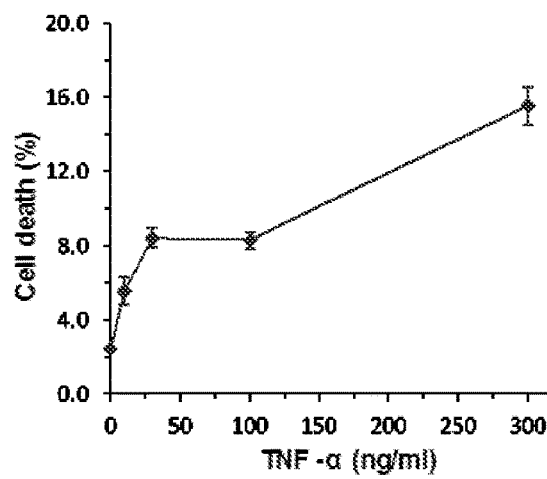
FIGS. 8A-8B show quantitative analysis graphs of the cell viability assay upon activation of HMC3 human microglia cells by TNF-α (8A) and IFN-γ (8B). The data show that both TNF-α and IFN-γ induce cell death in a concentration-dependent manner (0, 10, 30, 100, 300 ng/mL) for 24 hr in the HMC3 human microglial cells.
Figure 8B:
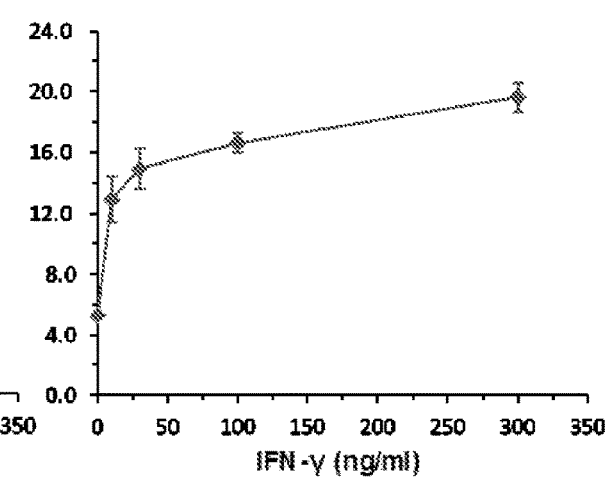
Figure 9:
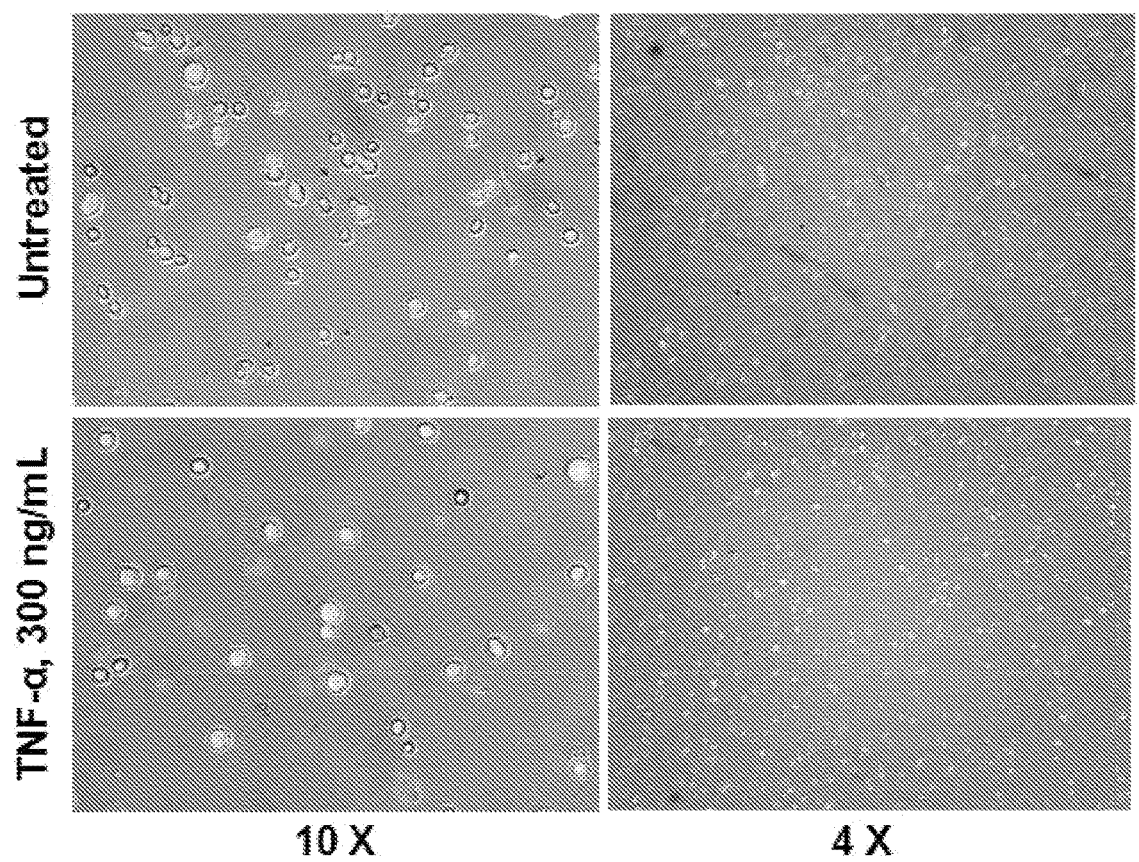
FIG. 9 shows representative fluorescence micrographs (displayed at 10× and 4× magnification) of the cell viability assay, demonstrating that both TNF-α and IFN-γ induce cell death in a concentration-dependent manner (0, 10, 30, 100, 300 ng/mL) for 24 hr in the HMC3 human microglial cells.

It has been verified through cell viability experiments that both TNF-α and IFN-γ exert microglia necrosis in a concentration-dependent manner up to 300 ng/mL for each, with microglia death at 19.7% with IFN-γ and 15.6% with TNF-α (FIG. 8). Representative AO/PI fluorescence images for 300 ng/mL TNF-α are presented at 4× and 10× magnification (FIG. 9). Interestingly, a more robust range of cytokine and chemokine secretion was observed in response to TNF-α than with IFN-γ stimulation. This aspect is partially due to TNF-α inducing less cell death than IFN-γ at the same concentration and thus TNF-α was subsequently used to induce cytokine and chemokine secretion by HMC3 microglia prior to addition of cromolyn and F-cromolyn.

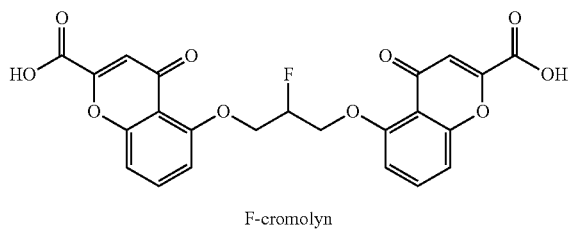 [SMILES: O=C(O)c1cc(=O)c2c(OCC(F)COc3cccc4oc(C(=O)O)cc(=O)c34)cccc2o1]

F-cromolyn

Figure 10:
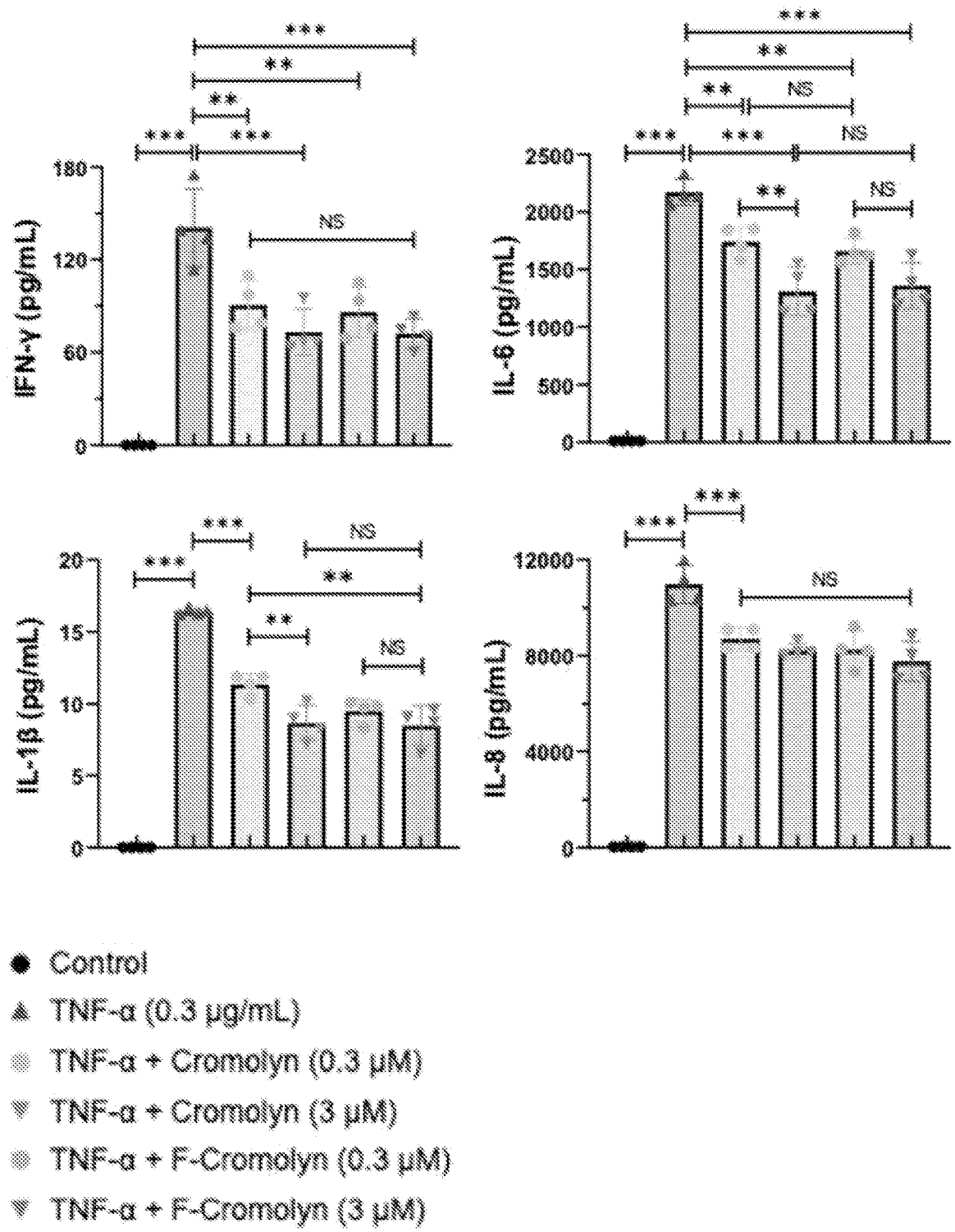
FIG. 10 shows graphs demonstrating quantitative analyses of MSD assays, which indicate the dramatically increased secretion of IFN-γ, IL-1β, IL-6 and IL-8 from HMC3 cells treated with TNF-α (300 ng/mL, 24 hr), which are subsequently reduced by cromolyn and F-cromolyn (0.3 μM and 3 μM) in a dose-dependent manner. $*p<0.05$, $p<0.01$, $*p<0.001$, and NS (no significant difference).

The cytokine TNF-α is known to be amply produced by monocytic cells, including microglia, and strongly influences many other inflammatory mediators to be upregulated by innate immune cells upon TNF-α exposure. Treatment of HMC3 cells with TNF-α potently induces inflammatory cytokine secretions by HMC3 cells as evidenced by the dramatic increase in cytokine concentration in cell culture supernatant after 24 hours of TNF-α treatment (FIG. 10). Compared to untreated HMC3 cells (control), treatment with TNF-α (0.3 mg/mL) resulted in >177-fold increase in IL-1β ($p<0.001$), IL-6 ($p<0.001$), and IL-8 ($p<0.001$) and caused the previously quiescent cells to secrete IFN-γ. The effect of both cromolyn and F-cromolyn was tested at a low (0.3 µM) and higher (3 µM) concentration against TNF-α induced cytokine secretion by HMC3 microglia. IFN-γ ($p=0.0033$), IL-6 ($p=0.0065$), IL-1β ($p=0.0005$), and IL-8 ($p=0.0006$) concentrations were decreased after addition of the lower 0.3 µM concentration of cromolyn and F-cromolyn. This inhibitory effect is dose-dependent for cromolyn, because the higher 3 µM concentration resulted in >40% inhibition of IFN-γ, IL-6, and IL-1β, and 25.8% inhibition of IL-8. Interestingly, F-cromolyn also decreases cytokine release in a dose-dependent manner, with the higher 3 µM concentration achieving >50% inhibition of both IFN-γ and IL-1β and 39.8% and 27.9% inhibition of IL-6 and IL-8, respectively (FIG. 11).

Figure 12:
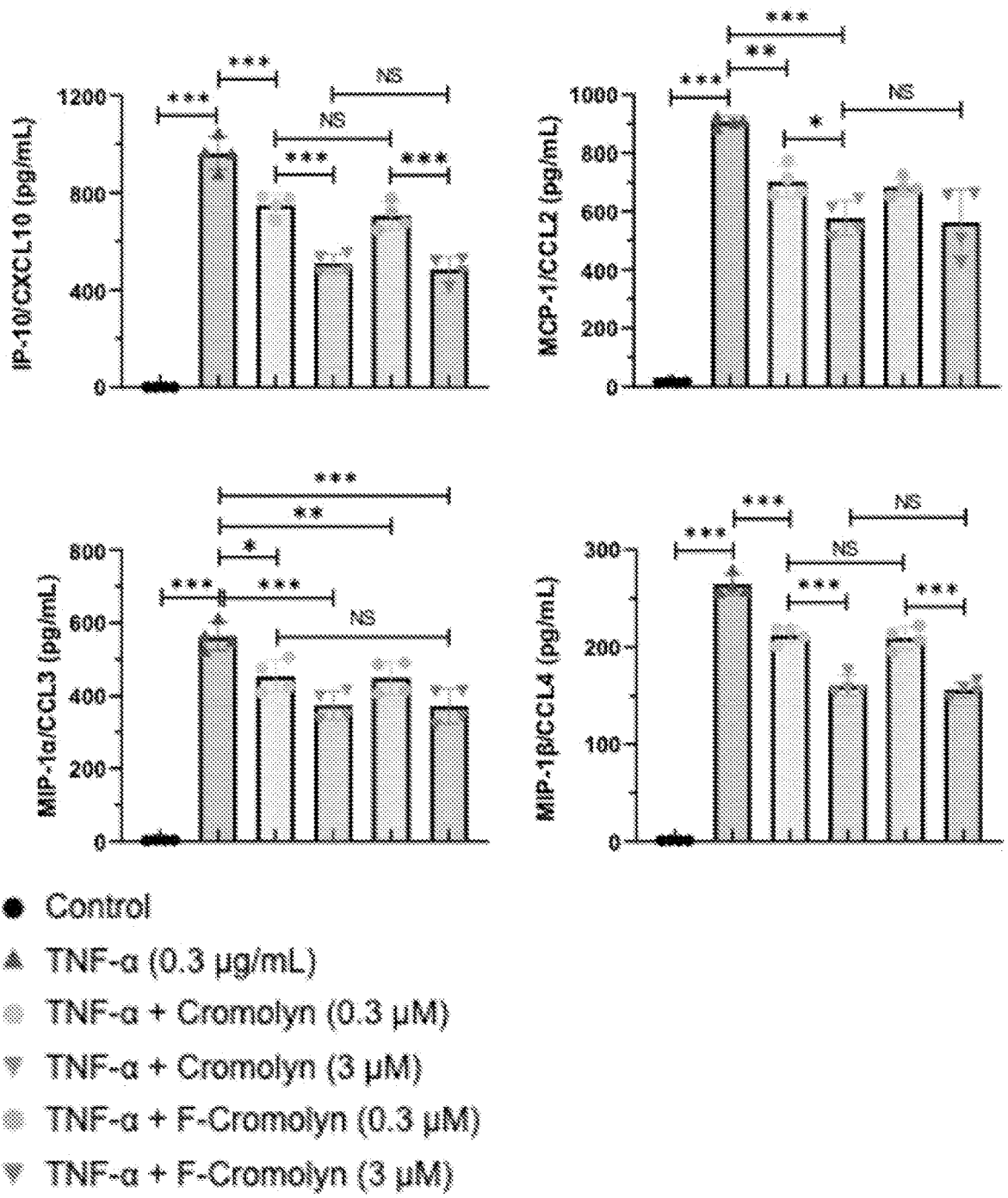
FIG. 12 shows graphs demonstrating quantitative analyses of MSD assays, which indicate the dramatically increased secretion of IP-10 (CXCL10), MCP-1 (CCL2), MIP-1α (CCL3) and MIP-1β (CCL4) from HMC3 cells treated with TNF α (300 ng/mL, 24 hr), which are subsequently reduced by cromolyn and F-cromolyn (0.3 μM and 3 μM) in a dose-dependent manner. $*p<0.05$, $p<0.01$, $*p<0.001$, and NS (no significant difference).

The effect of cromolyn and F-cromolyn on the production of extracellular chemokines after the treatment of HMC3 cells with 0.3 µg/mL TNF-α was tested (FIG. 12). Treatment with cromolyn (0.3 µM) resulted in a statistically significant reduction in the concentration of extracellular IP-10 (CXCL10) ($p<0.001$), MCP-1 (CCL2) ($p=0.0016$), MIP-1α (CCL3) ($p=0.0118$), and MIP-1β (CCL4) ($p<0.001$) compared to cells treated with TNF-α alone for 24 hours. Importantly, an even greater reduction in extracellular cytokine production at a higher concentration of cromolyn (3 µM) was observed, with >40% inhibition of IP-10 (CXCL10), MCP-1 (CCL2), and MIP-1β (CCL4), and 35.6% inhibition of MIP-1α (CCL3) compared to TNF-α cytokine induction levels. Additionally, it was observed that like cromolyn, F-cromolyn (0.3 µM) can inhibit the production of inflammatory chemokines IP-10 (CXCL10) ($p<0.001$), MCP-1 (CCL2) ($p<0.001$), MIP-1α (CCL3) ($P=0.0081$), and MIP-1β (CCL4) ($p<0.001$). F-cromolyn (3 µM) retained the dose-dependent inhibitory ability of HMC3 microglia chemokine secretion, including >40% inhibition of IP-10 (CXCL10), MCP-1 (CCL2), and MIP-1β (CCL4), and 36.0% inhibition of MIP-1α (CCL3) (FIG. 13). In conclusion, both cromolyn and F-cromolyn can dose-dependently inhibit the release of several inflammatory chemokines by HMC3 microglia cells.

Figure 14:
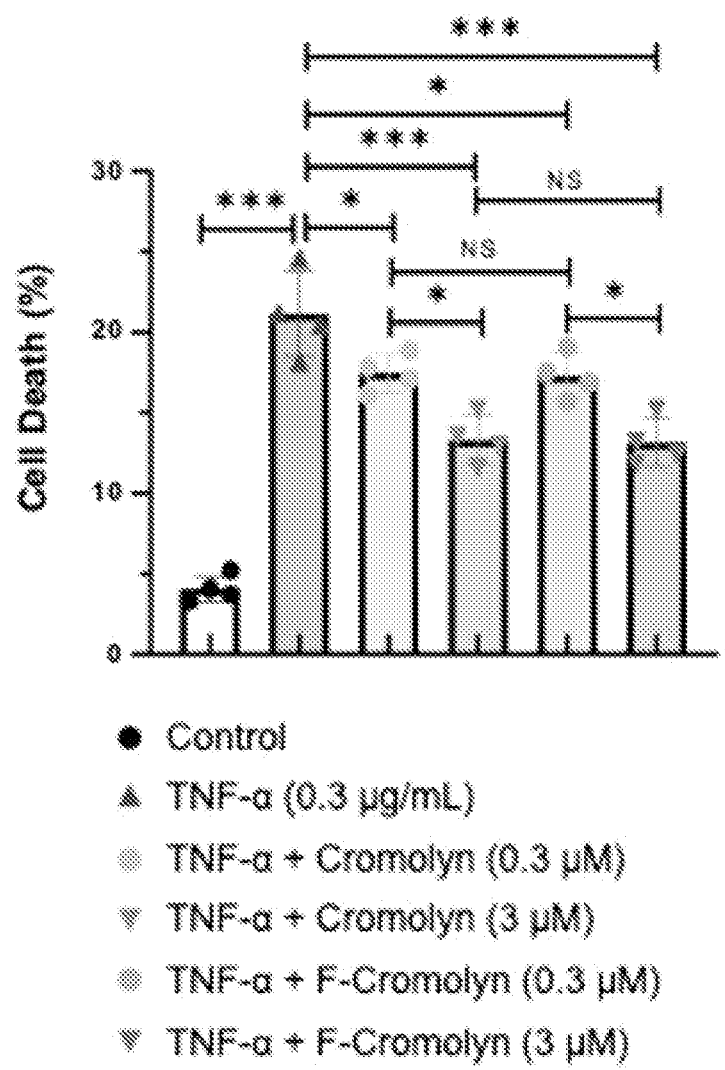
FIG. 14 shows a graph demonstrating cromolyn and F-cromolyn reduced TNF-α induced cell death in the HMC3 microglia cell line. The comparisons of multiple groups were carried out by one-way ANOVA, followed by Bonferroni's post-test. $*p<0.05$, $p<0.01$, $*p<0.001$, and NS (no significant difference).

Since cromolyn and F-cromolyn were found to reduce concentrations of secreted neurotoxic cytokines, cell necrosis experiments were carried out to verify if this property translated to enhanced cell viability. FIG. 14 shows that administration of TNF-α (0.3 µg/mL) to HMC3 cells was sufficient to increase cell death to approximately 20% of the total population, over four times that of controls. Addition of 0.3 µM cromolyn and F-cromolyn, respectively, significantly reduced cell death. Addition of higher 3 µM concentrations of cromolyn and F-cromolyn significantly reduced cell death even further, to increasing viability by approximately 40% over TNF-α induced HMC3 cells alone. Therefore, cromolyn and F-cromolyn are able to prevent HMC3 microglia cell death induced by TNF-α in a concentration-dependent manner.

Definitions

Unless defined otherwise, all technical and scientific terms used herein have the meaning commonly understood by a person skilled in the art of the present disclosure. The following references provide one of skill with a general definition of many of the terms used in this disclosure: Singleton et al., Dictionary of Microbiology and Molecular Biology (2nd ed. 1994); The Cambridge Dictionary of Science and Technology (Walker ed., 1988); The Glossary of Genetics, 5th Ed., R. Rieger et al. (eds.), Springer Verlag (1991); and Hale & Marham, The Harper Collins Dictionary of Biology (1991). As used herein, the following terms have the meanings ascribed to them below, unless specified otherwise.

In this disclosure, "comprises," "comprising," "containing" and "having" and the like can have the meaning ascribed to them in U.S. Patent law and can mean "includes," "including," and the like; "consisting essentially of" or "consists essentially" likewise has the meaning ascribed in U.S. Patent law and the term is open-ended, allowing for the presence of more than that which is recited so long as basic or novel characteristics of that which is recited is not changed by the presence of more than that which is recited, but excludes prior art embodiments.

When any variable (e.g., aryl, heterocyclyl, $R^2$, Ra, etc.) occurs more than once in a compound, its definition on each occurrence is independent of any other occurrence.

Unless specifically stated or obvious from context, as used herein, the term "or" is understood to be inclusive. Unless specifically stated or obvious from context, as used herein, the terms "a", "an", and "the" are understood to be singular or plural.

An "alkyl" group or "alkane" is a straight chained or branched non-aromatic hydrocarbon that is completely saturated. Typically, a straight chained or branched alkyl group has from 1 to about 20 carbon atoms, preferably from 1 to about 10 unless otherwise defined. Examples of straight chained and branched alkyl groups include methyl, ethyl, n-propyl, iso-propyl, n-butyl, sec-butyl, tert-butyl, pentyl, hexyl, pentyl and octyl. A $C_1$-$C_6$ straight chained or branched alkyl group is also referred to as a "lower alkyl" group.

Moreover, the term "alkyl" (or "lower alkyl") as used throughout the specification, examples, and claims is intended to include both "unsubstituted alkyls" and "substituted alkyls", the latter of which refers to alkyl moieties having substituents replacing a hydrogen on one or more carbons of the hydrocarbon backbone. Such substituents, if not otherwise specified, can include, for example, a halogen, a hydroxyl, a carbonyl (such as a carboxyl, an alkoxycarbonyl, a formyl, or an acyl), a thiocarbonyl (such as a thioester, a thioacetate, or a thioformate), an alkoxy, a phosphoryl, a phosphate, a phosphonate, a phosphinate, an amino, an amido, an amidine, an imine, a cyano, a nitro, an azido, a sulfhydryl, an alkylthio, a sulfate, a sulfonate, a sulfamoyl, a sulfonamido, a sulfonyl, a heterocyclyl, an aralkyl, or an aromatic or heteroaromatic moiety. It will be understood by those skilled in the art that the moieties substituted on the hydrocarbon chain can themselves be substituted, if appropriate. For instance, the substituents of a substituted alkyl may include substituted and unsubstituted forms of amino, azido, imino, amido, phosphoryl (including phosphonate and phosphinate), sulfonyl (including sulfate, sulfonamido, sulfamoyl and sulfonate), and silyl groups, as well as ethers, alkylthios, carbonyls (including ketones, aldehydes, carboxylates, and esters), —$CF_3$, —CN and the like. Exemplary substituted alkyls are described below. Cycloalkyls can be further substituted with alkyls, alkenyls, alkoxys, alkylthios, aminoalkyls, carbonyl-substituted alkyls, —$CF_3$, —CN, and the like.

The term "$C_{x-y}$" when used in conjunction with a chemical moiety, such as alkyl, is meant to include groups that contain from x to y carbons in the chain. For example, the term "$C_{x-y}$alkyl" refers to substituted or unsubstituted saturated hydrocarbon groups, including straight-chain alkyl and branched-chain alkyl groups that contain from x to y carbons in the chain, including haloalkyl groups such as trifluoromethyl and 2,2,2-trifluoroethyl, etc.

The terms "halo" and "halogen" as used herein means halogen and includes chloro, fluoro, bromo, and iodo.

The term "substituted" refers to moieties having substituents replacing a hydrogen on one or more carbons of the backbone. It will be understood that "substitution" or "substituted with" includes the implicit proviso that such substitution is in accordance with permitted valence of the substituted atom and the substituent, and that the substitution results in a stable compound, e.g., which does not spontaneously undergo transformation such as by rearrangement, cyclization, elimination, etc. As used herein, the term "substituted" is contemplated to include all permissible substituents of organic compounds. In a broad aspect, the permissible substituents include acyclic and cyclic, branched and unbranched, carbocyclic and heterocyclic, aromatic and non-aromatic substituents of organic compounds. The permissible substituents can be one or more and the same or different for appropriate organic compounds. It will be understood by those skilled in the art that substituents can themselves be substituted, if appropriate. Unless specifically stated as "unsubstituted," references to chemical moieties herein are understood to include substituted variants. For example, reference to an "alkyl" group or moiety implicitly includes both substituted and unsubstituted variants.

The compounds of the invention may be present in the form of pharmaceutically acceptable salts. For use in medicines, the salts of the compounds of the invention refer to non-toxic "pharmaceutically acceptable salts." Pharmaceutically acceptable salt forms include pharmaceutically acceptable acidic/anionic or basic/cationic salts.

Pharmaceutically acceptable acidic/anionic salts include acetate, benzenesulfonate, benzoate, bicarbonate, bitartrate, bromide, calcium edetate, camsylate, carbonate, chloride, citrate, dihydrochloride, edetate, edisylate, estolate, esylate, fumarate, glyceptate, gluconate, glutamate, glycollylarsanilate, hexylresorcinate, hydrobromide, hydrochloride, hydroxynaphthoate, iodide, isethionate, lactate, lactobionate, malate, maleate, mandelate, mesylate, methylsulfate, mucate, napsylate, nitrate, pamoate, pantothenate, phosphate/diphosphate, polygalacturonate, salicylate, stearate, subacetate, succinate, sulfate, tannate, tartrate, teoclate, tosylate, and triethiodide salts.

Salts of the disclosed compounds containing a carboxylic acid or other acidic functional group can be prepared by reacting with a suitable base. Such a pharmaceutically acceptable salt may be made with a base which affords a pharmaceutically acceptable cation, which includes alkali metal salts (especially sodium and potassium), alkaline earth metal salts (especially calcium and magnesium), aluminum salts and ammonium salts, as well as salts made from physiologically acceptable organic bases such as trimethylamine, triethylamine, morpholine, pyridine, piperidine, picoline, dicyclohexylamine, N,N'-dibenzylethylenediamine, 2-hydroxyethylamine, bis-(2-hydroxyethyl)amine, tri-(2-hydroxyethyl)amine, procaine, dibenzylpiperidine, dehydroabietylamine, N,N'-bisdehydroabietylamine, glucamine, N-methylglucamine, collidine, quinine, quinoline, and basic amino acid such as lysine and arginine.

The invention also includes various isomers and mixtures thereof "Isomer" refers to compounds that have the same composition and molecular weight but differ in physical and/or chemical properties. The structural difference may be in constitution (geometric isomers) or in the ability to rotate the plane of polarized light (stereoisomers).

"Geometric isomer" means isomers that differ in the orientation of substituent atoms in relationship to a carbon-carbon double bond, to a cycloalkyl ring, or to a bridged bicyclic system. Atoms (other than H) on each side of a carbon-carbon double bond may be in an E (substituents are on opposite sides of the carbon-carbon double bond) or Z (substituents are oriented on the same side) configuration.

Atoms (other than H) attached to a carbocyclic ring may be in a cis or trans configuration. In the "cis" configuration, the substituents are on the same side in relationship to the plane of the ring; in the "trans" configuration, the substituents are on opposite sides in relationship to the plane of the ring. A mixture of "cis" and "trans" species is designated "cis/trans".

The compounds of the invention may be prepared as individual isomers by either isomer-specific synthesis or resolved from an isomeric mixture. Conventional resolution techniques include forming the salt of a free base of each isomer of an isomeric pair using an optically active acid (followed by fractional crystallization and regeneration of the free base), forming the salt of the acid form of each isomer of an isomeric pair using an optically active amine (followed by fractional crystallization and regeneration of the free acid), forming an ester or amide of each of the isomers of an isomeric pair using an optically pure acid, amine or alcohol (followed by chromatographic separation and removal of the chiral auxiliary), or resolving an isomeric mixture of either a starting material or a final product using various well known chromatographic methods.

When the stereochemistry of a disclosed compound is named or depicted by structure, the named or depicted stereoisomer is at least 60%, 70%, 80%, 90%, 99% or 99.9% by weight pure relative to the other stereoisomers. When the geometry of a disclosed compound is named or depicted by structure, the named or depicted geometrical isomer is at least 60%, 70%, 80%, 90%, 99% or 99.9% by weight pure relative to the other geometrical isomers.

The term "subject" to which administration is contemplated includes, but is not limited to, humans (i.e., a male or female of any age group, e.g., a pediatric subject (e.g., infant, child, adolescent) or adult subject (e.g., young adult, middle-aged adult or senior adult)) and/or other primates (e.g., cynomolgus monkeys, rhesus monkeys); mammals, including commercially relevant mammals such as cattle, pigs, horses, sheep, goats, cats, and/or dogs; and/or birds, including commercially relevant birds such as chickens, ducks, geese, quail, and/or turkeys. Preferred subjects are humans.

As used herein, a therapeutic that "prevents" a disorder or condition refers to a compound that, in a statistical sample, reduces the occurrence of the disorder or condition in the treated sample relative to an untreated control sample, or delays the onset or reduces the severity of one or more symptoms of the disorder or condition relative to the untreated control sample.

The term "treating" means to decrease, suppress, attenuate, diminish, arrest, or stabilize the development or progression of a disease (e.g., a disease or disorder delineated herein), lessen the severity of the disease or improve the symptoms associated with the disease. Treatment includes treating a symptom of a disease, disorder or condition.

As used herein, the term "inflammation condition induced by a coronavirus infection" refers to an acute inflammation of tissues and organs that occurs as a result of a coronavirus infection. The inflammation condition induced by a coronavirus infection can be due to the direct viral infection of the tissues or organs, or can be due to the release of pro-inflammatory cytokines and chemokines as part of the immune reaction to the coronavirus. For example, an inflammation condition induced by a coronavirus infection can be acute respiratory distress syndrome (ARDS), pneumonia, myocarditis, haemophagocytic lymphohistiocytosis (sHLH), or sepsis.

As used herein, the term "coronavirus" refers to a virus belonging to the subfamily Orthocoronavirinae, in the family Coronaviridae, order Nidovirales, and realm Riboviria. A coronavirus is an enveloped virus with a positive-sense single-stranded RNA genome and a nucleocapsid of helical symmetry. Coronavirus refers, for example, to the following human viruses: human coronavirus 229E, human coronavirus OC43, SARS-CoV, HCoV, HKU1, MERS-CoV, and SARS-CoV-2. In some embodiments, coronavirus is SARS-CoV-2.

As used herein, the term "biologic" refers to a pharmaceutical drug product manufactured in, extracted from, or semisynthesized from biological sources. Biologics are isolated from a variety of natural sources—human, animal, microorganism, fungus, or plant, or they can be produced by recombinant DNA. Biologics include, but are not limited to, hyperimmune globulins, vaccines, whole blood, blood components, allergenics, somatic cells, gene therapies, tissues, organ transplants, cloned proteins, products of recombinant DNA, DNA gene therapies, miRNA, siRNA, drug preparations comprising nucleotides or amino acids, monoclonal antibodies (mAbs) and their fragments, peptides, fusion proteins, recombinant therapeutic proteins, glycoproteins, and living cells used in cell therapy. For example, the term "biologics" refers to hormones, such as insulin, erythropoietin, or growth-stimulating hormone, to monoclonal antibodies (mAb), or to receptor constructs such as fusion proteins. Additionally, the term "biologics" refers to immunotherapy agents, including IECs such as lymphocytes, macrophages, dendritic cells, natural killer cells, cytotoxic T lymphocytes (CTL), and CAR-T cells.

A "therapeutically effective amount", as used herein refers to an amount that is sufficient to achieve a desired therapeutic effect. For example, a therapeutically effective amount can refer to an amount that is sufficient to improve at least one sign or symptom of diseases or conditions disclosed herein, Pharmaceutical Compositions In certain embodiments, the present invention provides a pharmaceutical composition, comprising a compound of Formula I or Formula II and a pharmaceutically acceptable excipient.

The compositions and methods of the present invention may be utilized to treat a subject in need thereof. In certain embodiments, the subject is a mammal such as a human, or a non-human mammal. When administered to subject, such as a human, the composition or the compound is preferably administered as a pharmaceutical composition comprising, for example, a compound of the invention and a pharmaceutically acceptable carrier. Pharmaceutically acceptable carriers are well known in the art and include, for example, aqueous solutions such as water or physiologically buffered saline or other solvents or vehicles such as glycols, glycerol, oils such as olive oil, or injectable organic esters. In a preferred embodiment, when such pharmaceutical compositions are for human administration, particularly for invasive routes of administration (i.e., routes, such as injection or implantation, that circumvent transport or diffusion through an epithelial barrier), the aqueous solution is pyrogen-free, or substantially pyrogen-free. The excipients can be chosen, for example, to effect delayed release of an agent or to selectively target one or more cells, tissues or organs. The pharmaceutical composition can be in dosage unit form such as tablet, capsule (including sprinkle capsule and gelatin capsule), granule, lyophile for reconstitution, powder, solution, syrup, suppository, injection or the like. The composition can also be present in a transdermal delivery system, e.g., a skin patch. The composition can also be present in a solution suitable for topical administration, such as an eye drop.

A pharmaceutically acceptable carrier can contain physiologically acceptable agents that act, for example, to stabilize, increase solubility or to increase the absorption of a compound such as a compound of the invention. Such physiologically acceptable agents include, for example, carbohydrates, such as glucose, sucrose or dextrans, antioxidants, such as ascorbic acid or glutathione, chelating agents, low molecular weight proteins or other stabilizers or excipients. The choice of a pharmaceutically acceptable carrier, including a physiologically acceptable agent, depends, for example, on the route of administration of the composition. The preparation or pharmaceutical composition can be a self-emulsifying drug delivery system or a self-microemulsifying drug delivery system. The pharmaceutical composition (preparation) also can be a liposome or other polymer matrix, which can have incorporated therein, for example, a compound of the invention. Liposomes, for example, which comprise phospholipids or other lipids, are nontoxic, physiologically acceptable and metabolizable carriers that are relatively simple to make and administer.

The phrase "pharmaceutically acceptable" is employed herein to refer to those compounds, materials, compositions, and/or dosage forms which are, within the scope of sound medical judgment, suitable for use in contact with the tissues of a subject without excessive toxicity, irritation, allergic response, or other problem or complication, commensurate with a reasonable benefit/risk ratio.

The phrase "pharmaceutically acceptable carrier" as used herein means a pharmaceutically acceptable material, composition or vehicle, such as a liquid or solid filler, diluent, excipient, solvent or encapsulating material. Each carrier must be "acceptable" in the sense of being compatible with the other ingredients of the formulation and not injurious to the subject. Some examples of materials which can serve as pharmaceutically acceptable carriers include: (1) sugars, such as lactose, glucose and sucrose; (2) starches, such as corn starch and potato starch; (3) cellulose, and its derivatives, such as sodium carboxymethyl cellulose, ethyl cellulose and cellulose acetate; (4) powdered tragacanth; (5) malt; (6) gelatin; (7) talc; (8) excipients, such as cocoa butter and suppository waxes; (9) oils, such as peanut oil, cottonseed oil, safflower oil, sesame oil, olive oil, corn oil and soybean oil; (10) glycols, such as propylene glycol; (11) polyols, such as glycerin, sorbitol, mannitol and polyethylene glycol; (12) esters, such as ethyl oleate and ethyl laurate; (13) agar; (14) buffering agents, such as magnesium hydroxide and aluminum hydroxide; (15) alginic acid; (16) pyrogen-free water; (17) isotonic saline; (18) Ringer's solution; (19) ethyl alcohol; (20) phosphate buffer solutions; and (21) other non-toxic compatible substances employed in pharmaceutical formulations.

A pharmaceutical composition (preparation) can be administered to a subject by any of a number of routes of administration including, for example, orally (for example, drenches as in aqueous or non-aqueous solutions or suspensions, tablets, capsules (including sprinkle capsules and gelatin capsules), boluses, powders, granules, pastes for application to the tongue); absorption through the oral mucosa (e.g., sublingually); anally, rectally or vaginally (for example, as a pessary, cream or foam); parenterally (including intramuscularly, intravenously, subcutaneously or intrathecally as, for example, a sterile solution or suspension); nasally; intraperitoneally; subcutaneously; transdermally (for example as a patch applied to the skin); and topically (for example, as a cream, ointment or spray applied to the skin, or as an eye drop). The compound may also be formulated for inhalation. In certain embodiments, a compound may be simply dissolved or suspended in sterile water. Details of appropriate routes of administration and compositions suitable for same can be found in, for example, U.S. Pat. Nos. 6,110,973, 5,763,493, 5,731,000, 5,541,231, 5,427,798, 5,358,970 and 4,172,896, the contents of which are incorporated herein by reference in their entirety, as well as in patents cited therein.

The formulations may conveniently be presented in unit dosage form and may be prepared by any methods well known in the art of pharmacy. The amount of active ingredient that can be combined with a carrier material to produce a single dosage form will vary depending upon the subject being treated, the particular mode of administration. The amount of active ingredient that can be combined with a carrier material to produce a single dosage form will generally be that amount of the compound that produces a therapeutic effect.

Methods of preparing these formulations or compositions include the step of bringing into association an active compound, such as a compound of the invention, with the carrier and, optionally, one or more accessory ingredients. In general, the formulations are prepared by uniformly and intimately bringing into association a compound of the present invention with liquid carriers, or finely divided solid carriers, or both, and then, if necessary, shaping the product.

Formulations of the invention suitable for oral administration may be in the form of capsules (including sprinkle capsules and gelatin capsules), cachets, pills, tablets, lozenges (using a flavored basis, usually sucrose and acacia or tragacanth), lyophile, powders, granules, or as a solution or a suspension in an aqueous or non-aqueous liquid, or as an oil-in-water or water-in-oil liquid emulsion, or as an elixir or syrup, or as pastilles (using an inert base, such as gelatin and glycerin, or sucrose and acacia) and/or as mouth washes and the like, each containing a predetermined amount of a compound of the present invention as an active ingredient. Compositions or compounds may also be administered as a bolus, electuary or paste.

To prepare solid dosage forms for oral administration (capsules (including sprinkle capsules and gelatin capsules), tablets, pills, dragees, powders, granules and the like), the active ingredient is mixed with one or more pharmaceutically acceptable carriers, such as sodium citrate or dicalcium phosphate, and/or any of the following: (1) fillers or extenders, such as starches, lactose, sucrose, glucose, mannitol, and/or silicic acid; (2) binders, such as, for example, carboxymethylcellulose, alginates, gelatin, polyvinyl pyrrolidone, sucrose and/or acacia; (3) humectants, such as glycerol; (4) disintegrating agents, such as agar-agar, calcium carbonate, potato or tapioca starch, alginic acid, certain silicates, and sodium carbonate; (5) solution retarding agents, such as paraffin; (6) absorption accelerators, such as quaternary ammonium compounds; (7) wetting agents, such as, for example, cetyl alcohol and glycerol monostearate; (8) absorbents, such as kaolin and bentonite clay; (9) lubricants, such a talc, calcium stearate, magnesium stearate, solid polyethylene glycols, sodium lauryl sulfate, and mixtures thereof; (10) complexing agents, such as, modified and unmodified cyclodextrins; and (11) coloring agents. In the case of capsules (including sprinkle capsules and gelatin capsules), tablets and pills, the pharmaceutical compositions may also comprise buffering agents. Solid compositions of a similar type may also be employed as fillers in soft and hard-filled gelatin capsules using such excipients as lactose or milk sugars, as well as high molecular weight polyethylene glycols and the like.

A tablet may be made by compression or molding, optionally with one or more accessory ingredients. Compressed tablets may be prepared using binder (for example, gelatin or hydroxypropylmethyl cellulose), lubricant, inert diluent, preservative, disintegrant (for example, sodium starch glycolate or cross-linked sodium carboxymethyl cellulose), surface-active or dispersing agent. Molded tablets may be made by molding in a suitable machine a mixture of the powdered compound moistened with an inert liquid diluent.

The tablets, and other solid dosage forms of the pharmaceutical compositions, such as dragees, capsules (including sprinkle capsules and gelatin capsules), pills and granules, may optionally be scored or prepared with coatings and shells, such as enteric coatings and other coatings well known in the pharmaceutical-formulating art. They may also be formulated so as to provide slow or controlled release of the active ingredient therein using, for example, hydroxypropylmethyl cellulose in varying proportions to provide the desired release profile, other polymer matrices, liposomes and/or microspheres. They may be sterilized by, for example, filtration through a bacteria-retaining filter, or by incorporating sterilizing agents in the form of sterile solid compositions that can be dissolved in sterile water, or some other sterile injectable medium immediately before use. These compositions may also optionally contain opacifying agents and may be of a composition that they release the active ingredient(s) only, or preferentially, in a certain portion of the gastrointestinal tract, optionally, in a delayed manner. Examples of embedding compositions that can be used include polymeric substances and waxes. The active ingredient can also be in micro-encapsulated form, if appropriate, with one or more of the above-described excipients.

Liquid dosage forms useful for oral administration include pharmaceutically acceptable emulsions, lyophiles for reconstitution, microemulsions, solutions, suspensions, syrups and elixirs. In addition to the active ingredient, the liquid dosage forms may contain inert diluents commonly used in the art, such as, for example, water or other solvents, cyclodextrins and derivatives thereof, solubilizing agents and emulsifiers, such as ethyl alcohol, isopropyl alcohol, ethyl carbonate, ethyl acetate, benzyl alcohol, benzyl benzoate, propylene glycol, 1,3-butylene glycol, oils (in particular, cottonseed, groundnut, corn, germ, olive, castor and sesame oils), glycerol, tetrahydrofuryl alcohol, polyethylene glycols and fatty acid esters of sorbitan, and mixtures thereof.

Besides inert diluents, the oral compositions can also include adjuvants such as wetting agents, emulsifying and suspending agents, sweetening, flavoring, coloring, perfuming and preservative agents.

Suspensions, in addition to the active compounds, may contain suspending agents as, for example, ethoxylated isostearyl alcohols, polyoxyethylene sorbitol and sorbitan esters, microcrystalline cellulose, aluminum metahydroxide, bentonite, agar-agar and tragacanth, and mixtures thereof.

Formulations of the pharmaceutical compositions for rectal, vaginal, or urethral administration may be presented as a suppository, which may be prepared by mixing one or more active compounds with one or more suitable nonirritating excipients or carriers comprising, for example, cocoa butter, polyethylene glycol, a suppository wax or a salicylate, and which is solid at room temperature, but liquid at body temperature and, therefore, will melt in the rectum or vaginal cavity and release the active compound.

Formulations of the pharmaceutical compositions for administration to the mouth may be presented as a mouthwash, or an oral spray, or an oral ointment.

Alternatively or additionally, compositions can be formulated for delivery via a catheter, stent, wire, or other intraluminal device. Delivery via such devices may be especially useful for delivery to the bladder, urethra, ureter, rectum, or intestine.

Formulations which are suitable for vaginal administration also include pessaries, tampons, creams, gels, pastes, foams or spray formulations containing such carriers as are known in the art to be appropriate.

Dosage forms for the topical or transdermal administration include powders, sprays, ointments, pastes, creams, lotions, gels, solutions, patches and inhalants. The active compound may be mixed under sterile conditions with a pharmaceutically acceptable carrier, and with any preservatives, buffers, or propellants that may be required.

The ointments, pastes, creams and gels may contain, in addition to an active compound, excipients, such as animal and vegetable fats, oils, waxes, paraffins, starch, tragacanth, cellulose derivatives, polyethylene glycols, silicones, bentonites, silicic acid, talc and zinc oxide, or mixtures thereof.

Powders and sprays can contain, in addition to an active compound, excipients such as lactose, talc, silicic acid, aluminum hydroxide, calcium silicates and polyamide powder, or mixtures of these substances. Sprays can additionally contain customary propellants, such as chlorofluorohydrocarbons and volatile unsubstituted hydrocarbons, such as butane and propane.

Transdermal patches have the added advantage of providing controlled delivery of a compound of the present invention to the body. Such dosage forms can be made by dissolving or dispersing the active compound in the proper medium. Absorption enhancers can also be used to increase the flux of the compound across the skin. The rate of such flux can be controlled by either providing a rate controlling membrane or dispersing the compound in a polymer matrix or gel.

Ophthalmic formulations, eye ointments, powders, solutions and the like, are also contemplated as being within the scope of this invention. Exemplary ophthalmic formulations are described in U.S. Publication Nos. 2005/0080056, 2005/0059744, 2005/0031697 and 2005/004074 and U.S. Pat. No. 6,583,124, the contents of which are incorporated herein by reference in their entirety. If desired, liquid ophthalmic formulations have properties similar to that of lacrimal fluids, aqueous humor or vitreous humor or are compatible with such fluids. A preferred route of administration is local administration (e.g., topical administration, such as eye drops, or administration via an implant).

The phrases "parenteral administration" and "administered parenterally" as used herein means modes of administration other than enteral and topical administration, usually by injection or infusion, and includes, without limitation, intravenous, intramuscular, intraarterial, intrathecal, intracapsular, intraorbital, intracardiac, intradermal, intraperitoneal, transtracheal, subcutaneous, subcuticular, intraarticular, subcapsular, subarachnoid, intraspinal and intrasternal injection and infusion.

Pharmaceutical compositions suitable for parenteral administration comprise one or more active compounds in combination with one or more pharmaceutically acceptable sterile isotonic aqueous or nonaqueous solutions, dispersions, suspensions or emulsions, or sterile powders which may be reconstituted into sterile injectable solutions or dispersions just prior to use, which may contain antioxidants, buffers, bacteriostats, solutes which render the formulation isotonic with the blood of the intended recipient or suspending or thickening agents.

Examples of suitable aqueous and nonaqueous carriers that may be employed in the pharmaceutical compositions of the invention include water, ethanol, polyols (such as glycerol, propylene glycol, polyethylene glycol, and the like), and suitable mixtures thereof, vegetable oils, such as olive oil, and injectable organic esters, such as ethyl oleate. Proper fluidity can be maintained, for example, by the use of coating materials, such as lecithin, by the maintenance of the required particle size in the case of dispersions, and by the use of surfactants.

These compositions may also contain adjuvants such as preservatives, wetting agents, emulsifying agents and dispersing agents. Prevention of the action of microorganisms may be ensured by the inclusion of various antibacterial and antifungal agents, for example, paraben, chlorobutanol, phenol sorbic acid, and the like. It may also be desirable to include isotonic agents, such as sugars, sodium chloride, and the like into the compositions. In addition, prolonged absorption of the injectable pharmaceutical form may be brought about by the inclusion of agents that delay absorption such as aluminum monostearate and gelatin.

In some cases, in order to prolong the effect of a drug, it is desirable to slow the absorption of the drug from subcutaneous or intramuscular injection. This may be accomplished by the use of a liquid suspension of crystalline or amorphous material having poor water solubility. The rate of absorption of the drug then depends upon its rate of dissolution, which, in turn, may depend upon crystal size and crystalline form. Alternatively, delayed absorption of a parenterally administered drug form is accomplished by dissolving or suspending the drug in an oil vehicle.

Injectable depot forms are made by forming microencapsulated matrices of the subject compounds in biodegradable polymers such as polylactide-polyglycolide. Depending on the ratio of drug to polymer, and the nature of the particular polymer employed, the rate of drug release can be controlled. Examples of other biodegradable polymers include poly(orthoesters) and poly(anhydrides). Depot injectable formulations are also prepared by entrapping the drug in liposomes or microemulsions that are compatible with body tissue.

For use in the methods of this invention, active compounds can be given per se or as a pharmaceutical composition containing, for example, 0.1 to 99.5% (more preferably, 0.5 to 90%) of active ingredient in combination with a pharmaceutically acceptable carrier.

Methods of introduction may also be provided by rechargeable or biodegradable devices. Various slow release polymeric devices have been developed and tested in vivo in recent years for the controlled delivery of drugs, including proteinaceous biopharmaceuticals. A variety of biocompatible polymers (including hydrogels), including both biodegradable and non-degradable polymers, can be used to form an implant for the sustained release of a compound at a particular target site.

Actual dosage levels of the active ingredients in the pharmaceutical compositions may be varied so as to obtain an amount of the active ingredient that is effective to achieve the desired therapeutic response for a particular patient, composition, and mode of administration, without being toxic to the patient.

The selected dosage level will depend upon a variety of factors including the activity of the particular compound or combination of compounds employed, or the ester, salt or amide thereof, the route of administration, the time of administration, the rate of excretion of the particular compound(s) being employed, the duration of the treatment, other drugs, compounds and/or materials used in combination with the particular compound(s) employed, the age, sex, weight, condition, general health and prior medical history of the subject being treated, and like factors well known in the medical arts.

A physician or veterinarian having ordinary skill in the art can readily determine and prescribe the therapeutically effective amount of the pharmaceutical composition required. For example, the physician or veterinarian could start doses of the pharmaceutical composition or compound at levels lower than that required in order to achieve the desired therapeutic effect and gradually increase the dosage until the desired effect is achieved. By "therapeutically effective amount" is meant the concentration of a compound that is sufficient to elicit the desired therapeutic effect. It is generally understood that the effective amount of the compound will vary according to the weight, sex, age, and medical history of the subject. Other factors which influence the effective amount may include, but are not limited to, the severity of the subject's condition, the disorder being treated, the stability of the compound, and, if desired, another type of therapeutic agent being administered with the compound of the invention. A larger total dose can be delivered by multiple administrations of the agent. Methods to determine efficacy and dosage are known to those skilled in the art (Isselbacher et al. (1996) Harrison's Principles of Internal Medicine 13 ed., 1814-1882, herein incorporated by reference).

In general, a suitable daily dose of an active compound used in the compositions and methods of the invention will be that amount of the compound that is the lowest dose effective to produce a therapeutic effect. Such an effective dose will generally depend upon the factors described above.

If desired, the effective daily dose of the active compound may be administered as one, two, three, four, five, six or more sub-doses administered separately at appropriate intervals throughout the day, optionally, in unit dosage forms. In certain embodiments of the present invention, the active compound may be administered two or three times daily. In preferred embodiments, the active compound will be administered once daily.

This invention includes the use of pharmaceutically acceptable salts of compounds of the invention in the compositions and methods of the present invention. In certain embodiments, contemplated salts of the invention include, but are not limited to, alkyl, dialkyl, trialkyl or tetra-alkyl ammonium salts. In certain embodiments, contemplated salts of the invention include, but are not limited to, L-arginine, benethamine, benzathine, betaine, calcium hydroxide, choline, decanol, diethanolamine, diethylamine, 2-(diethylamino)ethanol, ethanolamine, ethylenediamine, N-methylglucamine, hydrabamine, 1H-imidazole, lithium, L-lysine, magnesium. 4-(2-hydroxyethyl)morpholine, piperazine, potassium, 1-(2-hydroxyethyl)pyrrolidine, sodium, triethanolamine, tromethamine, and zinc salts. In certain embodiments, contemplated salts of the invention include, but are not limited to, Na, Ca, K, Mg, Zn or other metal salts.

The pharmaceutically acceptable acid addition salts can also exist as various solvates, such as with water, methanol, ethanol, dimethylformamide, and the like. Mixtures of such solvates can also be prepared. The source of such solvate can be from the solvent of crystallization, inherent in the solvent of preparation or crystallization, or adventitious to such solvent.

Wetting agents, emulsifiers and lubricants, such as sodium lauryl sulfate and magnesium stearate, as well as coloring agents, release agents, coating agents, sweetening, flavoring and perfuming agents, preservatives and antioxidants can also be present in the compositions.

Examples of pharmaceutically acceptable antioxidants include: (1) water-soluble antioxidants, such as ascorbic acid, cysteine hydrochloride, sodium bisulfate, sodium metabisulfite, sodium sulfite and the like; (2) oil-soluble antioxidants, such as ascorbyl palmitate, butylated hydroxyanisole (BHA), butylated hydroxytoluene (BHT), lecithin, propyl gallate, alpha-tocopherol, and the like; and (3) metal-chelating agents, such as citric acid, ethylenediamine tetraacetic acid (EDTA), sorbitol, tartaric acid, phosphoric acid, and the like.

Kits

In some embodiments, the compounds of the invention are provided as part of a kit for infusion. The kit contains from about 25 mg to about 250 mg of the compound of Formula I or II in a volume of buffer or saline from about 25 ml to about 250 ml. The pH of saline or buffer pH ranges from about 5.8 to about 6.8. For example, the kit can comprise saline (25 mg of cromolyn in 25 ml of saline results in pH6.8). Alternatively, the buffer can be Ringer's lactate (pH 6.5). Alternatively yet, the buffer can be citrate buffer (pH 6.0).

The kit could be ready for use and is constituted as a solution in a multidose vial or in a bag for infusion or for use in a nebulizer.

The kit could be prepared just before use by adding sterile buffer solution to a pre-weighed dry powder of the compound of Formula I or II in a multidose vial or bag for allowing infusion or ventilation by a nebulizer.

Methods of Treatment

In certain embodiments, the compounds of the invention and pharmaceutically acceptable salts or solvates thereof are administered in combination with a therapeutically effective amount of another therapeutic agent.

In certain embodiments, compounds of the invention may be used alone or conjointly administered with another type of therapeutic agent. As used herein, the phrase "conjoint administration" refers to any form of administration of two or more different therapeutic compounds such that the second compound is administered while the previously administered therapeutic compound is still effective in the body or while the side effects of the previously administered therapeutic compound are still evident in the body (e.g., the two compounds are simultaneously effective in the subject, which may include synergistic effects of the two compounds). For example, the different therapeutic compounds can be administered either in the same formulation or in a separate formulation, either concomitantly or sequentially. In certain embodiments, the different therapeutic compounds can be administered within one hour, 12 hours, 24 hours, 36 hours, 48 hours, 72 hours, or a week of one another. Thus, a subject who receives such treatment can benefit from a combined effect of different therapeutic compounds.

In certain embodiments, conjoint administration of compounds of the invention with one or more additional therapeutic agent(s) (e.g., one or more additional antiviral agent, antibiotic agent, or immune suppressant agent(s)) provides improved efficacy relative to each individual administration of the compound of the invention (e.g., compound of Formula I or II) or the one or more additional therapeutic agent(s). In certain such embodiments, the conjoint administration provides an additive effect, wherein an additive effect refers to the sum of each of the effects of individual administration of the compound of the invention and the one or more additional therapeutic agent(s). In other embodiments, the conjoint administration of a compound of the invention reduces or ameliorates the side effects of the additional therapeutic agent.

The therapeutic agent may be administered simultaneously with the compound of the invention. Alternatively, the therapeutic agent may be administered prior to administration the compound of the invention. Alternatively still, the therapeutic agent may be administered following the administration of the compound of the invention.

The phrase "combination therapy" embraces the administration of the compound of Formula I and an additional therapeutic agent as part of a specific treatment regimen intended to provide a beneficial effect from the co-action of each. When administered as a combination, the oligodendrocyte precursor differentiation inducing compound (the compound of Formula I) and an additional therapeutic agent can be formulated as separate compositions. Administration of these therapeutic agents in combination typically is carried out over a defined time period (usually minutes, hours, days or weeks depending upon the combination selected).

"Combination therapy" is intended to embrace administration of these therapeutic agent (the compound of Formula I or Formula II and an additional therapeutic agent) in a sequential manner, that is, wherein each therapeutic agent is administered at a different time, as well as administration of these therapeutic agents, or at least two of the therapeutic agents, in a substantially simultaneous manner. Substantially simultaneous administration can be accomplished, for example, by administering to the subject a single capsule having a fixed ratio of each therapeutic agent or in multiple, single capsules for each of the therapeutic agents. Sequential or substantially simultaneous administration of each therapeutic agent can be effected by any appropriate route including, but not limited to, oral routes, intravenous routes, intramuscular routes, and direct absorption through mucous membrane tissues. The therapeutic agents can be administered by the same route or by different routes. For example, a first therapeutic agent of the combination selected may be administered by intravenous injection while the other therapeutic agents of the combination may be administered orally. Alternatively, for example, all therapeutic agents may be administered orally or all therapeutic agents may be administered by intravenous injection. The sequence wherein the therapeutic agents are administered is not narrowly critical. "Combination therapy" also can embrace the administration of the therapeutic agents as described above in further combination with other biologically active ingredients (such as, but not limited to, a second and different therapeutic agent) and non-drug therapies (e.g., surgery).

Administration methods include administering an effective amount of a compound or composition of the invention at different times during the course of therapy or concurrently in a combination form. The methods of the invention include all known therapeutic treatment regimens. In certain embodiments, the compound or pharmaceutical composition is administered intravenously, intrathecally, subcutaneously, intramuscularly, intranasally, or orally.

In certain embodiments, the compound of the invention is administered as an HCl salt.

"Metabolite" means a pharmaceutically acceptable form of a metabolic derivative of a compound (or a salt thereof) of the invention, wherein the derivative is an active compound that contributes to therapeutic activity after becoming available in vivo.

"Effective amount" means that amount of active compound agent that elicits the desired biological response in a subject. Such response includes alleviation of the symptoms of the disease or disorder being treated. The effective amount of a compound of the invention in such a therapeutic method is from about 0.01 mg/kg/day to about 1000 mg/kg/day, from about 0.1 mg/kg/day to about 100 mg/kg/day, from about 0.5 mg/kg/day to about 50 mg/kg/day, or from about 1 mg/kg/day to 10 mg/kg/day. In some embodiments, the effective amount of a compound of the invention in such a therapeutic method is about 2 mg/kg/day, about 5 mg/kg/day, about 7.5 mg/kg/day, about 10 mg/kg/day, about 12.5 mg/kg/day, about 15 mg/kg/day, or about 20 mg/kg/day.

"Pharmaceutically acceptable carrier" means compounds and compositions that are of sufficient purity and quality for use in the formulation of a composition of the invention and that, when appropriately administered to an animal or human, do not produce an adverse reaction.

Methods of Preparation

Compounds of the invention may be prepared according to the synthetic procedures described below. In cases where the synthetic intermediates and final products of Formula I described below contain potentially reactive functional groups, for example amino, hydroxy, thiol and carboxylic acid groups, that may interfere with the desired reaction, it may be advantageous to employ protected forms of the intermediate. Methods for the selection, introduction and subsequent removal of protecting groups are well known to those skilled in the art. (T. W. Greene and P. G. M. Wuts "Protective Groups in Organic Synthesis" John Wiley & Sons, Inc., New York 1999). Such protecting group manipulations are assumed in the discussion below and not usually described explicitly. Generally, reagents in the reaction schemes are used in equimolar amounts; however, in certain cases it may be desirable to use an excess of one reagent to drive a reaction to completion. This is especially the case when the excess reagent can be readily removed by evaporation or extraction. Bases employed to neutralize HCl in reaction mixtures are generally used in slight to substantial excess (1.05-5 equivalents).

Compounds of the invention can be prepared employing conventional methods that utilize readily available reagents and starting materials. The reagents used in the preparation of the compounds of this invention can be either commercially obtained or can be prepared by standard procedures described in the literature. The compounds of the invention may be made according to the general and exemplary schemes provided herein.

Exemplary Compositions and Methods

The present disclosure relates to method of treating one or more inflammation conditions induced by a coronavirus infection in a subject in need thereof, comprising administering a pharmaceutical composition, wherein the pharmaceutical composition comprises a compound of Formula I or Formula II

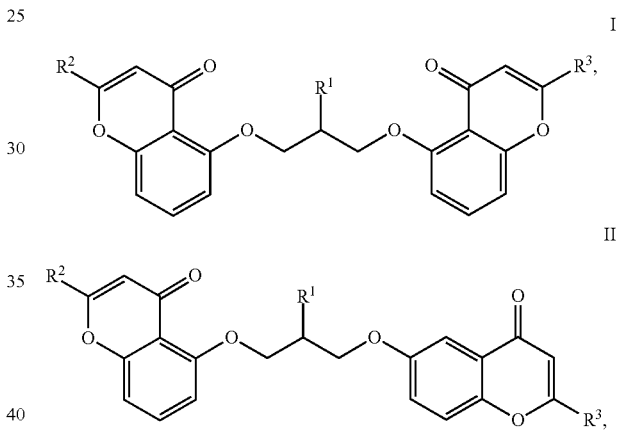

wherein $R^1$ is halogen, OH, or —OC(O)$C_{1-5}$alkyl $R^2$ and $R^3$ are each independently selected from $CO_2R^4$ and $CH_2OR^5$;

$R^4$ is Li, Na, K, H, $C_{1-5}$alkyl, or —CH$_2$CO($C_{1-5}$alkyl); and $R^5$ is H or —C(O)($C_{1-5}$alkyl), or a pharmaceutically acceptable salt thereof.

In some embodiments, $R^1$ is halogen, for example, $R^1$ is F. In certain embodiments, $R^1$ is OH. In some embodiments, $R^1$ is —OC(O)$C_{1-4}$alkyl, such as —OC(O)Me.

In certain embodiments, $R^2$ and $R^3$ is each independently —CO$_2R^4$. In some embodiments, $R^4$ is Li, Na, K, or NH$_4$, for example, $R^4$ is Na. In certain embodiments, $R^4$ is H. In some embodiments, $R^4$ is $C_{1-5}$alkyl. In certain embodiments, $R^4$ is —CH$_2$CO($C_{1-5}$alkyl);

In certain embodiments, $R^2$ and $R^3$ is each independently —CH$_2$OR$^5$. In some embodiments, $R^5$ is H. In certain embodiments, $R^5$ is —C(O)($C_{1-5}$alkyl).

In some embodiments, $C_{1-5}$alkyl is methyl, ethyl, or t-butyl.

In certain embodiments, the compound of Formula I is selected from:
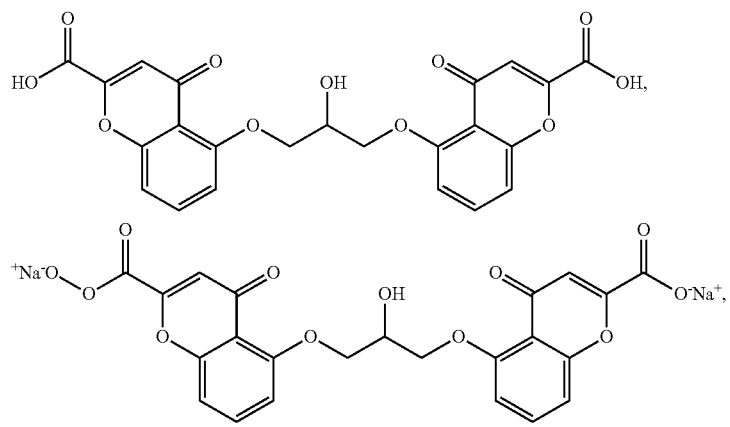
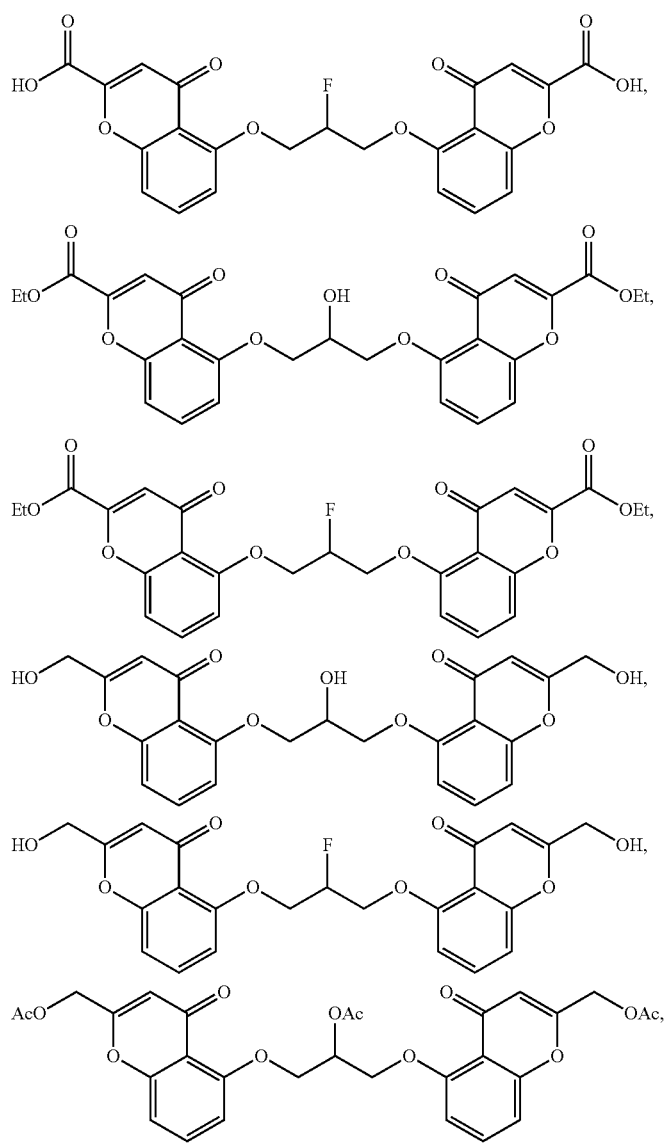

-continued

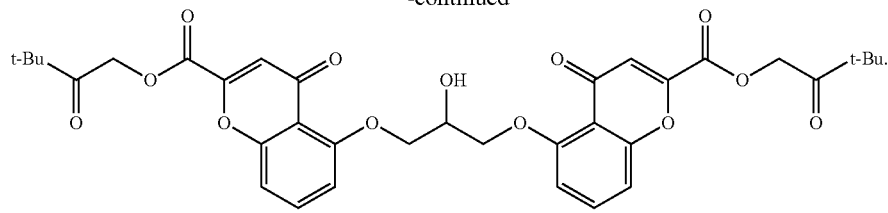

In certain embodiments, the compound of Formula I is

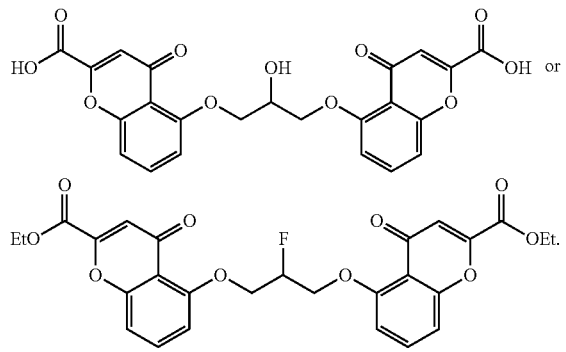

In certain embodiments, the compound of Formula I is

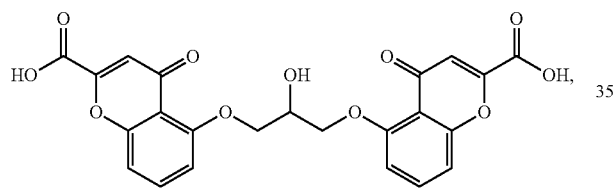

also known as cromolyn.

In some embodiments, the compound of Formula I is a Li, Na, or K salt or a $C_{1-5}$alkyl ester of cromolyn.

In certain embodiments, the compound of Formula I is

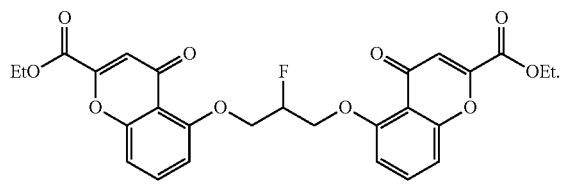 [SMILES: CCOC(=O)c1cc(=O)c2c(OCC(F)COc3cccc4oc(C(=O)OCC)cc(=O)c34)cccc2o1]

In certain embodiments, the compound of Formula I is

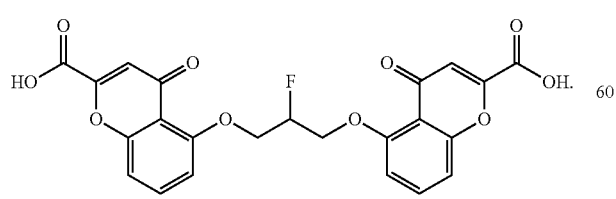

In certain embodiments, the inflammation condition is acute respiratory distress syndrome (ARDS), pneumonia, myocarditis, haemophagocytic lymphohistiocytosis (sHLH), and sepsis; and the compound of Formula I is

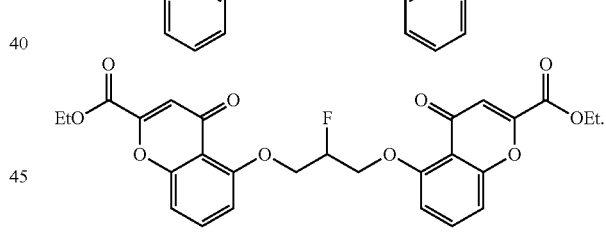

For example, the inflammation condition is ARDS; and the compound of Formula I is Alternatively, the inflammation condition is pneumonia; and the compound of Formula I is In some embodiments, the inflammation condition is myocarditis; and the compound of Formula I is

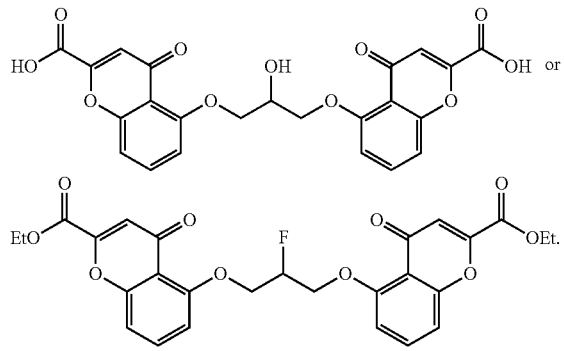

In some embodiments, the composition further comprises a pharmaceutically acceptable excipient.

In some embodiments, the composition further comprises saline.

In some embodiments, the composition further comprises a buffer.

In some embodiments, the buffer is selected from a citrate buffer and a Ringer's lactate buffer.

In some embodiments, the pharmaceutical composition has a pH from about 6.4 to about 6.9.

In some embodiments, the pharmaceutical composition has a pH from about 6.5 to about 6.8.

In some embodiments, the concentration of the compound of Formula I or Formula II in the pharmaceutical composition is from about 0.1 mg/mL to about 20 mg/mL.

In some embodiments, the concentration of the compound of Formula I or Formula II in the pharmaceutical composition is about 10 mg/mL.

In some embodiments, the concentration of the compound of Formula I or Formula II in the pharmaceutical composition is from about 10 µM to about 50 µM.

In some embodiments, the concentration of the compound of Formula I or Formula II in the pharmaceutical composition is about 21 µM.

In some embodiments, the pharmaceutical composition is administered from 1 to 5 times a day.

In some embodiments, the pharmaceutical composition is administered 3 times a day.

In some embodiments, the pharmaceutical composition is administered with a frequency from about every 2 hours to about every 6 hours.

In some embodiments, the pharmaceutical composition is administered with a frequency of about every 4 hours.

In some embodiments, the method comprises administering the pharmaceutical composition by intravenous infusion, by intravenous injection, by subcutaneous injection, by intramuscular injection, by intraperitoneal injection, orally, sublingually, buccally, or by inhalation.

In some embodiments, the method comprises administering the pharmaceutical composition by intravenous infusion or by intravenous injection.

In some embodiments, the method comprises administering the pharmaceutical composition orally.

In some embodiments, the method comprises administering the pharmaceutical composition by inhalation.

In some embodiments, the method comprises administering the pharmaceutical by inhalation using a nebulizer.

In some embodiments, the coronavirus is selected from SARS-CoV, MERS-CoV, HCoV, HKU1, and SARS-CoV-2.

In some embodiments, the coronavirus is selected from SARS-CoV, MERS-CoV, and SARS-CoV-2.

In some embodiments, the coronavirus is SARS-CoV-2.

In some embodiments, the one or more inflammation conditions are selected from acute respiratory distress syndrome (ARDS), pneumonia, myocarditis, haemophagocytic lymphohistiocytosis (sHLH), kidney failure, septic shock, and sepsis.

In some embodiments, at least one inflammation condition is pneumonia.

In some embodiments, at least one inflammation condition is ARDS.

In some embodiments, at least one inflammation condition is myocarditis.

In some embodiments, at least one inflammation condition is sepsis.

In some embodiments, the method further comprising administering one or more antiviral agents.

In some embodiments, the one or more antiviral agents are selected from remdesivir (RDV), tilorone, favipiravir, IFNα, IFNβ, IFNγ, peginterferon-α, peginterferon-β, ribavirin, lopinavir/ritonavir, camostat mesylate, TAK888, abacavir, acyclovir, adefovir, amantadine, rintatolimod (Ampligen), amprenavir, umifenovir (Arbidol), and atazanavir.

In some embodiments, at least one antiviral agent is RDV.

In some embodiments, at least one antiviral agent is favipiravir.

In some embodiments, the method further comprises administering one or more antimicrobial agents.

In some embodiments, the one or more antimicrobial agents are selected from penicillin, ampicillin, sulbactam, piperacillin, tazobactam, a macrolide, an aminoglycoside, a cephalosporin, and a glycopeptide.

In some embodiments, the antimicrobial agent is a macrolide, and wherein the macrolide is azithromycin.

In some embodiments, the antimicrobial agent is a cephalosporin, and wherein the cephalosporin is ceftriaxone.

In some embodiments, the antimicrobial agent is an aminoglycoside, and wherein the aminoglycoside is tobramycin.

In some embodiments, the antimicrobial agent is a glycopeptide, and wherein the glycopeptide is vancomycin.

In some embodiments, the method further comprises administering an immune suppressant agent.

In some embodiments, the immune suppressant agent is selected from tocilizumab, siltuximab, infliximab, abatacept, leronlimab, anakinra, and a JAK inhibitor.

In some embodiments, the immune suppressant agent is tocilizumab.

In some embodiments, the method further comprises administering hydroxychloroquine or chloroquine.

In some embodiments, the method further comprises administering a hyperimmune globulin, wherein the hyperimmune globulin is isolated from patients recovered from the coronavirus infection.

In some embodiments, the method further comprises administering an angiotensin II type 1 receptor blocker (ARB).

In some embodiments, the ARB is selected from valsartan, telmisartan, losartan, irbesartan, azilsartan, and olmesartan.

In some embodiments, the method further comprises administering a mast cell stabilizer.

In some embodiments, the mast cell stabilizer is selected from nedocromil, ketotifen, quercetin, omalizumab, olopatadine, azelastine, mepolizumab, methyl xanthines, and β2-adrenergic agonists.

In some embodiments, the subject is aged 18-75 years, inclusive.

In some embodiments, the subject has SARS-CoV-2 infection, which has been confirmed by reverse-transcription polymerase chain reaction (RT-PCR) from respiratory tract or blood specimens.

In some embodiments, the subject has diagnostic criteria of "Severe" or "Critical." In some embodiments, the subject does not have pneumonia caused by bacteria, mycoplasma, chlamydia, legionella, fungi or a virus that is not a coronavirus.

In some embodiments, the subject does not have obstructive hospital-acquired bacterial pneumonia (HABP) or obstructive ventilator-acquired bacterial pneumonia (VABP).

In some embodiments, the subject does not have carcinoid syndrome.

In some embodiments, the subject has not been administered an anticonvulsant treatment within the last 3 years.

In some embodiments, the subject is not undergoing hemodialysis or peritoneal dialysis.

In some embodiments, subject has an estimated or actual rate of creatinine clearance ≥15 ml/min.

In some embodiments, the subject has a Child-Pugh score ≤12.

In some embodiments, the subject does not have HIV, hepatitis virus, or syphilis infection.

In some embodiments, the subject is not pregnant or lactating.

In some embodiments, the pharmaceutical composition is administered for a treatment period from 1 day to 42 days.

In some embodiments, the pharmaceutical composition is administered for a treatment period from 21 days to 35 days.

In some embodiments, the pharmaceutical composition is administered for a treatment period from 3 days to 10 days.

In some embodiments, the pharmaceutical composition is administered for a treatment period for about 7 days.

In some embodiments, the pharmaceutical composition is administered for a treatment period of about 28 days.

In some embodiments, after the treatment period, the subject exhibits an objective improvement in pulmonary distress as compared to before the treatment period.

In some embodiments, after the treatment period, the subject requires lower airway pressure than the airway pressure required before the treatment period.

In some embodiments, after the treatment period, the subject requires a lower volume ventilation than the volume ventilation required before the treatment period.

In some embodiments, after the treatment period, the subject requires less oxygen supplementation than the oxygen supplementation required before the treatment period.

In some embodiments, after the treatment period, the subject exhibits an improvement in the blood concentration of a biomarker selected from IL-1β, IL-2, IL-5, IL-6, IL-8, TNFα, and VEGF.

In some embodiments, after the treatment period, the subject tests negative for the coronavirus infection by reverse-transcription polymerase chain reaction (RT-PCR) from respiratory tract or blood specimens.

EXAMPLES

Example 1. Cromolyn Treatment Decreases the Levels of Pro-Inflammatory Cytokines in Plasma of TgSOD1 Mice Chemicals Cromolyn sodium was provided by AZTherapies and dissolved in PBS. 100 mM solution was used for in vivo experiments. Dulbecco's PBS was used to dilute the solution for intraperitoneal injections for a final dose of 6.3 mg/kg.

Animals 149 male and female age- and litter-matched transgenic TgSOD1$^{G93A}$ and wild-type WtSOD1$^{G93A}$ mice were used with the following breakdown: Females (19 WtSOD1-Vehicle, 17 WtSOD1-Cromolyn, 19 TgSOD1-Vehicle, and 17 TgSOD1-Cromolyn) and Males (18 WtSOD1-Vehicle, 21 WtSOD1-Cromolyn, 21 TgSOD1-Vehicle, 17 TgSOD1-Cromolyn). The mice received once daily injections of either vehicle or cromolyn sodium (6.3 mg/kg, 96 i.p.) 5 days per week starting at P60 until euthanasia.

All animal care, husbandry and experimentation were performed according to the guidelines set by the Massachusetts General Hospital Subcommittee on Research Animal Care. These experiments were approved by the Massachusetts General Hospital Institutional Animal Care and Use Committee (2014N000018). All mice were given access to food and water ad libitum.

SOD1$^{G93A}$ Mice:

B6SJL-Tg (SOD1 G93A)1Gur/J transgenic male mice were obtained from Jackson Laboratory and bred with C57BL/6 female mice to obtain wild-type WtSOD1 and mutant transgenic TgSOD1$^{G93A}$-expressing mice. To determine mouse genotype, RNA extraction and complimentary DNA (cDNA) synthesis was performed from tail biopsies acquired at postnatal day 28-40 followed by quantitative real-time PCR (qRT-PCR) using primers for the mutant G93A SOD1 gene (GGGAAGCTGTTGTCCCAAG and CAAGGGGAGGTAAAAGAGAGC). Both age- and litter-matched WtSOD1 and TgSOD1 male and female mice were used for all studies as described below.

Meso Scale Discovery Multi-Spot Cytokine Assay

Spinal cord frozen tissue was homogenized in ice-cold RIPA buffer (Thermo Fisher Scientific, #8990) supplemented with protease inhibitor cocktail (Thermo Fisher Scientific, #78430). Samples were centrifuged at 45,000 g for 30 minutes at 4° C. using an Optima TL ultracentrifuge and a TLA 120.2 rotor (Beckman Coulter). Expression levels of the cytokines were assessed in the supernatants derived from spinal cord tissue or in the plasma, using an electrochemiluminescence-based multi-array method and MESO Quickplex SQ 120 system (MSD, Rockville, MD, USA). The 96-well V-PLEX Proinflammatory Mouse 1 Kit (Meso Scale Discovery, #K15048D) was used to measure simultaneously IL-1β, IL-2, IL-5, IL-6, IL-10, and TNFα, following the manufacturer's instructions. Briefly, samples were diluted in the calibrator and added to the plate coated with an array of cytokine capture antibodies. Samples were incubated in the plate for 2 hours with shaking at room temperature, followed by washes with the wash buffer provided in the kit. The detection antibody solution was added to each well and the plate was incubated for 2 hours. The plate was washed with the wash buffer and the 2× Read Buffer T was added. The signal was immediately measured on a MESO QuickPlex SQ 120 instrument and was analyzed using the DISCOVERY WORKBENCH 4.0 software (Meso Scale Diagnostics, LLC., Rockville, MD, USA). Protein concentrations in the supernatants or the plasma samples were measured using the Pierce BCA protein assay kit (Thermo Scientific). Values in the graphs represent levels of cytokines normalized to the corresponding protein concentrations.

Statistics

Data are presented as median values. Box plots are used for graphical representation of population data with the central line representing the median, the edges representing the interquartile ranges, and the whiskers representing 10-90th percentiles. Data are also represented as medians ±interquartile ranges or percent values. Sample sizes are included in the figure legends. Comparisons for unrelated samples were performed using a two-way ANOVA followed by Tukey's or Sidak's multiple comparison's test or a one-way ANOVA test followed by Tukey's multiple comparison post-tests at a significance level (a) of 0.05. For $p<0.05$ and $>0.00001$, exact P values (two-tailed) are reported.

Results

The levels of pro-inflammatory cytokines in spinal cord lysates of mice were measured by using the multi-spot assay system from Meso Scale Discovery. Levels of IL-1β, IL-5, IL-6, IL-10, TNFα have been determined. One-way ANOVA and Tukey's post-hoc analysis revealed a significant difference in the levels of IL-1β $[F(3, 130)=66.31, p<0.0001]$, IL-5 $[F(3, 129)=129.9, p<0.0001]$, IL-6 $[F(3, 135)=43.41, p<0.0001]$, and TNFα $[F(3, 64)=27.94, p<0.0001]$, in the spinal cord of both TgSOD1-Vehicle and TgSOD1-Cromolyn groups compared to both wild-type groups (FIGS. 1A, 1B, 1C, and 1D). There was a significant decrease in IL-6 ($p<0.0001$) and IL-5 ($p<0.0001$) levels between Tg and Wt groups. Importantly, there was a significant decrease in TNFα ($p=0.0273$) level in the TgSOD1-Cromolyn group compared to TgSOD1-Vehicle group (FIG. 1D), suggesting that cromolyn treatment decreased expression of pro-inflammatory cytokines and chemokines in the spinal cord of treated transgenic mice.

Cromolyn Treatment Decreased the Levels of Pro-Inflammatory Cytokines in Plasma of TgSOD1 Mice.

Figure 2A:
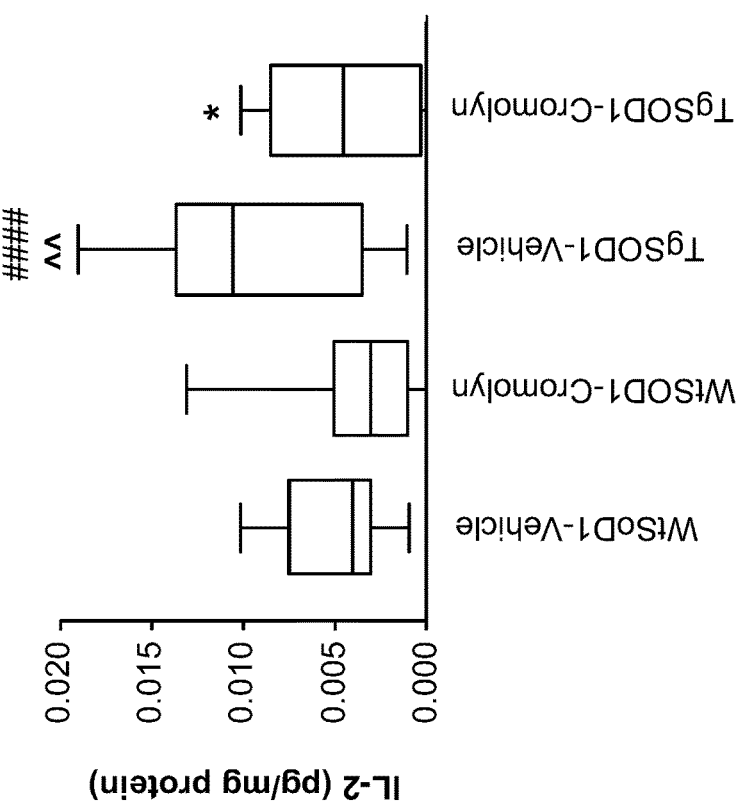
FIGS. 2A-2F are graphs showing that cromolyn treatment decreased the levels of pro-inflammatory cytokines in plasma of TgSOD1 mice.
Figure 2B:
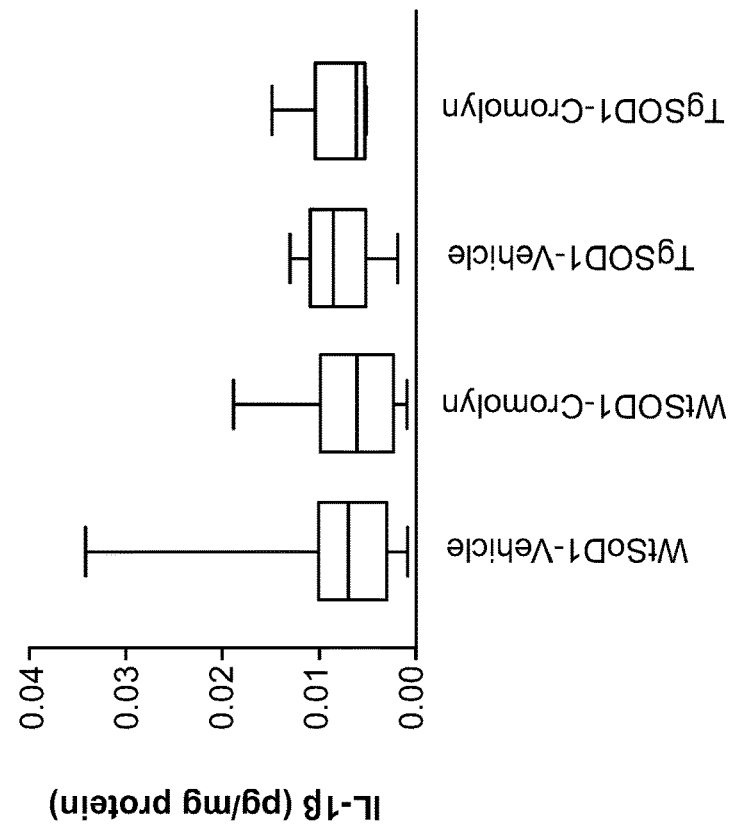
Figure 2C:
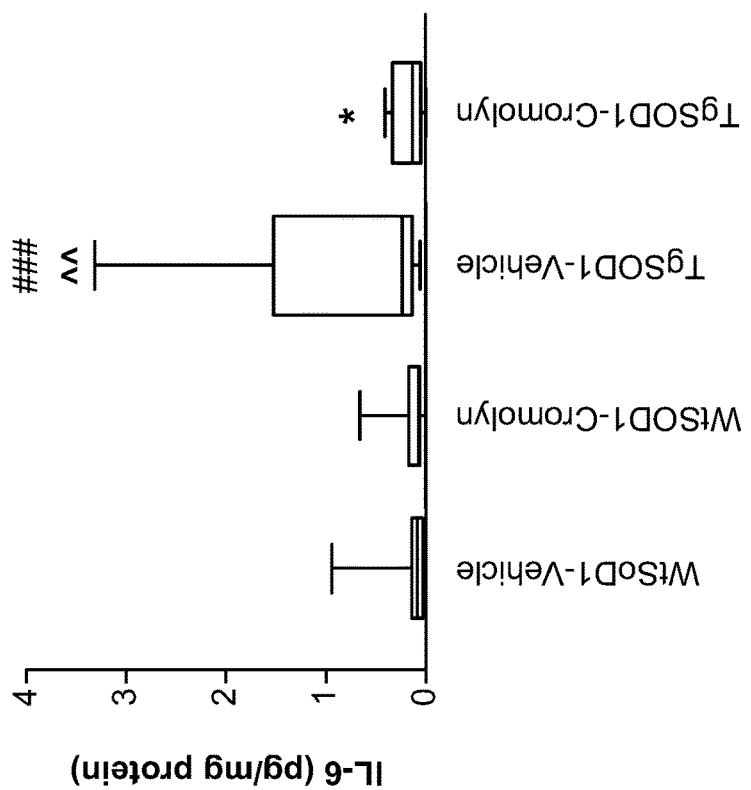
Figure 2D:
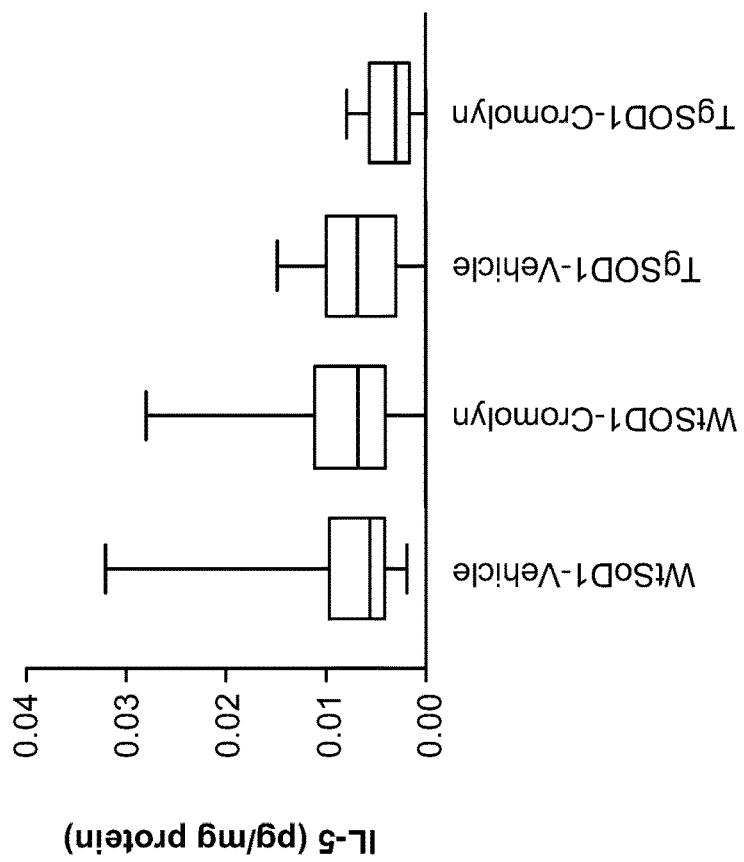
Figure 2E:
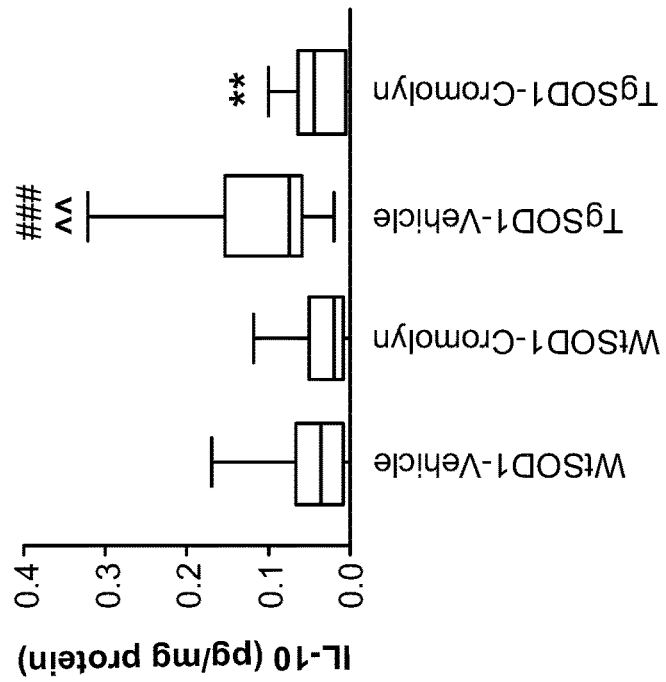
Figure 2F:
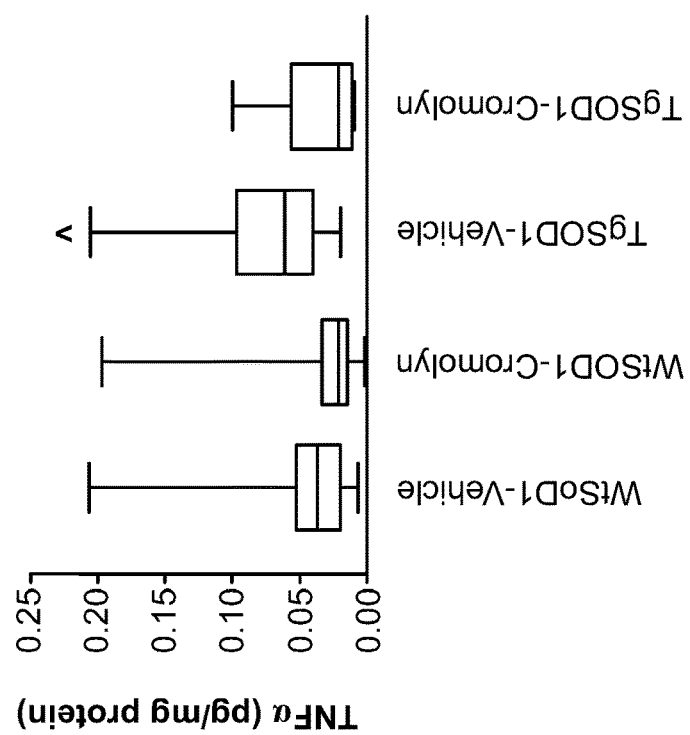

Additionally, levels of IL-1β, IL-2, IL-5, IL-6, IL-10, and TNFα were assessed in the plasma of a subset of mice (Females: 13 WtSOD1-Vehicle, 15 WtSOD1-Cromolyn, 6 TgSOD1-Vehicle, and 6 TgSOD1-Cromolyn; and Males: 14 WtSOD1-Vehicle, 10 WtSOD1-Cromolyn, 6 TgSOD1-Vehicle, 3 TgSOD1-Cromolyn). One-way ANOVA and Tukey's post-hoc analysis revealed a significant increase in IL-2 $[F(3, 65)=7.731, p<0.0002]$, IL-6 $[F(3, 63)=6.332, p<0.0008]$, and IL-10 $[F(3, 65)=7.195, p<0.0003]$ levels in the plasma of TgSOD1-Vehicle compared to both WtSOD1-Vehicle and WtSOD1-Cromolyn groups (FIGS. 2B, 2D, and 2E). There was also a significant increase in TNFα levels $[F(4, 67)=12.46, p<0.006]$, and post-hoc analysis revealed a significant increase in TNFα in TgSOD1-Vehicle group compared to WtSOD1-Cromolyn ($p=0.0043$) (FIG. 2F). There was no statistically significant difference in IL-13 and IL-5 levels between groups (FIGS. 2A and 2C). Importantly, the levels of IL-2 ($p=0.0211$), IL-6 ($p=0.0273$), and IL-10 ($p=0.0095$) were significantly decreased in TgSOD1-Cromolyn group compared to TgSOD1-Vehicle group (FIGS. 2B, 2D, and 2E). Lastly, there was a trend towards a decrease in TNFα levels ($p=0.110$) in the TgSOD1-Cromolyn mice compared to the TgSOD1-Vehicle group (FIG. 2F). These results demonstrate that cromolyn treatment decreased the levels of cytokines in the plasma of TgSOD1 mice.

Example 2. Cromolyn Reverses Pro-Inflammatory CD33-Mediated Inhibition of M1-Microglial Activation Stage in APP/PS1 Mice Procedure Naive BV2 microglial cells were treated with DMSO (control) or cromolyn (500 µM) for 16 hours. Afterwards, the cells were incubated with fluorescently-labeled Aβ42 (red) and DMSO or cromolyn for 2 hours. After incubation, the cells were labeled with a plasma membrane dye (PM, green) and imaged. BV2 microglial cells or BV2 cells stably expressing CD33 (BV2-CD33wT) were treated with DMSO or different concentrations of cromolyn for 16 hours. Then, cells were incubated with soluble untagged Aβ42 and DMSO or cromolyn for 2 hours and collected for ELISA analysis. Both naive BV2 and BV2-CD33wT microglial cells treated with cromolyn exhibited increased Aβ42 uptake levels in comparison to cells treated with the vehicle (DMSO).

Results

Interaction of microglia with fibrillar amyloid-β peptide (Aβ) leads to their phenotypic activation and has recently been suggested to play a role in neuroprotection. It has been shown in numerous studies, in both mice and humans, that glial cells respond to the presence of pathological lesions (plaques and tangles) by changing their morphological characteristics, expressing numerous cell surface receptors, and surrounding the lesions. On the other hand, macrophage and microglial activation in response to cellular debris in the brain, and the subsequent release of pro-inflammatory cytokines leads to accelerated neurodegeneration. This, in turn, creates more cellular debris and accelerates disease progression. It is generally agreed that microglia activated by extracellularly deposited Aβ protect neurons by triggering anti-inflammatory/neurotrophic M2 activation and by clearing Aβ via phagocytosis.

Activation of microglia by extracellularly deposited Aβ is similar to microglial activation in response to the presence of IFNγ, TNFα from T cells, or antigen-presenting cells. Data reveal robust effect of cromolyn in reducing aggregation-prone Aβ levels and inducing a neuroprotective microglial activation state favoring Aβ phagocytosis versus a pro-neuroinflammatory state. This microglial activation is aimed at the protective action in CRS and ICANS. The data obtained for extracellularly deposited Aβ support the use of cromolyn as a potential drug in the treatment of in CRS and ICANS.

Cromolyn leads to increased recruitment of microglial cells around amyloid plaques, which leads to subsequent Aβ phagocytosis and removal of plaques. Additionally, cromolyn promotes uptake and clearance of Aβ in cultured microglial cells, also leading to removal of plaque.

Further, confocal microscopy and enzyme-linked immunosorbent, or ELISA, assays demonstrate the effect of cromolyn on Aβ42 uptake in both BV2 microglial cells and BV2 cells expressing pro-inflammatory human CD33 (BV2-CD33wr), as shown in FIGS. 3A-3D. These data show that cromolyn reverses pro-inflammatory CD33-mediated inhibition of M1-microglial activation stage and leads to increased uptake of Aβ42 in naive BV2 microglial cells. Cromolyn treatment leads to increased Aβ42 uptake in naive BV2 microglial cells as was confirmed by the immunofluorescence results obtained by ELISA (FIG. 3E). Cromolyn leads to increased levels of internalized Aβ42 in BV2-CD33wT cells (FIG. 3F) and reversed CD33-mediated inhibition of Aβ42 uptake in microglial cells. Both naive BV2 and BV2-CD33wT microglial cells treated with cromolyn exhibited increased Aβ42 uptake levels in comparison to cells treated with the vehicle (DMSO). These data demonstrate that treatment with cromolyn shows a dose-dependent effect in modulating Aβ42 uptake levels in naive BV2 and BV2-CD33wT cell lines, thus inhibiting of M1-microglial activation stage, and promoting neuroprotective microglial activation.

Figure 4A:
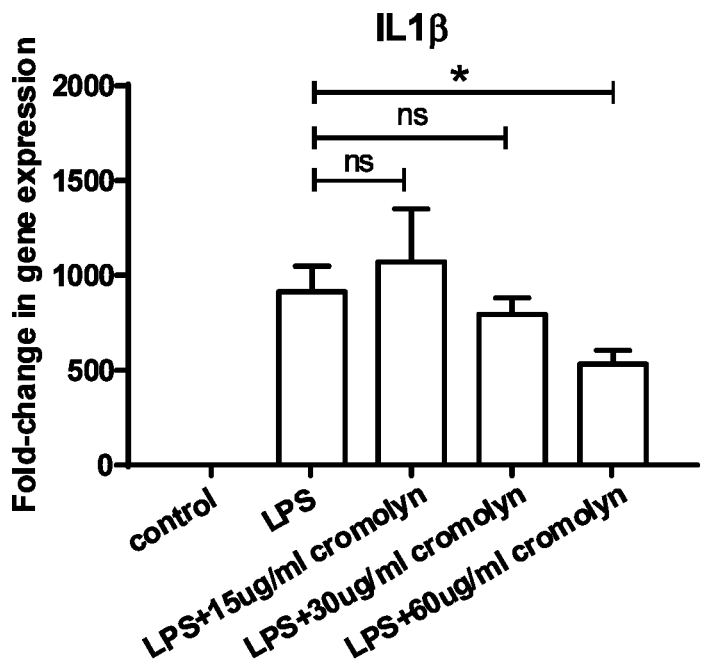
FIG. 4A is a graphs demonstrating gene expression of IL-1β in N9 microglia cell line stimulated with LPS and treated with different concentrations of cromolyn.
Figure 4B:
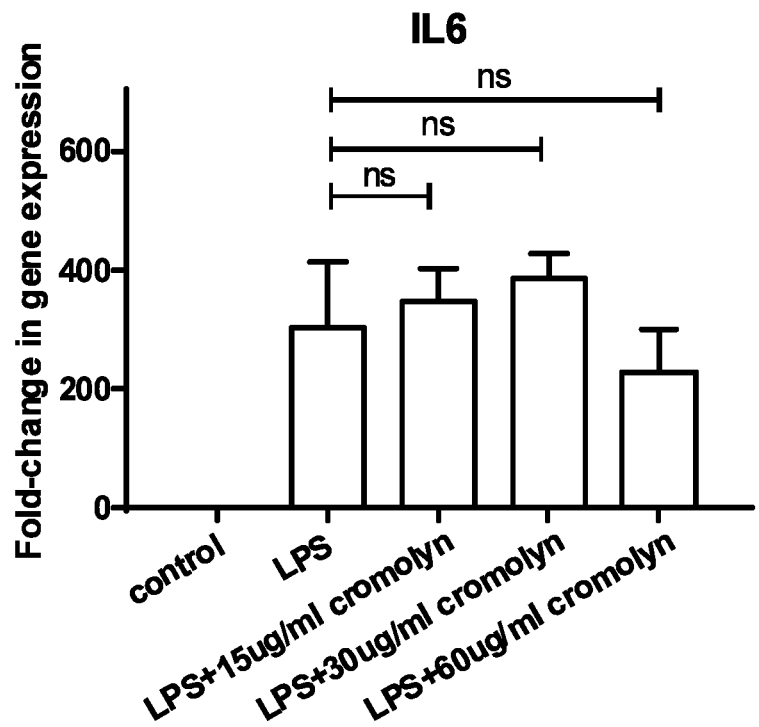
FIG. 4B is a graphs demonstrating gene expression of IL-6 in N9 microglia cell line stimulated with LPS and treated with different concentrations of cromolyn.

Example 3. Gene Expression of IL-1β and IL-6 in N9 Microglia Cell Line Stimulated with LPS and Treated with Cromolyn N9 microglia cells were pretreated with different concentrations of cromolyn (15 μg/ml, 30 μg/ml, and 60 μg/ml) for 6 hrs and then stimulated with 500 ng/ml lipopolysaccharide (LPS, most commonly used pro-inflammatory stimulus for microglia) in the presence of cromolyn for 8 hrs. Cells was harvested and RNA was isolated with TRIZOL (Invitrogen), and first strand cDNA was synthesized using 2 g of RNA and High-Capacity Reverse Transcriptase (Invitrogen). RT-PCR was performed with SYBR Green PCR reagents on a Bio-Rad detection system. RNA levels were normalized to the level of GAPDH and calculated as delta-delta threshold cycle (ΔΔCT). Primers used for RT-PCR are listed as follows: GAPDH-For: AGCCACATCGCTCAGACAC, GAPDH-Rev: GCCCAATACGACCAAATCC; IL-1β-For: CGCTCAGGGTCACAAGAAAC, IL-1β-Rev: GAGGCAAGGAGGAAAACACA; IL-6-For: TTC-CATCCAGTTGCCTTCTT, IL-6-Rev: ATTTCCACGAT-TTCCCAGAG. Results of the study are shown in FIGS. 4A and 4B.

Example 4. Treating Severe Novel Coronavirus Infection with Cromoglycate Solution Infusion

| | |
|---|---|
| Objectives: | Study Objectives:<br>To relief pulmonary distress and improve pulmonary breathing in subjects diagnosed with COVID19 Inflicted pneumonia, by lowering pro-inflammatory cytokine release (Cytokine storm)<br>To evaluate the safety of the cromolyn solution.<br>To evaluate dose escalation of cromolyn solution. |
| Study design: | This is an emergency randomized, open-label, multicenter, multi-dose study to evaluate the effects of cromolyn solution in subjects with COVID19 pulmonary pneumonia.<br>Three repeated doses of cromolyn solution are being evaluated in this study. Each dose of cromolyn solution will be co-administered with a standard-of-care treatment as prescribed by their physician. |
| Number of Subjects Planned: | A total of 12 participants diagnosed with COVID19 pneumonia will be enrolled and randomized to receive three consecutive, 4 hours apart dosage treatment regimens of cromolyn solution per day for seven days |
| Study population: | Both male and female subjects with diagnosis COVID 19 pneumonia. The choice of this study population is exploratory to determine the potential for therapeutic benefit in subjects presenting with pulmonary distress symptoms, while reducing the likelihood of advanced symptoms and morbidities due to other COVID 19 complications. |
| Diagnosis and main criteria for study inclusion: | Inclusion Criteria:<br>Male or female subjects;<br>Must provide written informed consent before any study related procedures;<br>Patients with confirmed novel coronavirus pneumonia<br>Exclusion Criteria:<br>Allergic or hypersensitive to any of the ingredients.<br>Pneumonia caused by bacteria, mycoplasma, chlamydia, legionella, fungi or other viruses;<br>Obstructive HABP/VABP induced by lung cancer or other known causes;<br>Carcinoid syndrome;<br>History of long-term use of immunosuppressive agents;<br>History of epilepsy and requirement for continuous anticonvulsant treatment or anticonvulsant treatment received within the last 3 years;<br>History of severe chronic respiratory disease and requirement for long-term oxygen therapy;<br>Undergoing hemodialysis or peritoneal dialysis;<br>Allergy to cromolyn or cromolyn products, such as Intal ®, Nasalcrom ®, Opticrom ®, Gastrocrom ®, etc.;<br>Any clinically significant disorder or laboratory abnormality that, in the investigator's opinion, could interfere with the subject's participation in the study, place the subject at increased risk, or confound interpretation of the study results; |
| Test product dose, and mode of administration: | Cromolyn solution 250 mg multidose vial prepared solution by adding 25 ml sterile saline for infusion with co-administered with standard of care treatment and or experimental antiviral or antimicrobial drug as prescribed by the subject's physician.<br>Dose per day:<br>Cromolyn 250 mg will be administered up to three times per day 250 mg will be followed by observing patient response to a slow |

| | -continued |
|---|---|
| | infusion. Any adverse event, determined by the administrating physician as related to infusion would trigger infusion stop. No Adverse event will allow a second initiation of a second 250 mg cromolyn solution in about 4 hours following the first infusion. Any adverse event, determined by the administrating physician as related to infusion would trigger infusion stop. No Adverse event will allow a third initiation of a second 250 mg cromolyn solution in about 4 hours following the second infusion. Any adverse event, determined by the administrating physician as related to infusion would trigger infusion stop. |
| Duration of treatment: | Total duration for study treatment is 1 weeks to 4 weeks with patient's follow-up per to physician's recommendation. Subjects meeting all eligibility requirements will be randomized into the study and treatment will be initiated on Day 1 to pulmonary diagnosed pneumonia due to COVID19 respiratory distress. Subjects will be asked to complete up to 7 days of daily dosing and blood and other body fluid testing per to physician's request. |
| Clinical Endpoint(s): | Primary Endpoint(s): Outcome measures will be performed based on cromolyn solution infusion as adjuvant to standard of care treatment to improve pulmonary breathing in subjects diagnosed with COVID19 Inflicted pneumonia by measuring: Change of pulmonary distress relief noted by physician and Breathing test of continuous monitoring of airway pressure, volume ventilation and oxygen supplementation; Hospital stay; Recovery or dismissal; Survival. Exploratory Endpoint(s): Change in Pro-inflammatory and anti-inflammatory biomarkers in plasma from baseline (pre-dose) to post infusion dosing. Biomarker Panel: IL-1β, IL-2, IL-5, IL-6, IL-8, TNFα, and VEGF Chest imaging [ Time Frame: Day 0Day 7, and Day of dismissal] By Computed tomography or X-ray Safety: Time to event requiring full-time or nearly full-time respiratory support Percent-predicted FVC and peak inspiratory flow rate (PIFR) for one week of treatment and the following period. Treatment-emergent adverse events (TEAEs) Vital sign measurements Physical examinations Safety laboratory assessments Dropouts due to adverse events |
| Statistics | Statistical Methods: This is an exploratory observation of a potential emergency treatment of COVID19 in a small number of subjects. No formal statistical analysis is planned. Sample Size Consideration: Approximately 12 subjects will be recruited to preliminary evaluation of cromolyn solution as an emergent treatment for the cytokine release storm associate with COVID19 inflicted subjects. Responders and non-responders will be tabulated. |

Example 5. Inhibition of Secretion of Inflammatory Cytokines by Cromolyn and F-Cromolyn in HMC3 Human Microglia Chemicals and Reagents DMEM (Dulbecco's Modified Eagle Medium) (Cat #1995065), DMEM without phenol red (Cat #21063029), PBS-pH7.2 (Cat #20012050), L-glutamine (Cat #25030081), Trypsin-EDTA (Cat #25200056), and penicillin-streptomycin (Cat #15140122) were products of Gibco, Thermo Fisher Scientific. FBS (fetal bovine serum) (Cat #F4135), DMSO (dimethyl sulfoxide) (Cat #D2438), and TWEEN-20 (Cat #P1379) were purchased from Sigma-Aldrich. 3 mL Syringe/Needle Combination with Luer-Lok™ Tip (Cat #8936G82), 13 mm syringe filter (PVDF, 0.22 μm) (Cat #1159T77) were purchased from Thomas Scientific. Recombinant human TNF-α (Cat #300-01A), recombinant human IFN-γ (Cat #300-02) were purchased from PeproTech. Cromolyn and F-cromolyn were provided by AZTherapies and DMEM was used as diluent to achieve final concentrations as indicated.

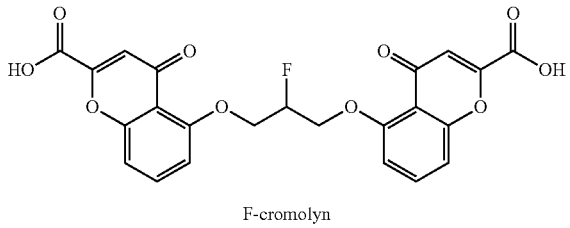 [SMILES: O=C(O)c1cc(=O)c2c(OCC(F)COc3cccc4oc(C(=O)O)cc(=O)c34)cccc2o1]

F-cromolyn

Cell Line and Cell Culture

Human microglial cell line HMC3 (CRL-3304) was purchased from ATCC (American Type Culture Collection). HMC3 cell line was cultured in DMEM medium with 10%

FBS, 1% L-glutamine, and 1% penicillin/streptomycin. Cells were maintained in 37° C. incubator at 5% $CO_2$.

Flow Cytometry

HMC3 cells were resuspended, counted using the LUNA-II Automated Cell Counter, seeded in the 6-well plate (300 K cells/2 mL medium/well), and incubated overnight to allow cells to attach. Cells were treated with TNF-α or IFN-γ at five different concentrations (0, 10, 30, 100, 300 ng/mL) for 24 hr to induce cell activation. The supernatant medium was completely aspirated and 1 mL of fresh DMEM was added to wash the cell layer to remove detached cells and debris. The attached cells were resuspended and washed with PBS. Cells were washed with FACS buffer (2% FBS in PBS) prior to incubation with Zombie Violet Fixable Viability Dye (#423114, Biolegend, 1:500 dilution) and Human Fc Receptor Blocking Solution (#422302, Biolegend, 1:20) diluted in FACS buffer at RT for 10 min in the dark. Cells were then washed with FACS buffer and incubated at RT for 20 min with the following cell-surface antibodies: FITC anti-MHC II (#361706, Biolegend), PerCP/Cy5.5 anti-CD11b (#301328, Biolegend), BV605 anti-CD40 (#334336, Biolegend), PE anti-CD86 (#374206, Biolegend), PE/Cy7 anti-CD163 (#326514, Biolegend), APC anti-CD206 (#321110, Biolegend), and PerCP/Cy5.5 anti-CD14 (#367110, Biolegend). All of the cell-surface antibodies were diluted 1:20 in FACS buffer. Cells were permeabilized using the Transcription Factor Fixation/Permeabilization Buffer Set (#424401, Biolegend). Then cells were incubated with the following intracellular antibodies: APC/Cy7 anti-CD68 (#333822, Biolegend), purified anti-IBA1 (#PA5-27436, Invitrogen), Goat anti-Rabbit-Alexa Fluor 647 (#A21245, Invitrogen), purified anti-GFAP (#644702, Biolegend), and Goat anti-Mouse-Alexa Fluor 488 (#11029, Invitrogen). All of the intracellular antibodies were diluted 1:100 in the Permeabilization buffer (lx). Cells were washed with Permeabilization buffer and fixed in Fixation Buffer (#420801, Biolegend). Flow cytometry was performed using the Attune NxT Acoustic Focusing Cytometer (Thermo Fisher Scientific). Analysis of flow cytometry data was performed via FCS Express 7 (DeNovo Software).

Cell Viability Assay by AO/PI Stain

Cell viability was assessed with a LUNA-FL Automated fluorescence cell counter. Viable nucleated cells show green fluorescence and dying nucleated cells show red fluorescence. 18 L of sample was mixed with 2 μL Acridine Orange/Propidium Iodide (AO/PI) Stain.

MSD U-PLEX Assay Platform-Cytokine and Chemokine Secretions

HMC3 cells were resuspended, counted using the LUNA-II Automated Cell Counter, seeded in the 6-well plate (400 K cells/2 mL medium/well), and incubated overnight to allow cells to attach. The media and detached cells were removed next day. The cell layer was washed three times in PBS and once in serum- and phenolred-free DMEM (SPFM). Cells were incubated in SPFM for 4 hr prior to treatment with TNF-α (0.3 μg/mL) and/or Cromolyn (0.3 μM, 3 μM) or F-cromolyn (0.3 μM, 3 μM) for 24 hr. The conditioned medium was collected and centrifuged at 1,000×RCF (g) for 5 min to pellet detached cells and large debris, which was subsequently passed through a 0.22 μm filter with PVDF membrane to remove smaller debris. Samples of the supernatant medium were put in a CoolRack (#07210041, Fisher Scientific) on dry ice for Snap-freezing and kept at −80° C. until use.

Meso-scale U-PLEX plates that detect a cytokine panel including IL-1β, IL-2, IL-4, IL-6, IL-8, IL-10, IFN-γ, TNF-α, and a chemokine panel including IP-10/CXCL10, MCP-1/CCL2, MIP-1α/CCL3, MIP-1P/CCL4, Eotaxin/CCL11, were used as per manufacture's protocol. 25 μL of the conditioned medium was used in each well of the MSD plates to detect the analytes. The plates were then analyzed on an MSD QuickPlex SQ120 instrument.

Quantification and Statistical Analysis

All the data were presented as mean±standard error from at least three times, each done in triplicate. The statistical significance between two groups was determined by Student's t test, whereas the comparisons of multiple groups were carried out by one-way ANOVA, followed by Bonferroni's post-test using GraphPad Prism 7 (GraphPad Software, Inc.). A probability value of * $p<0.05$ was considered to be significant.

Results obtained in Experiment 4 are shown in FIGS. 10-14.

INCORPORATION BY REFERENCE

All publications and patents mentioned herein are hereby incorporated by reference in their entirety as if each individual publication or patent was specifically and individually indicated to be incorporated by reference. In case of conflict, the present application, including any definitions herein, will control.

EQUIVALENTS

While specific embodiments of the subject invention have been discussed, the above specification is illustrative and not restrictive. Many variations of the invention will become apparent to those skilled in the art upon review of this specification and the claims below. The full scope of the invention should be determined by reference to the claims, along with their full scope of equivalents, and the specification, along with such variations.

What is claimed is:

1. A method of treating one or more inflammation condition induced by a coronavirus infection, comprising administering a pharmaceutical composition to a subject in need thereof, wherein the pharmaceutical composition comprises a pharmaceutically acceptable excipient and a compound having the following chemical structure:

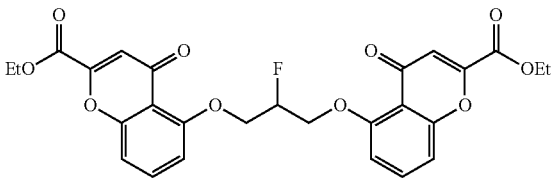 [SMILES: CCOC(=O)c1cc(=O)c2c(OCC(F)COc3cccc4oc(C(=O)OCC)cc(=O)c34)cccc2o1]

or a pharmaceutically acceptable salt thereof; and wherein the one or more inflammation condition is selected from acute respiratory distress syndrome (ARDS), pneumonia, myocarditis, haemophagocytic lymphohistiocytosis (sHLH), kidney failure, septic shock, and sepsis.

2. The method of claim 1, wherein the compound of Formula I is

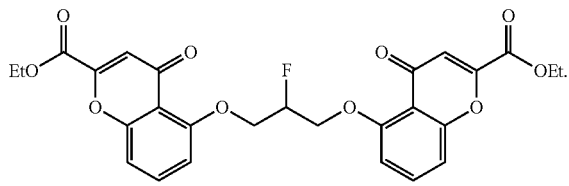 [SMILES: CCOC(=O)c1cc(=O)c2c(OCC(F)COc3cccc4oc(C(=O)OCC)cc(=O)c34)cccc2o1]

3. The method of claim 1, wherein the compound is present in the pharmaceutical composition at a concentration from about 0.1 mg/mL to about 20 mg/mL.

4. The method of claim 1, comprising administering the pharmaceutical composition by intravenous infusion, by intravenous injection, by subcutaneous injection, by intramuscular injection, by intraperitoneal injection, orally, sublingually, buccally, or by inhalation.

5. The method of claim 1, wherein the coronavirus is selected from SARS-CoV, MERS-CoV, HCoV, HKU1, and SARS-CoV-2.

6. The method of claim 5, wherein the coronavirus is SARS-CoV-2.

7. The method of claim 1, wherein the one or more inflammation condition is acute respiratory distress syndrome (ARDS).

8. The method of claim 1, further comprising administering one or more antiviral agent.

9. The method of claim 8, wherein the one or more antiviral agents is selected from remdesivir (RDV), tilorone, favipiravir, IFNα, IFNβ, IFNγ, peginterferon-α, peginterferon-β, ribavirin, lopinavir/ritonavir, camostat mesylate, TAK888, abacavir, acyclovir, adefovir, amantadine, rintatolimod (Ampligen), amprenavir, umifenovir (Arbidol), and atazanavir.

10. The method of claim 1, further comprising administering one or more antimicrobial agent.

11. The method of claim 10, wherein the one or more antimicrobial agents is selected from penicillin, ampicillin, sulbactam, piperacillin, tazobactam, a macrolide, an aminoglycoside, a cephalosporin, and a glycopeptide.

12. The method of claim 1, further comprising administering an immune suppressant agent.

13. The method of claim 12, wherein the immune suppressant agent is selected from tocilizumab, siltuximab, infliximab, abatacept, leronlimab, anakinra, and a JAK inhibitor.

14. The method of claim 1, further comprising administering a hyperimmune globulin, wherein the hyperimmune globulin is isolated from patients recovered from the coronavirus infection.

15. The method of claim 1, further comprising administering an angiotensin II type 1 receptor blocker (ARB).

16. The method of claim 15, wherein the ARB is selected from valsartan, telmisartan, losartan, irbesartan, azilsartan, and olmesartan.

17. The method of claim 1, further comprising administering a mast cell stabilizer.

18. The method of claim 17, wherein the mast cell stabilizer is selected from nedocromil, ketotifen, quercetin, omalizumab, olopatadine, azelastine, mepolizumab, methyl xanthines, and β2-adrenergic agonists.

19. The method of claim 1, wherein the subject has SARS-CoV-2 infection, which has been confirmed by reverse-transcription polymerase chain reaction (RT-PCR) from a respiratory tract or blood specimen.

20. The method of claim 1, wherein the one or more inflammation condition is pneumonia.

21. The method of claim 1, wherein the one or more inflammation condition is myocarditis.

22. The method of claim 1, wherein the one or more inflammation condition is haemophagocytic lymphohistiocytosis (sHLH).

23. The method of claim 1, wherein the one or more inflammation condition is kidney failure.

24. The method of claim 1, wherein the one or more inflammation condition is septic shock.

25. The method of claim 1, wherein the one or more inflammation condition is sepsis.

* * * * *

UNITED STATES PATENT AND TRADEMARK OFFICE
CERTIFICATE OF CORRECTION

PATENT NO. : 12,458,622 B2
APPLICATION NO. : 17/917022
DATED : November 4, 2025
INVENTOR(S) : David R. Elmaleh et al.

Page 1 of 1

It is certified that error appears in the above-identified patent and that said Letters Patent is hereby corrected as shown below:

In the Claims

In Claim 2 at Column 45, Line numbers 1-2, please delete:
"of Formula I"

Signed and Sealed this
Sixth Day of January, 2026

John A. Squires
*Director of the United States Patent and Trademark Office*